(12) United States Patent
Elliott et al.

(10) Patent No.: US 10,821,393 B2
(45) Date of Patent: Nov. 3, 2020

(54) SIMULATED MOVING BED SYSTEM FOR CO2 SEPARATION, AND METHOD OF SAME

(71) Applicants: Exxonmobil Research and Engineering Company, Annandale, NJ (US); TDA Research, Inc., Wheat Ridge, CO (US)

(72) Inventors: Jeannine Elizabeth Elliott, Superior, CO (US); Robert James Copeland, Arvada, CO (US); Jeff Lind, Arvada, CO (US); Daniel P. Leta, Flemington, NJ (US); Patrick P. McCall, Matawan, NJ (US)

(73) Assignees: Exxonmobil Research and Engineering Company, Annandale, NJ (US); TDA Research, Inc., Wheat Ridge, CO (US)

( * ) Notice: Subject to any disclaimer, the term of this patent is extended or adjusted under 35 U.S.C. 154(b) by 368 days.

(21) Appl. No.: 15/234,772

(22) Filed: Aug. 11, 2016

(65) Prior Publication Data
US 2016/0361680 A1 Dec. 15, 2016

Related U.S. Application Data

(62) Division of application No. 14/325,552, filed on Jul. 8, 2014, now Pat. No. 9,446,343.
(Continued)

(51) Int. Cl.
*B01D 53/02* (2006.01)
*B01D 53/04* (2006.01)
(Continued)

(52) U.S. Cl.
CPC ......... *B01D 53/0446* (2013.01); *B01D 53/06* (2013.01); *B01D 53/10* (2013.01);
(Continued)

(58) Field of Classification Search
CPC ........ B01D 2253/104; B01D 2257/504; B01D 2258/0283; B01D 2259/40003;
(Continued)

(56) References Cited

U.S. PATENT DOCUMENTS

| 4,012,206 A | 3/1977 | Macriss et al. |
| 4,493,715 A * | 1/1985 | Hogan .................. B01D 53/02 423/230 |

(Continued)

OTHER PUBLICATIONS

International Search Report and Written Opinion dated Jan. 12, 2015 for related PCT Application No. PCT/US14/45660, 15 pages.

*Primary Examiner* — Christopher P Jones
(74) *Attorney, Agent, or Firm* — Troutman Pepper Hamilton Sanders LLP

(57) ABSTRACT

A system and method for separating and/or purification of $CO_2$ gas from a $CO_2$ feed stream is described. The system and method include a plurality of fixed sorbent beds, adsorption zones and desorption zones, where the sorbent beds are connected via valve and lines to create a simulated moving bed system, where the sorbent beds move from one adsorption position to another adsorption position, and then into one regeneration position to another regeneration position, and optionally back to an adsorption position. The system and method operate by concentration swing adsorption/desorption and by adsorptive/desorptive displacement.

11 Claims, 27 Drawing Sheets

Related U.S. Application Data

(60) Provisional application No. 61/843,745, filed on Jul. 8, 2013.

(51) Int. Cl.
 *B01D 53/06* (2006.01)
 *B01D 53/10* (2006.01)

(52) U.S. Cl.
 CPC .. *B01D 2253/104* (2013.01); *B01D 2257/504* (2013.01); *B01D 2258/0283* (2013.01); *B01D 2259/402* (2013.01); *B01D 2259/40003* (2013.01); *B01D 2259/4009* (2013.01); *B01D 2259/4065* (2013.01); *B01D 2259/4067* (2013.01); *B01D 2259/40086* (2013.01); *Y02C 10/08* (2013.01)

(58) Field of Classification Search
 CPC .. B01D 2259/40086; B01D 2259/4009; B01D 2259/402; B01D 2259/4065; B01D 2259/4067; B01D 53/0446; B01D 53/06; B01D 53/10; Y02C 10/08
 See application file for complete search history.

(56) References Cited

U.S. PATENT DOCUMENTS

| | | | |
|---|---|---|---|
| 4,701,189 A | 10/1987 | Oliker | |
| 6,139,605 A * | 10/2000 | Carnell | B01D 53/1425 95/164 |
| 6,500,236 B2 | 12/2002 | Suzuki et al. | |
| 6,783,738 B1 | 8/2004 | Sasaki et al. | |
| 7,166,149 B2 | 1/2007 | Dunne et al. | |
| 8,500,886 B2 | 8/2013 | Okano et al. | |
| 8,632,627 B2 * | 1/2014 | Frydman | B01D 53/06 165/7 |
| 8,984,905 B2 | 3/2015 | Okano | |
| 2003/0157008 A1 | 8/2003 | Pahlman et al. | |
| 2005/0217481 A1 | 10/2005 | Dunne et al. | |
| 2010/0196259 A1 * | 8/2010 | Garg | B01D 53/02 423/651 |
| 2010/0251887 A1 | 10/2010 | Jain | |
| 2011/0011128 A1 | 1/2011 | Grover | |
| 2011/0061361 A1 | 3/2011 | Shah et al. | |
| 2012/0288439 A1 | 11/2012 | Sundaram et al. | |

\* cited by examiner

Individual Bed with Valves

Valve Positions Pattern A

Valve Positions Pattern B

Valve Positions Pattern C

Valve Positions Pattern D

Valve Positions Pattern E

Individual Sorbent Module

Inter-bed Spacer / Flow Channels

Properties of sorbent

Bulk density = 0.95 g/cc

Crush strength = 6.3 LB_f/mm large batch
Shape = cylinders made by extrusion
Pore volume = 0.19 cc/g
Surface area = 59 m²/g
Active component = sodium 9% (wt)

Bed rotation this way

Bed rotation this way

SIMULATED MOVING BED SYSTEM FOR CO2 SEPARATION, AND METHOD OF SAME

CROSS-REFERENCE TO RELATED APPLICATIONS

This application, filed Aug. 11, 2016, is a divisional application of U.S. patent application Ser. No. 14/325,552, filed on Jul. 8, 2014, which claimed the benefit under 35 U.S.C. § 119(e) of U.S. Provisional Patent Application Ser. No. 61/843,745, filed Jul. 8, 2013, entitled "Simulated Moving Bed System for $CO_2$ Separation, and Method of Same," the entire contents and substance of all of which are hereby incorporated by reference as if fully set forth below.

STATEMENT OF FEDERALLY SPONSORED RESEARCH

Portions of this disclosure were made with Government support under Grant Number DE-NT0005497, awarded by The Department of Energy. The Government may have certain rights in the disclosure.

TECHNICAL FIELD

The various embodiments of the disclosure relate generally to processes, methods, and systems for the separation of $CO_2$ from mixed gas streams using an essentially isothermal cyclic adsorption process. It is particularly useful for $CO_2$ capture from combustion gases and can be used for other applications such as natural gas purification for example.

BACKGROUND

Fossil fuels currently supply the majority of the world's energy needs and their combustion is the largest source of anthropogenic carbon dioxide emissions. Carbon dioxide is a greenhouse gas and is believed to contribute to global climate change. Concern over global climate warming has led to interest in capturing $CO_2$ emissions from the combustion of fossil fuels. $CO_2$ can be removed from combustion flue gas streams by varying methods.

Combustion gases vary in composition depending on the fuel and the conditions of combustion. The combustion gases can be produced in furnaces and in gas turbines, including the combustion gases produced in the generation of electric power. The fuels used are predominantly coal and natural gas. Coal is burned in furnaces, while natural gas is burned both in furnaces and in gas turbines, but in electric power generation natural gas is mainly burned in gas turbines.

The quantities of combustion gas produced in electric power generation are very large because of the scale of furnaces and turbines used. One measure of the scale of these operations is the amount of $CO_2$ produced in a typical 500 Megawatt power plant. For coal fired power generation, the rate of $CO_2$ production is on the order of 100 kilograms per second; for gas fired power production it is more like 50 kilograms per second.

The challenge for flue gas $CO_2$ capture is to do it efficiently to minimize the cost. All post-combustion $CO_2$ capture technologies suffer from the disadvantage that the $CO_2$ in the flue gas is present at low pressure (just about 1 atm) and in low concentrations (3 to 15%). A large amount of energy is needed to separate the $CO_2$. For 90% recovery of 10% $CO_2$ in a flue gas at 1 atm, the $CO_2$ must be brought from 0.1 atm to 1 atm, and then further compressed to a delivery pressure of 150 atm. Analyses conducted at NETL shows that $CO_2$ capture and compression using a conventional absorption process raises the cost of electricity from a newly built supercritical PC power plant by 86%, from 64 cents/kWh to 118.8 cents/kWh (Julianne M. Klara, DOE/NETL-2007/1281, Revision 1, August 2007, Exhibit 4-48 LCOE for PC Cases). Aqueous amines are considered a state-of-the-art technology for $CO_2$ capture for PC power plants, but have a cost of $68/ton of $CO_2$ avoided)(Klara 2007, DOE/NETL-2007/1282). Developing methods that minimize the amount of energy and other costs will be necessary if $CO_2$ removal from flue gas is to be economical.

Methods for the removal of $CO_2$ from gas streams, include absorption with a solvent, adsorption with a sorbent, membrane separation, and cryogenic fractionation and combinations thereof. In absorption/adsorption processes to capture $CO_2$, the energy needed to regenerate the sorbent or solvent is a large cost element.

The heat of adsorption is generally lower than the heat of absorption. This could make use of physical adsorbent for $CO_2$ capture attractive because it has a lower energy requirement for the desorption reaction to release the $CO_2$. A physical adsorbent can be used for $CO_2$ capture. Using molecular sieves/zeolites and activated carbon, this approach for $CO_2$ capture has been research by Inui 1988 [Inui, T., Okugawa, Y. and Yasuda, M. (1988), Relationship between properties of various zeolites and their CO2 adsorption behaviours in pressure swing adsorption operation, *Industrial & Engineering Chemistry Research*, 27, 1103], Chue 1995 [Chue, K. T., Kim, J. N., Yoo, Y. J., Cho, S. H. and Yang, R. T. (1995), Comparison of activated carbon and zeolite 13X for CO2 recovery from flue gas by pressure swing adsorption, *Industrial & Engineering Chemistry Research*, 34 (2), 591-598], Siriwrdane 2001 [Siriwardane, R. V., Shen, M., Fisher, E., and Poston, J. A., (2001) "Adsorption of $CO_2$ on Molecular Sieves and Activated Carbon," *Energy and Fuels*, Vol. 15, pp. 279-284, 2001], Siriwrdane 2005a [Siriwardane, R. V., (2005a) "Solid Sorbents for Removal of Carbon Dioxide from Low Temperature Gas Streams", U.S. Pat. No. 6,908,497 B1, Jun. 21, 2005], Siriwrdane 2005b [Siriwardane, R. V., Shen, M., and Fisher, E., (2005b) "Adsorption of $CO_2$ on Zeolites at Moderate Temperatures," *Energy and Fuels, Vol.* 19 No. 3, p. 1153, 2005], Muñoz et al (2006) [Muñoz, Emilio, Eva Díaz, Salvador Ordóñez, and Aurelio Vega "Adsorption of Carbon Dioxide on Alkali Metal Exchanged Zeolites"], Gingichasvili (2008) [Gingichashvili Sarah (May 19, 2008)—http://thefutureofthings.com/news/1183/co2-absorption-made-easier.html], Halmann and Steinbger (1999) [Halmann, M M and M Steinberg, (1999) *Greenhouse Gas—Carbon Dioxide Mitigation: Science and Technology.* Lewis Publishers, Boca Raton, Fla.] and Lee (2005) [Lee, Sunggyu (2005) Encyclopedia of Chemical Processing Vol 1. CRC Press].

Many physical adsorbent separation systems use pressure swing absorption (PSA) for regeneration. PSA can be used to regenerate $CO_2$ adsorbents. It is used in environmental control applications to maintain $CO_2$ level (Lee 2005) Also, PSA is used for removal of $CO_2$ down to very low levels in gas purification (U.S. Pat. No. 5,656,064). Applying PSA to atmospheric flue gas separation would have high energy consumption requirements (due the required to pull a hard vacuum when removing $CO_2$ from a flue gas) and capital costs because of the large pressure ratios required to enable complete desorption of the $CO_2$.

Temperature swing absorption is another well-established regeneration method. This has been applied to adsorbent regeneration by Lee (2005).

Such separation processes are also commonly applied for $CO_2$ separations of gases from non combustion gas streams, e.g. natural gas purification, re-breathers, contained environment $CO_2$ concentration control and others.

BRIEF SUMMARY

The various embodiments of the disclosure relate generally to processes, methods, and systems for adsorbing $CO_2$ from a feed stream on a feed stream, and regenerating the sorbent by desorbing the $CO_2$. The embodiments include methods and systems for simulated moving beds that adsorb $CO_2$ from a feed stream.

An embodiment of the disclosure can be a method for the separation and/or purification of $CO_2$ gas from a $CO_2$ feed stream by providing at least two adsorption positions, the first adsorption position having a second $CO_2$ stream and producing a second $CO_2$-depleted stream, and the second adsorption position having a first $CO_2$ stream and producing a first $CO_2$-depleted stream; at least two desorption positions, the first desorption position having a second regeneration stream and producing a second $CO_2$-enriched stream, and the second desorption position having a first regeneration stream and producing a first $CO_2$-enriched stream; and at least two fixed sorbent beds, each sorbent bed comprising a sorbent, a first port at an end of the bed and a second port at an end of the bed distal to the first port. A first step of the method can be exposing the first sorbent bed to a second $CO_2$ stream at a first adsorption position, and the second sorbent bed to a first $CO_2$ steam at the second adsorption position; A second step of the method can be exposing the first sorbent bed to the first $CO_2$ stream at the second sorbent position and the second sorbent bed to the second regeneration stream at a first desorption position. A third step of the method can be exposing the first sorbent bed to the second regeneration stream at the first desorption position and the second sorbent bed to a first regeneration stream at a second regeneration position. An optional fourth step of the method can be exposing the second sorbent bed to the second $CO_2$ stream at the first adsorption position and the first sorbent bed to the first regeneration stream at the second desorption. The method can be conducted at substantially constant temperature and substantially constant pressure with neither a temperature swing nor pressure swing; and the regeneration streams comprise steam.

In an embodiment, the method can further provide a system of valves and lines connecting at least two fixed sorbent beds such that a bed moves from a first adsorption position to a second adsorption position to a first desorption position to the second desorption position, and optionally back to the first adsorption position.

In an embodiment, the $CO_2$-feed stream can be directed into both the first $CO_2$ stream of the second adsorption position and the second $CO_2$ stream of the first adsorption position such that the two adsorption positions operate in parallel. The first and the second $CO_2$ depleted streams from the second and first adsorption positions can be combined together for collection.

In an embodiment, the first $CO_2$-depleted stream from the second adsorption bed can be used as the second $CO_2$ stream in the first adsorption position such that the two adsorption positions operate in series, and the second $CO_2$-depleted stream is collected.

In an embodiment, a first portion of the second $CO_2$ depleted stream from the first adsorption position can be diverted as a purge stream to exit the system or to be recycled to another part of the system before the $CO_2$-depleted stream is collected.

In an embodiment, the first $CO_2$-enriched stream from the second desorption position can be used as the second regeneration stream in the first desorption position, such that the desorption positions operate in series.

In an embodiment, in the adsorption position, the $CO_2$ feed streams can enter each sorbent bed via the first port, and the $CO_2$-depleted stream exits via the second port. In the desorption positions, the regeneration streams can enter each of the sorbent beds via the second port, and the $CO_2$-enriched stream exits via the first port.

In an embodiment, the sorbent bed can contain an alkalized sorbent, and the alkalized sorbent can contain a substrate and at least one alkali or alkaline earth component. Tithe sorbent bed can contain an alkalized alumina, and the alkalized alumina can be an alumina and at least one alkali or alkaline earth component Another embodiment, of the disclosure can be a simulated moving bed $CO_2$ purification/separation system. The simulated moving bed system can include a plurality of fixed sorbent beds, each sorbent bed comprising a sorbent, a first port at an end of the bed and a second port at an end of the bed distal to the first port; an adsorption stage and a desorption stage; and a series of valves and lines interconnecting each of the beds via the first and second ports. The system can include a $CO_2$ feed stream, a steam stream, a $CO_2$-depleted stream, a $CO_2$-enriched stream, and one or more purge or recycle streams. The system can operate under substantially constant pressure and constant temperature with neither temperature swing nor pressure swing.

In an embodiment, when a bed is in an adsorption stage, the first port of the bed can be connected to either the $CO_2$ feed stream or the second port of an upstream sorbent bed in the adsorption stage which can generate a $CO_2$ depleted stream. When a bed is in an adsorption stage, the second port of the bed can be connected either to a first port of a downstream bed, to a purge line, or to a unit collecting the $CO_2$-depleted stream. When any bed is in an adsorption stage, the first port can be connected to the $CO_2$ feed stream and the second port can be connected to a unit collecting the $CO_2$-depleted stream, or optionally connected to a purge or recycle line.

In an embodiment, the beds operating in an adsorption zone can operate in parallel. In an embodiment, the beds operating in the desorption zone operate in series, with the bed in the desorption zone longest receives the steam stream, and each bed is connected via a port to another bed, the connections being from one bed to the bed next longest in the desorption zone, and the bed earliest in the desorption zone is emitting via a port the $CO_2$-enriched stream for collection.

In an embodiment, the beds operating in a regeneration zone can operate in parallel. In an embodiment, when a bed is in a desorption zone, the first port of the bed is connected to the second port of a bed that has been in desorption zone less time, and the second port of the bed is connected to the first port of a bed that has been in the zone the next longest time, with the exceptions that the second port of the bed longest in the desorption zone is connected to the steam stream, and the first port of the earliest bed in the desorption zone is connected to a unit for collecting the $CO_2$-enriched stream.

In an embodiment, the fixed sorbent beds have an aspect ratio (length to width) so as to provide a gas superficial residence time of at least 5 seconds, or at least about at least 8 seconds, or at least about 10 seconds.

In an embodiment, the sorbent bed can contain an alkalized sorbent, the alkalized sorbent including a substrate and at least one alkali or alkaline earth component. The sorbent bed can be an alkalized alumina, and the alkalized alumina can include an alumina and at least one alkali or alkaline earth component.

In an embodiment, the ratio of beds in the adsorption zone to desorption zone can be between about 1:1 and 1:4.

In an embodiment, the system can also include an optional purge step or steps, wherein the sorbent bed can be purged between desorption and adsorption, and/or between adsorption and desorption. The purge steps can include introducing a separate stream, optionally a portion of the feed stream, into a bed which just advanced out of the desorption zone, directing the effluent to a bed which has just advanced out of the adsorption stage; and directing the ultimate effluent either to a stack or to be recycled within the system. The purge steps can also include introducing a separate stream, optionally a portion of the feed stream or a non-adsorbing gas, into a bed which just advanced out of the desorption zone, in order to push out the dead volume gas and adsorbed steam of this bed back into a desorption zone bed.

DETAILED DESCRIPTION

Figure 1:
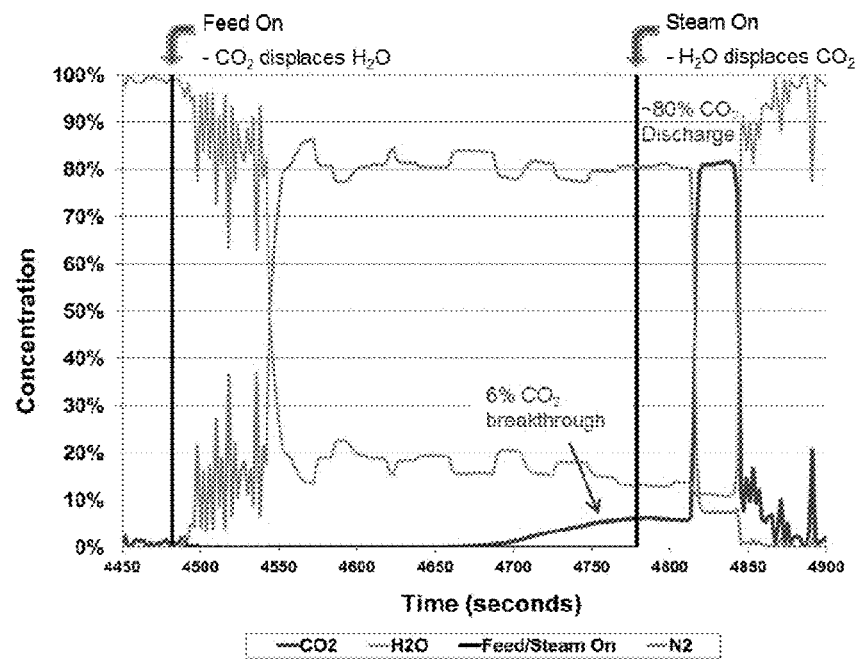
FIG. 1 illustrates a graphical representation of a cyclic displacement process in accordance with an exemplary embodiment of the disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another embodiment includes from the one particular value and/or to the other particular value.

By "comprising" or "comprising" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

A sorbent-based process to separate carbon dioxide ($CO_2$) from a gas stream is disclosed. The sorbent can have alkali or alkaline earth elements dispersed on a solid. Examples of solids that can be used include alumina, carbon, resin, silica, other oxides or admixtures. The process employs gas-solids contactors in which the sorbent is alternately exposed to the feed gas and to steam wherein the gas and steam are essentially at the same temperature. In the steaming step the carbon dioxide adsorbed from the gas is released from the sorbent by a combination of concentration swing and desorptive displacement, thereby regenerating the sorbent for re-use. No external application or removal of heat is used, and the process operates at essentially constant pressure. The process is notably identifiable and distinguishable and beneficial as compared to pressure swing or partial pressure swing separation in that during the adsorption of $CO_2$ the bed temperature decreases below the average bed temperature as determined over the entire cycle and during $CO_2$ displacement/desorption the bed temperature increases above the average. The process is further distinguished and beneficial as compared to thermal swing separation in that no external heat is applied and the desorption gas, steam, is essentially isothermal with the feed gas. The gas-solids contactors may use moving solid sorbents, or solid sorbents contained in packed beds or in parallel-channel beds (monoliths). The packed bed or monoliths can be rotating or stationary. The water and energy from the regeneration steam can be recaptured after use and recycled back into the process.

The disclosure provides for a process for adsorbing and desorbing $CO_2$. The process can be notably identifiable and distinguishable and beneficial as compared to pressure swing or partial pressure swing separation in that, during the adsorption of $CO_2$, the bed temperature decreases below the average bed temperature as determined over the entire cycle and, during $CO_2$ displacement/desorption, the bed temperature increases above the average. The process can be further identifiable and distinguishable and beneficial as compared to thermal swing separation in that no external heat is applied and the desorption gas, steam, can be essentially isothermal with the feed gas. The gas-solids contactors can use moving solid sorbents or solid sorbents contained in packed beds or in parallel-channel beds (monoliths). The packed bed or monoliths can be rotating or stationary. To permit continuous flow of inlet and outlet streams, multiple beds can be combined with appropriate valving to switch individual beds between adsorption and desorption. Such multiple bed arrangements can be operated to achieve counter-current staging. The water and energy from the regeneration steam can be recaptured after use and recycled back into the process. The process can be operated at temperatures greater than 100° C. enabling, for example $CO_2$ removal from flue gases exiting a heat recovery steam generator (HRSG) without extensive heating or cooling.

The disclosure further provides a regeneration process which uses contact with steam to remove the adsorbed gas from the sorbent. The regeneration mechanism can be by a combination of concentration swing and desorptive displacement of the adsorbed gas with steam. The disclosure can further relate to a method to recycle the steam and recover its energy through a multi-stage condenser/heat exchangers system. The advantage of this option is that it increases system efficiency.

The disclosure also relates to gas separations such as removal of $CO_2$ from a combustion flue gas or natural gas stream or other streams. The disclosure further provides a process for selecting and/or making a regenerable sorbent for $CO_2$ capture. This solid sorbent can adsorb $CO_2$. An advantage is that the adsorbent can be rapidly regenerated essentially isothermally with steam and discharge a moist $CO_2$ stream wherein the $CO_2$ concentration is higher than that in the original feed gas. Another advantage of the sorbent is that it can be used in an adiabatic reactor design. The sorbent adsorbs water during regeneration with steam and then desorbs water during $CO_2$ adsorption so that the net reactions are exothermic during steaming and endothermic during adsorption. In this way the system does not require external thermal management on the adsorber and regenerator beds. This modest temperature swing is also important because it thermally assists both adsorption and desorption, again without the addition of external thermal management.

High process efficiency can be important in order for $CO_2$ capture to be economical. The regeneration system can be designed to recycle the steam and recover its energy.

The advantages can include the following: (1) no pressure or temperature swing is required; (2) effective for low $CO_2$ content gas; (3) achievement of low pressure drop with packed bed can be obtained with reduced footprint stacked fixed beds; (4) optional separation of bed void gases from adsorbed species during regeneration; (5) applicable to a variety of feeds; (6) does not require cooling of sorbent after regeneration prior to adsorption; (7) applicable to feed gas temperatures>100° C.; (8) moist $CO_2$ discharge from the regeneration cycle can be at concentration greater than the feed $CO_2$ concentration; (9) option to utilize combustion air before going to combustion device as an additional stripping gas; (10) optional selective purging and recycle to optimize the recovery and purity and energy efficiency.

The process can be carried out in a cyclic adsorption/regeneration cycle and can include various intermediate purges and stream recycles. Such a process can be performed with co-directional flow of the feed gas and regeneration steam, but can be preferably performed with counter-current feed adsorption/steam regeneration steam flows.

In an embodiment, the disclosure can include a process for separating $CO_2$ from a gas stream. In general, the process can include the steps of passing a gas stream comprising $CO_2$ over a sorbent to adsorb the $CO_2$ to the sorbent, and then recovering the $CO_2$ by desorbing the $CO_2$ from the sorbent. As noted above, and discussed in more detail below, the adsorption/desorption process can be based on concentration swing and desorptive displacement. Concentration swing adsorption (CSA) processes including the adsorption and desorption steps are governed by change in fugacity of the adsorbate, in this case, $CO_2$, in the gas stream, in comparison to the adsorbent. The adsorbate, in this case $CO_2$, is adsorbed when its fugacity is high in the gas stream and low in the adsorbent. Conversely, it is desorbed when its fugacity is reduced in the gas stream relative to the amount in the adsorbent. By way of example, an adsorbent having a high level of $CO_2$ might still adsorb additional $CO_2$ when the gas stream has a relatively higher fugacity of $CO_2$ versus the adsorbent. And an adsorbent having a low level of $CO_2$ can adsorb $CO_2$ when the gas stream has a low fugacity of $CO_2$ so long as the relative fugacity of $CO_2$ in the sorbent is still lower than the $CO_2$ in the gas stream. One of ordinary skill in the art would also recognize that "relative fugacity" does not imply relative concentration in the absolute value sense, i.e. does not mean that a 2% adsorbed $CO_2$ content is necessarily larger than a 1% $CO_2$ gas level, because the ability of the gas to retain $CO_2$ versus the ability of adsorbent to adsorb additional $CO_2$, will be governed by various equilibrium relationships.

The disclosure includes the process of desorbing the $CO_2$ from the sorbent. This step might also be referred to as a regeneration step because the sorbent is regenerated for the next passage of a $CO_2$ gas stream across the sorbent. The desorption of $CO_2$ from the sorbent comprises treating the sorbent with steam. This desorption step can be driven by a one or more forces. One desorption force is concentration swing, as with the adsorption step above. The partial pressure of $CO_2$ in the incoming steam is nearly zero, and thus the adsorbed $CO_2$ can shift to the steam phase. The second desorption force is desorption by displacement. The water molecules in the steam can adsorb onto the sorbent and displace the $CO_2$ from the sorbent.

As an optional step, the processes, methods and systems of the disclosure can also include one or more purging step, in which a non-adsorbent gas, i.e. not steam or a $CO_2$ feed stream, can be passed across the sorbent. The gas can be any gas known to one or ordinary skill in the art, such as for example an inert gas or air. In an embodiment, the purge gas can be a nitrogen stream, an air stream, or a dry air stream. Alternatively the purge gas can be a $CO_2$ feed gas or steam that is recycled into a process step. The purge step can be conducted at any time. For example, prior to the passing of the $CO_2$ feed stream across the sorbent, a purge gas can be passed to remove residual and adsorbed water vapor. This purge gas can be run back into the regeneration side in order for the water vapor to be readsorbed onto the regeneration side. The purging step can also occur between the adsorption step or steps, and the desorption or regeneration step or steps. The purge gas can be non-reactive, but can still optionally remove adsorbed $CO_2$ from a sorbent based on concentration swing. Thus, in an embodiment, the purging step can be conducted after adsorption steps, and can be conducted to remove residual gas prior to desorption, which can be optionally recycled into the process. Moreover, the purge step can also be optionally diverted into two streams: 1) an initial purge stream to remove the first gas, and 2) a separate purge stream that can contain the initial purified or desorbed $CO_2$, which could be optionally captured as part of the final product stream. Furthermore, in an embodiment, a purging step can be conducted after the desorption or regeneration step(s) is complete, thereby optionally removing residual water and/or steam which can be recycled back into the process. Each purging step can thereby reduce an excess gas stream which can, for example lead to a more efficient process or produce a more $CO_2$ enriched product stream because a final product stream is not diluted by a preceding gas source. By way of specific example, a purging step conducted after the initial adsorption can remove residual, dilute $CO_2$ feed stream, leading to a more concentrated $CO_2$ product stream. The resulting gas stream from the purging step can be recycled into the system, or split into a recycle and a product stream.

In contrast to numerous processes currently applied to $CO_2$ processing, the processes, methods and systems of the disclosure do not include either pressure swing adsorption or temperature swing adsorption. The process, method, and systems are nearly isothermal, i.e. there is substantially no temperature change in the overall system. One of ordinary skill would understand that substantially no temperature change, or nearly isothermal, means that the overall temperature of the system does not change by a significant amount. That does not necessarily mean that the temperature is perfectly fixed. Any system can gain or lose heat due to a number of factors, e.g. environmental factors, process fluctuations, etc. However, the disclosed process does not have a temperature change of more than 10° C. in either direction, more than 5° C. in either direction, or more than 3° C., or 2° C., or 1° C. in either direction.

While the overall process can be nearly isothermal, the individual steps of adsorption and desorption steps can include independent temperature changes. In an embodiment, the adsorption process can result in a temperature decrease in the adsorption step. The adsorption of the $CO_2$ on a sorbent can be an endothermic process that results in a temperature decrease in the system. Thus, in an embodiment, the temperature of the gas stream during adsorption can decrease by about 30° C. or less, by about 25° C. or less, by about 20° C. or less, about 15° C. or less, about 10° C. or less, or about 5° or less. The temperature of the gas stream during adsorption can decrease by about 1° or more. On the other hand, the desorption process can result in a temperature increase for the desorption step. The desorption can be a net exothermic process that results in a temperature increase. Thus, in an embodiment, the temperature of the gas stream during desorption can increase by about 30° C. or less, by about 25° C. or less, by about 20° C. or less, about 15° C. or less, about 10° C. or less, or about 5° or less. The temperature of the gas stream during desorption can increase by 1° C. or more. However, as discussed, the input and outputs of the overall system result in a process that can be overall nearly isothermal.

Because the process does not rely on a temperature swing adsorption, the process can be conducted at any temperature in which the gas flows can be maintained across the adsorbent. The process can often include a combustion gas stream and steam as a regeneration stream, so the overall temperature of the process, method, or system can be conducted at greater than about 100° C., greater than about 110° C., greater than about 120° C., greater than about 130° C., greater than about 140° C., greater than about 150° C., or greater than about 160° C. The overall temperature of the process can also be conducted at a temperature as high as the sorbent can withstand. Thus, the overall temperature of the process can be up to about 300° C., can be up to about 275° C., can be up to about 250° C., can be up to about 240° C., can be up to about 230° C., can be up to about 220° C., can be up to about 210° C., or can be up to about 200° C. However, the process can also be conducted at a temperature below 100° C., at conditions that allow the flow of steam in a gas stream, i.e. according to conditions known to one of ordinary skill as derived from engineering Steam Tables. In an embodiment, the process can be conducted at a temperature between about 120° C. to about 250° C., 120° C. to about 220° C., between about 120° C. to about 200° C., between about 140° C. to about 250° C., between about 140° C. to about 230° C., or between about 140° C. to about 220° C. In an embodiment, the process can be conducted at a temperature between about 120° C. to about 180° C., between about 140° C. to about 160° C., or between about 150° C. to about 165° C.

The process, method, and systems of the disclosure are also conducted at a nearly constant pressure, or a substantially constant pressure, i.e. there is substantially no pressure change designed as part of the process or system. Again, one of ordinary skill would understand that substantially no pressure change means that the overall pressure of the system does not change by a significant amount. That does not necessarily mean that the pressure is perfectly fixed. Any system can gain or lose pressure due to a number of factors, e.g. environmental factors, process fluctuations, etc. Because the process does not rely on pressure swing adsorption, the process, method, or system can be run at any pressure convenient to one of ordinary skill in the art. In an embodiment, the process, method, or system can be conducted at ambient pressure. However, one of ordinary skill in the art would also recognize that gases in general, and steam in particular, can be modified based on changes in temperature and pressure. For example, the system could be run below 100° C. with steam by running at a slightly reduced pressure. Similarly, higher temperature steam and gas can be used at ambient pressure, but might also be used at higher pressures. However, the pressure of the system overall, whether below, above, or at ambient pressure, does not vary significantly during the process.

As noted above, a driving force for adsorption and desorption/regeneration of the $CO_2$ can be a combination of concentration swing and desorptive displacement/adsorption. During adsorption, incoming $CO_2$ molecules adsorb onto the sorbent and also displace previously adsorbed water (adsorptive displacement or displacement adsorption), during which time the water also desorbs by concentration swing. During desorption/regeneration, the water molecules from the steam adsorb onto the adsorbent and displace the $CO_2$ (desorptive displacement or displacement desorption). Thus, there are several mechanisms occurring during adsorption and desorption. The $CO_2$ in the feed stream adsorbs onto the sorbent and also displaces water in the adsorption portion of the cycle, herein defined as the portion of the cycle where $CO_2$ containing gas is fed to the sorbent, and the sorbent adsorbs $CO_2$ and desorbs water. The $CO_2$ then desorbs during steam regeneration portion of the cycle, when the sorbent adsorbs water and displaces $CO_2$. Further steaming can further remove $CO_2$ from the sorbent via continued displacement and partial pressure purge desorption. The adsorbed water is then partially or completely displaced and partial pressure desorbed during the next $CO_2$ adsorption cycle. Two displacement reactions that are part of the overall adsorption/desorption process can be defined: adsorptive displacement, in which an incoming $CO_2$ displaces water from the sorbent during an adsorption step; and desorptive displacement, in which an adsorbed $CO_2$ molecule is displaced from the sorbent by steam during the desorption/regeneration step. These might also be called displacement adsorption and displacement desorption.

A non-limiting example of the type of reaction involved in adsorption and desorption can be described in the following equations. While the non-limiting example given is specific for a particular potassium carbonate hydrate, many related alkali and alkaline-earth carbonate hydrates may exhibit similar related adsorption and desorption mechanisms. Under low water content conditions in adsorption portion of the cycle:

$$2K_2CO_3 \cdot 3H_2O + 2CO_2 \rightleftharpoons 4KHCO_3 + H_2O$$

$$\text{support}^*H_2O \rightleftharpoons \text{support} + H_2O$$

Under high water content, e.g. steam, conditions in regeneration portion of the cycle:

$$4KHCO_3 + H_2O \rightleftharpoons 2K_2CO_3 \cdot 3H_2O + 2CO_2$$

$$\text{support} + H_2O \rightleftharpoons \text{support}^*H_2O$$

Alternatively, the adsorption/desorption mechanism can be simply competitive adsorption between $CO_2$ and $H_2O$ on basic sites wherein under high water vapor conditions the competitive adsorption favors water over $CO_2$.

The adsorption and desorption of $H_2O$ on the non-alkali sites is generally not beneficial to the process efficiency. While the adsorption of water on the non-alkali/alkaline sites may serve to help produce a higher concentration moist $CO_2$ discharge stream, generally it serves to consume steam in a non-productive manner, shifting it to the adsorption effluent. Thus, the preferred sorbent for this disclosure is one which minimizes this part of the adsorption mechanism.

The disclosure can also include a sorbent based $CO_2$ adsorption process that includes the steps of passing a gas stream containing $CO_2$ across the sorbent to adsorb the $CO_2$ onto the alkalized substrate, and recovering the $CO_2$ from the sorbent by passing steam across the $CO_2$ containing alkalized substrate to displace the $CO_2$ with water. The process can include also preparing a sorbent comprising an alkalized substrate for the sorbent based $CO_2$ adsorption process. As discussed above, the sorbent based $CO_2$ adsorption process does not include pressure swing adsorption or temperature swing adsorption. The adsorption of $CO_2$ includes concentration swing adsorption of the $CO_2$ onto the sorbent and adsorptive displacement, and the desorption and recovery of the $CO_2$ can include a combination of concentration swing desorption and desorptive displacement.

The processes and methods of the disclosure can also include a method for purifying a gas stream that contains $CO_2$ in order to reduce the $CO_2$ in the gas stream. The method for removing $CO_2$ to purify a gas stream can include preparing a sorbent bed having an inlet and an outlet, passing a gas stream containing $CO_2$ across the sorbent bed from inlet to outlet to adsorb the $CO_2$ to the sorbent, recovering the purified gas stream depleted of $CO_2$ at the outlet, and regenerating the sorbent bed by passing steam across the $CO_2$ containing sorbent. The method does not include a pressure swing adsorption or temperature swing adsorption process, and uses concentration swing adsorption and adsorptive displacement to remove the $CO_2$ during adsorption.

Similarly, the processes and methods of the disclosure can also include a method for purifying a $CO_2$ gas stream to increase the concentration of the $CO_2$ in a product stream. The method can include the steps of preparing a sorbent bed having an inlet and an outlet, passing a gas stream containing $CO_2$ across the sorbent bed to adsorb the $CO_2$ to the sorbent, and recovering a purified $CO_2$ stream by passing steam across the $CO_2$ containing sorbent to generate an enriched $CO_2$ stream.

The adsorption and desorption processes, methods and systems of the disclosure can be highly effective at capturing and recovering $CO_2$ from a stream. In an embodiment of the disclosure, the processes and methods can recover greater than about 60% by volume of the $CO_2$ from the incoming gas stream, greater than about 65% by volume of the $CO_2$ from the incoming gas stream, greater than about 70% by volume of the $CO_2$ from the incoming gas stream, greater than about 75% by volume of the $CO_2$ from the incoming gas stream, greater than about 80% by volume of the $CO_2$ from the incoming gas stream, greater than about 85% by volume of the $CO_2$ from the incoming gas stream, greater than about 90% by volume of the $CO_2$ from the incoming gas stream, or greater than about 95% by volume of the $CO_2$ from the incoming gas stream. By analogy then, the initial stream fed across the sorbent during the adsorption phase can be purified of at least about 60% volume of the initial $CO_2$, at least about 65% volume of the initial $CO_2$, at least about 70% volume of the initial $CO_2$, at least about 75% volume of the initial $CO_2$, at least about 80% volume of the initial $CO_2$, at least about 85% volume of the initial $CO_2$, or at least about 90% by volume or greater than about 95% by volume of the $CO_2$ in the feed stream. In an embodiment, the feed stream can be purified by less than 99.5% by volume.

As a complement to the reduction of $CO_2$ in the incoming gas stream, i.e. the $CO_2$ feed stream, the amount of $CO_2$ capacity of the sorbent can also be described. The ability of a sorbent to adsorb larger amounts of $CO_2$ in an individual adsorption step leads to a direct increase in throughput, due to overall capacity. The $CO_2$ loading of a sorbent can be described by the percent weight increase of the sorbent due to increased amounts of $CO_2$, based on, for example, the amount of $CO_2$ extracted from a feed gas versus the total weight of the sorbent. One of ordinary skill would understand that several factors can affect the $CO_2$ capacity in a given sorbent, including for example the temperature of the system, the relative basicity of the sorbent based on the amount of alkali or alkaline earth component on a given sorbent, and so forth. In an embodiment, a sorbent can have a $CO_2$ loading of at least about 0.4 wt %, at least about 0.5 wt %, at least about 0.6 wt %, at least about 0.7 wt %, or at least about 0.8 wt %. In an embodiment, the $CO_2$ loading can be at least about 1.0 wt %, at least about 1.2 wt %, at least about 1.3 wt %, at least about 1.4 wt %, at least about 1.5 wt %, at least about 1.6 wt %, at least about 1.7 wt %, at least about 1.8 wt %, or at least about 1.9 wt %. In an embodiment, the $CO_2$ loading of a sorbent can be at least about 2 wt %, at least about 2.5 wt %, or at least about 3 wt %. In an embodiment, the sorbent can have a $CO_2$ loading of less than 20 wt %. The $CO_2$ loading or capacity of a sorbent can be measured by any technique known to one of ordinary skill, including for example a TGA analysis, or process evaluation to calculate the amount of $CO_2$ extracted from a feed gas per amount of sorbent.

The capacity of a sorbent bed, the concentration of $CO_2$ in the feed steam, and other process parameters such as bed volume and air velocity can be used to determine the overall cycle time of a given step for an adsorption or desorption bed. In an embodiment, the cycle time an absorption or desorption bed can be from about 20 seconds to about 30 minutes, including about 20 seconds to about 300 second, about 30 seconds to about 150 seconds, about 1 minute to about 10 minutes, about 1 minute to about 8 minutes, about 1 minute to about 5 minutes, about 1 minute to about 15 minutes, about 1 minute to about 20 minutes, about 1 minute to about 30 minutes, about 3 minute to about 30 minutes, about 5 minute to about 30 minutes, about 5 minute to about 20 minutes, or about 5 minute to about 15 minutes.

The adsorption step of the disclosure is also relatively insensitive to moisture. The $CO_2$ feed streams can often contain water. For example combustion gas can contain 8-15 percent water. Other traditional sorbents such as cationic zeolites are almost completely incapable of adsorbing $CO_2$ in the presence of water. In comparison, the current adsorption process can be conducted in the presence of water without substantial attenuation of the working capacity for $CO_2$. Thus, in an embodiment of the disclosure, the adsorption step can be conducted at a percent water volume of up to about 35 vol %, up to about 30 vol %, up to about 28 vol %, up to about 25 vol %, up to about 23 vol %, or up to about 20 vol %. In an embodiment, the ratio of water to $CO_2$ in the feed stream can be greater than 0.5:1, greater than 0.75:1, greater than 1:1, greater than 1.5:1, greater than 2:1, greater than 2.5:1 or greater than 3:1. In an embodiment, the ratio of water to $CO_2$ in the feed stream can be less than about 4:1, less than about 3.5:1, less than about 3:1, less than about 2.5:1, or less than about 2:1.

The processes, methods, and systems of the disclosure can be used to adsorb $CO_2$ from a feed stream having a large range of $CO_2$ concentrations. In an embodiment, the $CO_2$ concentration of the feed stream can be at least about 0.5 vol %, at least about 1 vol %, at least about 1.5 vol %, at least about 2 vol %, at least about 2.5 vol %, at least about 3 vol %, at least about 4 vol %, or at least about 5 vol %. The $CO_2$ concentration can be at least about 6 vol %, at least about 7 vol %, at least about 8 vol %, at least about 9 vol %, or at least about 10 vol %. In an embodiment, the $CO_2$ concentration in the feed stream can be less than about 50 vol %, less than about 45 vol %, less than about 40 vol %, less than about 35 vol %, or less than about 30 vol %. The processes, methods, and disclosures can be particularly effective at these lower concentrations. However, the system can also be used to extract $CO_2$ at concentrations above 50 vol % as well, including up to about 100%.

As discussed above, the process, method, and systems of the disclosure are conducted on a sorbent. The term sorbent can sometimes be applied interchangeably within this disclosure with the term adsorbent, and can be sometimes described as the gas-solids contactor. The sorbent of the disclosure can be an alkalized substrate or support, sometimes an alkalized alumina.

The desirable characteristics of sorbents for use in this process can include adsorption capacity for $CO_2$ in the presence of water vapor, high selectivity for $CO_2$ adsorption versus other (non-water) components in the feed gas, low steam requirement for regeneration, long-term physical stability and adsorption capacity maintenance, low cost per unit weight, and good mass transfer characteristics. The desirable characteristics can be obtained with various supported alkali and or alkaline-earth species.

Sorbents for this disclosure comprise alkali or alkaline earth metals, oxides, hydroxides, carbonates, bicarbonates or hydrates of any of those species supported on a high surface area substrate. The high surface area substrate can be aluminas, silica-aluminas, carbon, pillared clays, silicas, resins, titanias and other water-stable supports. In an embodiment, the high surface area substrate or support can be alumina. In an embodiment, the sorbents can consist essentially of alkali or alkaline earth metals, oxides, hydroxides, carbonates, bicarbonates or hydrates of any of those species supported on a high surface area substrate; or can consist of alkali or alkaline earth metals, oxides, hydroxides, carbonates, bicarbonates or hydrates of any of those species supported on a high surface area substrate.

Alkali metals are elements in the left-most column of the periodic table of chemical elements except that hydrogen is not included. Li, Na, K, Rb, Cs, and Fr are generally recognized as alkali-metals. Alkaline-earth metals are in the second column from the left on the periodic table of elements and are Be, Mg, Ca, Sr, Ba, Ra. The basic adsorbent in this process can be an alkalized alumina. Alkalized alumina contains at least one alkali or one alkaline component and at least one alumina component. The alkali or alkaline component can be in the pure state or as a compound, e.g. carbonate, hydroxide, oxide, etc. In some cases the alkali or alkaline compound can be in the form of hydrates. The alkali or alkaline surface can attract the acidic $CO_2$.

Any support upon which reasonable dispersion of the alkali metal species can be obtained can be useful, including resins, titania, zirconia, aluminas, silicas, clays, mixed inorganics and other inorganic and organic support materials with significant surface areas upon which the alkali metal species can be reasonably dispersed. When the high surface area substrate or support is alumina, the alumina compounds can include sodium aluminate ($2NaAlO_2=Na_2O*Al_2O_3$), gamma ($\gamma$)-Alumina $\{Al_2O_3(G)\}$, theta ($\theta$)-alumina, hydrated alumina (Boehmite, $Al_2O_3*H_2O$), Gibbsite, Bauxite, trine, and bemire. The alumina can have relatively high purity like pseudoboehmite or can be a natural mineral like gibbsite or bauxite. Synthetic aluminas may also be used. Further, gamma alumina, theta alumina, and carbon supports can be effective.

An embodiment of the disclosure can be the sorbent that includes a support and a metal compound selected from the group consisting of alkali or alkaline earth. In an alternate embodiment, the sorbent can consist essentially of the support and the metal compound, and any associated counterions. The metal compound can contain Li, Na, K, Rb, Cs, Be, Mg, Ca, Sr, or Ba, or a combination thereof; Li, Na, K, Mg, or Ca, or can contain Na or K or a combination thereof. The metal compound can be at least about 5 wt % of the sorbent, at least about 7 wt %, at least about 10 wt %, at least about 12 wt %, at least about 15 wt %, at least about 17 wt %, at least about 20 wt % expressed as the wt % elemental concentration.

The support in the sorbent, alternatively called a substrate, can be any support one of ordinary skill in the art would select. In an embodiment, the support can be alumina, titania, zirconia, silica, clay, carbon and mixtures thereof. The support can be alumina. Generally, the support should have a high surface area and pore volume in order optimize the loading levels that the sorbent can demonstrate for $CO_2$. In an embodiment, the support can have a surface area of at least about 100 m$^2$/g, at least about 150 m$^2$/g, at least about 200 m$^2$/g, at least about 250 m$^2$/g, or at least about 300 m$^2$/g. In an embodiment the support can have a surface area of less than about 1200 m$^2$/g, or less than about 1000 m$^2$/g.

An embodiment of the disclosure can also be a $CO_2$ adsorption sorbent, analogous to the disclosure above, wherein the $CO_2$ adsorption sorbent can adsorb and desorb $CO_2$ under concentration swing conditions in the presence of water, and without temperature or pressure changes.

An embodiment of the disclosure can also be a sorbent comprising a metal compound and a support, wherein the sorbent adsorbs carbon dioxide from a wet atmosphere. The sorbent can adsorb the carbon dioxide from the wet atmosphere having up to 35 wt % water, or can adsorb the carbon dioxide and desorb water previously adsorbed from a higher water concentration stream in a wet atmosphere having up to 35% water or less. In an embodiment, the sorbent can adsorb carbon dioxide after the sorbent has been saturated with water at a partial pressure of 1 bar. Furthermore, because the sorbent can operate in a concentration swing system, the sorbent can also desorb carbon dioxide in an atmosphere that is greater than 60% water, or can desorb carbon dioxide from the sorbent previously loaded with carbon dioxide at a partial pressure of 0.02 to 1.0 bar. Thus, the $CO_2$ concentration in the incoming water stream, e.g. at an inlet to the sorbent in a regeneration/desorption point, can be less than the $CO_2$ concentration of the outgoing water stream, i.e. at an outlet from the sorbent.

As discussed above with respect to the non-limiting surface equilibria, the sorbents of this disclosure can also be $CO_2/H_2O$ equilibrium sorbents, where the sorbent will adsorb or desorb carbon dioxide and water, depending on conditions as discussed in this disclosure. Thus, the disclosure also includes a sorbent composed of the metal compound and a support, where the sorbent has a greater capacity for carbon dioxide than the support, the sorbent has a greater capacity for water than the support, and the ratio of carbon dioxide and water on the support varies with the relative concentration of the two sorbates in the environment above the sorbent. The sorbent can adsorb $CO_2$ in the presence of less than 35% water at a pressure of one bar, and can desorb $CO_2$ in the presence of greater than 60% water vapor at a pressure of one bar.

The adsorptive capacity, or loading, of the sorbent has been described with respect to the amount of carbon dioxide that the sorbent can adsorb. Because to the equilibrium conditions the sorbent can operate under during concentration swing adsorption and desorptive and adsorptive displacement, the sorbent can also be described as having a water capacity or loading. In an embodiment, the sorbent can have a water capacity of at least about 1.0 wt %, at least about 1.2 wt %, at least about 1.5 wt %, at least about 1.7 wt %, or at least about 2.0 wt %. In an embodiment, the water capacity can be at least about 2.5 wt %, at least about 2.7 wt %, at least about 3.0 wt %, or at least about 3.5 wt %. Thus, in an embodiment, the sorbent can described as adsorption-desorption sorbent composed of a metal compound and a support, where the sorbent has a carbon dioxide capacity of at least about 0.5 wt %, a water capacity of at least about 1 wt %, and a water/carbon dioxide selectivity that varies with the relative concentration of the two sorbates in the environment above the sorbent. The sorbent has a carbon dioxide capacity of at least 0.7 wt %, or at least 1.0 wt %. The sorbent can have has a water capacity of at least about 1.5 wt %, or at least about 2 wt %. The sorbent can have a water capacity of less than about 20 wt %.

An embodiment of the disclosure can also include a carbon dioxide-water equilibrium adsorption surface, comprising a metal compound adhered to the surface of a support. The surface can adsorb carbon dioxide and desorb water in a $CO_2$-water atmosphere having less than 35 wt % water, and can desorb carbon dioxide and adsorbed water in a $CO_2$-water atmosphere having greater than 60 wt % water.

An embodiment of the disclosure can also include a $CO_2$ adsorption sorbent having $CO_2$ adsorbed to the surface. The sorbent can include a support, a metal compound comprising Li, Na, K, Rb, Cs, Be, Mg, Ca, Sr, or Ba, or a combination thereof, and adsorbed carbon dioxide. The metal compound can be at least 5 wt % of the sorbent, and the adsorbed carbon dioxide can be at least 0.7 wt %, at least 1.0 wt % wt, or at least 1.5 wt %. The adsorbed carbon dioxide in the sorbent can be any of the weight % loadings listed above. In an embodiment, the wt % carbon dioxide adsorbed to the sorbent can be based on an adsorption step occurring at about standard pressure and at about 140° C.

An embodiment of the disclosure can include several methods of making the sorbent. The method can include incipient wetness impregnation (or capillary impregnation) of a support, or a slurry/calcinations method where the support is mixed with a solution containing the alkali or alkaline species, dried, and calcined in air to higher temperatures.

In an embodiment, the method can include treating a support with a solution comprising a metal complex and a solvent, and drying the sorbent. The solution can also consist essentially the metal complex and the solvent. The support can be treated with volume of solution that is approximately equal to the pore volume of the support. Approximately equal can mean an amount of liquid that one of ordinary skill in the art would apply in an incipient wetness technique. For example, the support can have a known pore volume, and the support can be treated with an approximately equal volume of the metal solution. The method can further include the step of calcining the sorbent at a temperature of at least about 350° C., at least about 400° C., at least about 450° C., at least about 500° C., at least about 550° C., or at least about 600° C. The calcining step can be at a temperature of less than about 1200° C., or less than about 1000° C. The calcining step can also include an air flow across the support at a rate of about 3 volume/volume of solid/minute, about 4 volume/volume of solid/minute, or about 5 volume/volume of solid/minute.

In an embodiment, a method for making the sorbent include preparing pellets of a support by mixing the support in water, drying, and firing at least at about 300° C., mixing the pellets in an aqueous solution comprising water and a metal complex to prepare a pre-sorbent, drying the pre-sorbent, and calcining the pre-sorbent at temperature of at least about 400° C. The pellets may be made by compression pelletizing or extrusion or other techniques known to those skilled in the art.

In an embodiment, the alkali or alkaline species may be admixed with the support material in a slurry and the slurry prepared into extrudates or pellets, dried, and calcined to a temperature of at least 300° C. An admixed pellet or extrudate formed in this manner may optionally have additional alkali or alkaline species added using the incipient wetness methods described above.

In an embodiment, the metal complex in the method can be an alkali or alkaline earth metal ion complexed with a counterion. The counterion can be any counterion used by one of ordinary skill in the art, including oxides, hydroxides, carbonates, bicarbonates or hydrates. In an embodiment, the metal complex is an organometallic complex, wherein the counterion is an organic ion. The metal complex can be an acetate or citrate complex with alkali or alkaline metal. The metal complex can be an acetate or citrate complex with Na or K.

Each of the sorbent compositions noted herein, and sorbents made by the disclosed methods, can be applied to the adsorption/desorption process for $CO_2$ discussed herein. The compositions can be used in concentration swing processes, and processes using the compositions do not need to rely on either temperature swing or pressure swing adsorption cycles to achieve a $CO_2$ separation process.

In an embodiment of the disclosure, the adsorption process can be applied to single stage $CO_2$ adsorption system. The adsorption system can include a means for contacting the feed gas with the sorbent and means for alternating applying steam to the sorbent. The system can also include any desired purge and recycle streams steps. In addition, the system can include procedures for minimizing the steam requirement and efficient energy management.

At the start of the adsorption process, a sorbent bed may be highly loaded with adsorbed water. As $CO_2$ from the feed stream is adsorbed, water is displaced as well as being partial pressure purged from the bed by the non-adsorbed components of the feed gas. Thus, the first effluent during adsorption will be enriched in water vapor. Optionally, this initial portion may be diverted for recycle or other process optimization. As the adsorbed $CO_2$ front continues moving through the bed, the point will be reached where $CO_2$ breaks through into the effluent. Thus, a $CO_2$ lean effluent may be collected. The lean $CO_2$ effluent can be used to rehydrate the regeneration bed(s) in a recycle or other process optimization design.

In the initial regeneration of $CO_2$ loaded bed, the first effluent can be composed of the void gas contained in the bed herein the void gas refers to the non-adsorbed residual gases from the feed. Without limiting this disclosure a particular mechanistic hypothesis this may be understood by considering that water is adsorbed onto the bed in a well defined moving front displacing $CO_2$ from the adsorbent and pushing the $CO_2$ ahead of it. The advancing wave of concentrating $CO_2$ further pushes ahead of it the non-adsorbed void gases, which may also contain a lower concentration of $CO_2$ and moisture. Thus, as the front advances the first effluent will be void gases and thus they can be diverted separate from the following effluent. The next effluent will be predominantly contain the displaced $CO_2$ at higher concentration due to the fact that the water is still being adsorbed on the bed and thus the $CO_2$ while containing some moisture will be at significantly higher concentration than it was in the feed. This feature can distinguish the process from a conventional stripping or partial pressure purge desorption. Following the $CO_2$ rich effluent, the stream breaks through the bed and further strips the $CO_2$ off the sorbent.

A non limiting example of the feed gas composition exiting a bed, collected in a small lab sized cyclic adsorption unit is shown in FIG. 1, where a simulated flue gas composed of 6% $CO_2$ in $N_2$ was adsorbed and then steam regenerated. The example was run with the bed held essentially isothermal at ~140° C. and at ambient pressure.

Regeneration or desorption of $CO_2$ with steam can be single stage or counter-current gas/solid multi-stage. Single stage or counter-current gas/solid multi-stage processes can be carried out in various reactor vessel configurations known to those skilled the art. Such may include moving beds, rotating wheel configurations, simulated moving beds, and such.

In view of the disclosure of the process and compositions described for $CO_2$ adsorption and desorption, several process configurations can be constructed that capitalize on several advantages that the process describes.

Figure 2:
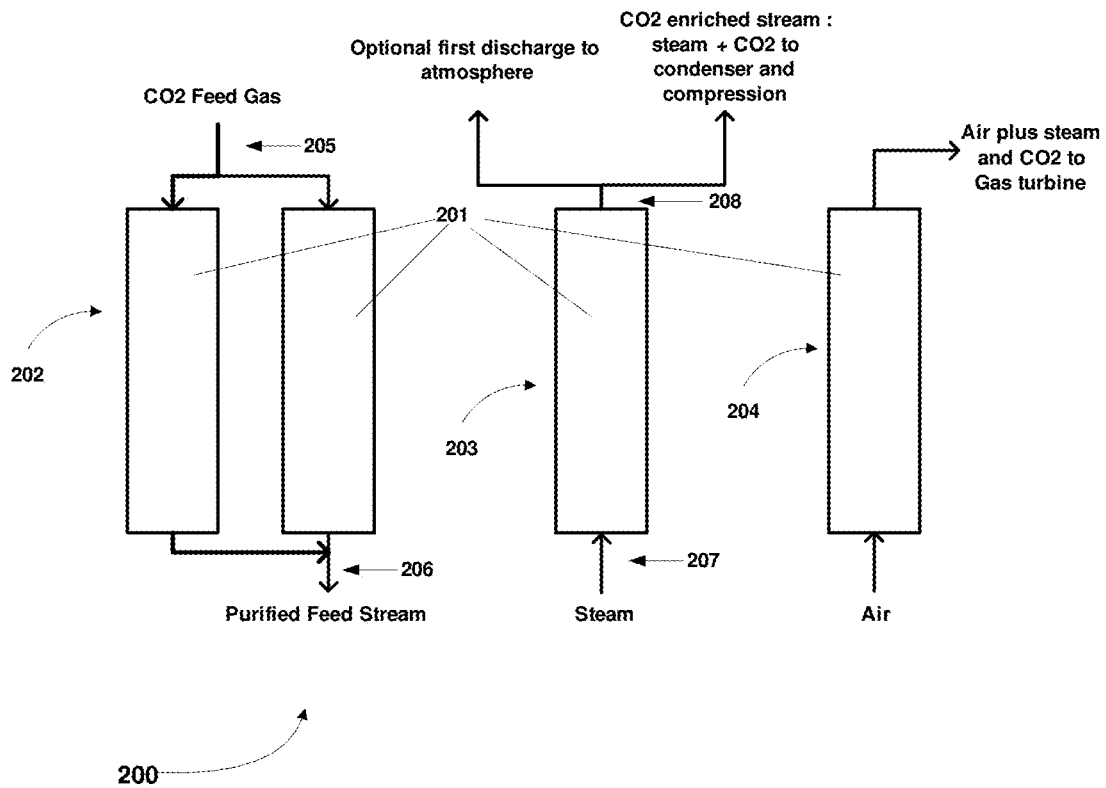
FIG. 2 illustrates a representation of a $CO_2$ separation system in accordance with an exemplary embodiment of the disclosure.
Figure 3A:
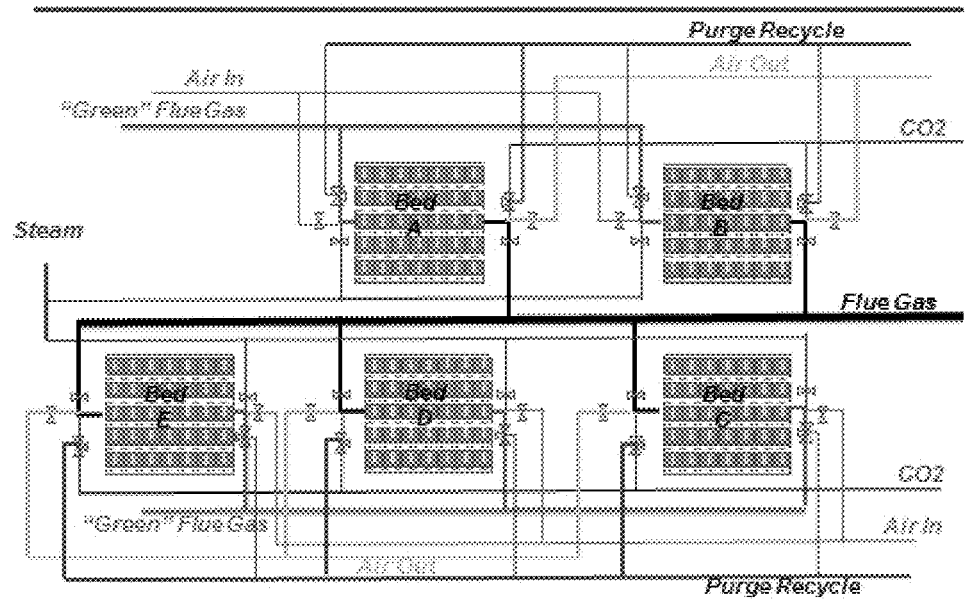
FIGS. 3A through 3F illustrate a five-bed simulated moving bed system and associated valve positions, in accordance with an exemplary embodiment of the disclosure.
Figure 3B:
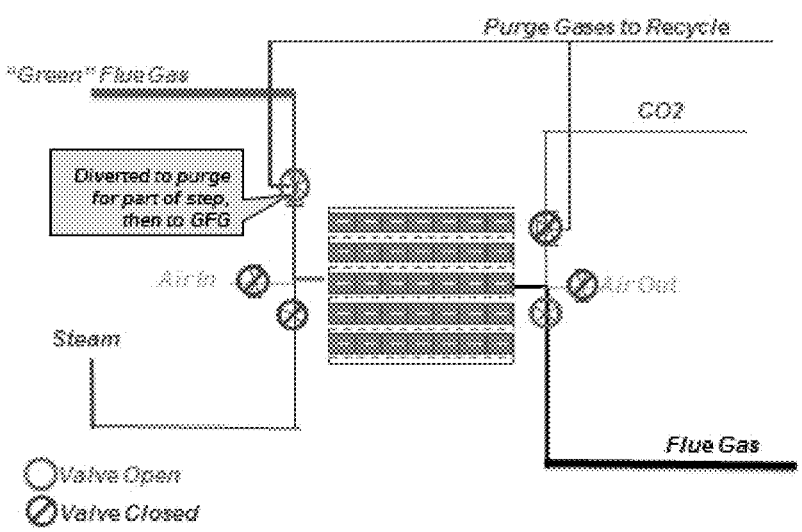
Figure 3C:
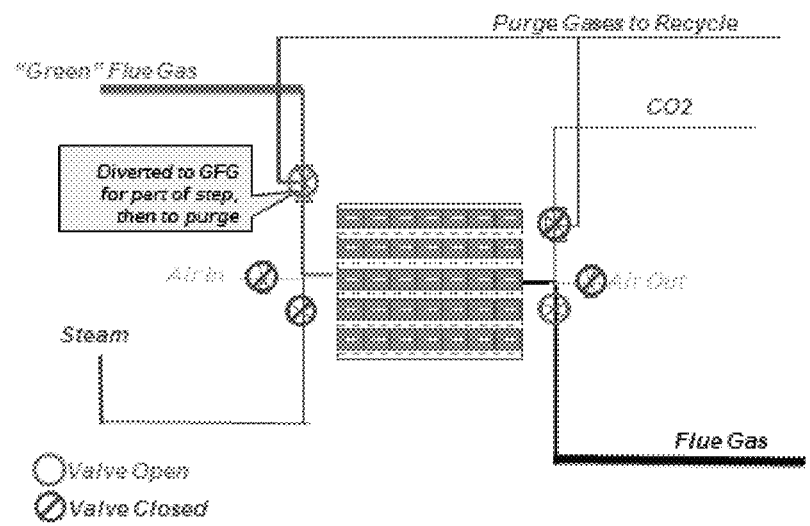
Figure 3D:
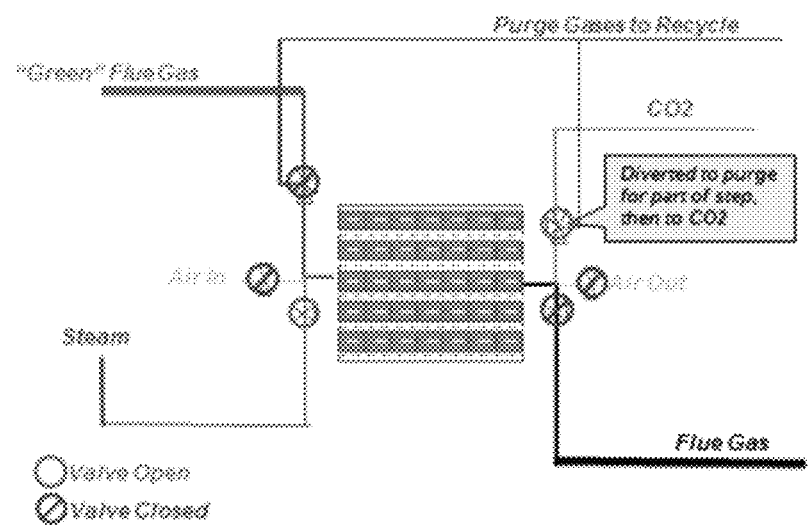
Figure 3E:
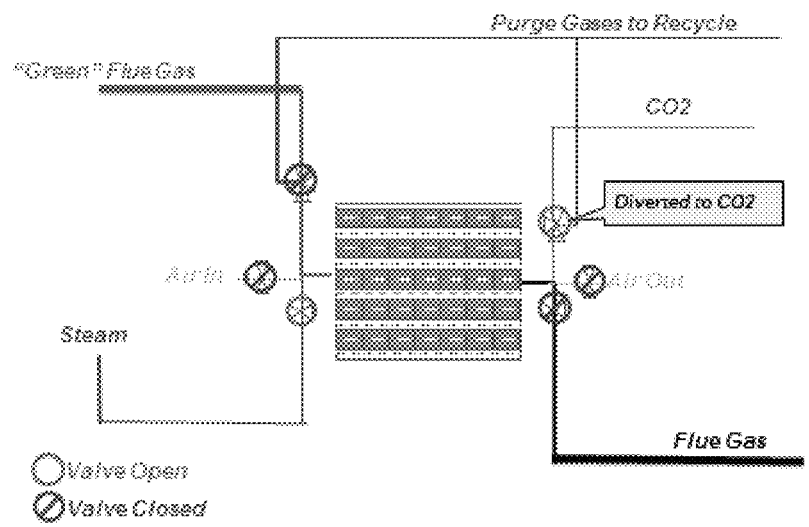
Figure 3F:
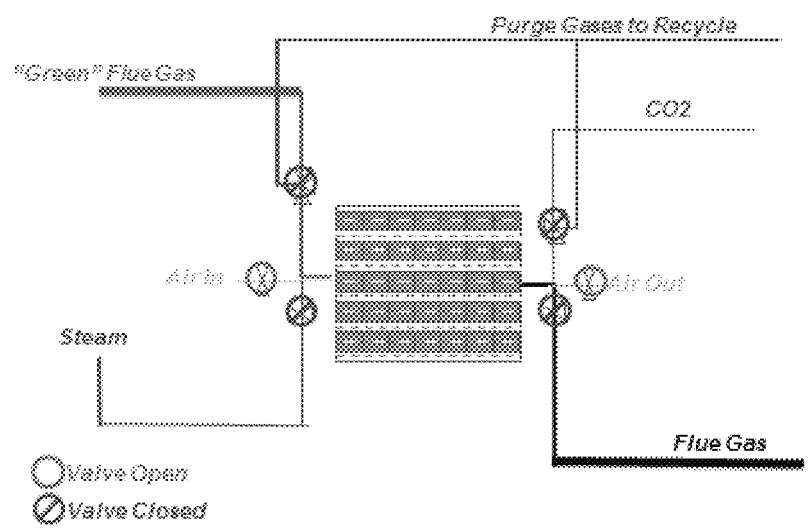
Figure 4A:
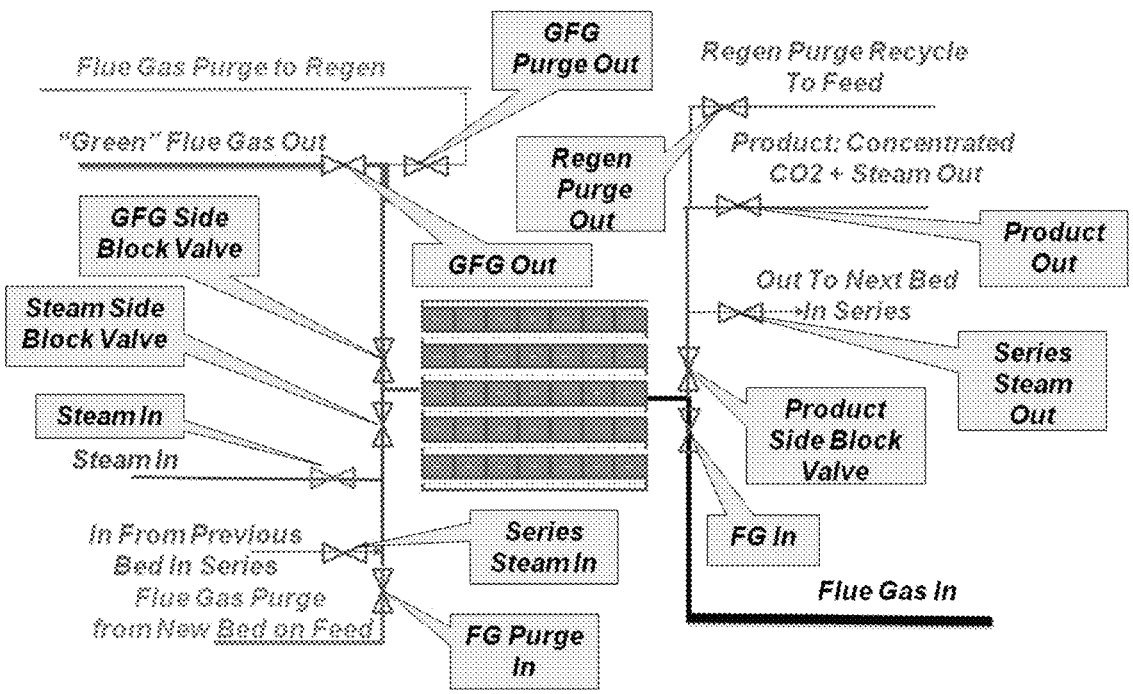
FIGS. 4A through 4F illustrate another five-bed simulated moving bed system and associated valve positions, in accordance with an exemplary embodiment of the disclosure.
Figure 4B:
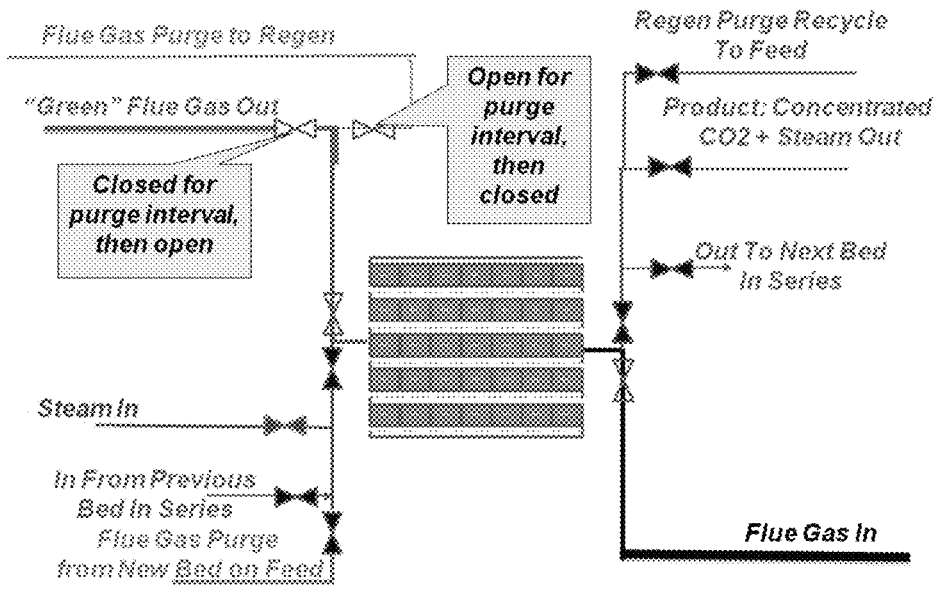
Figure 4C:
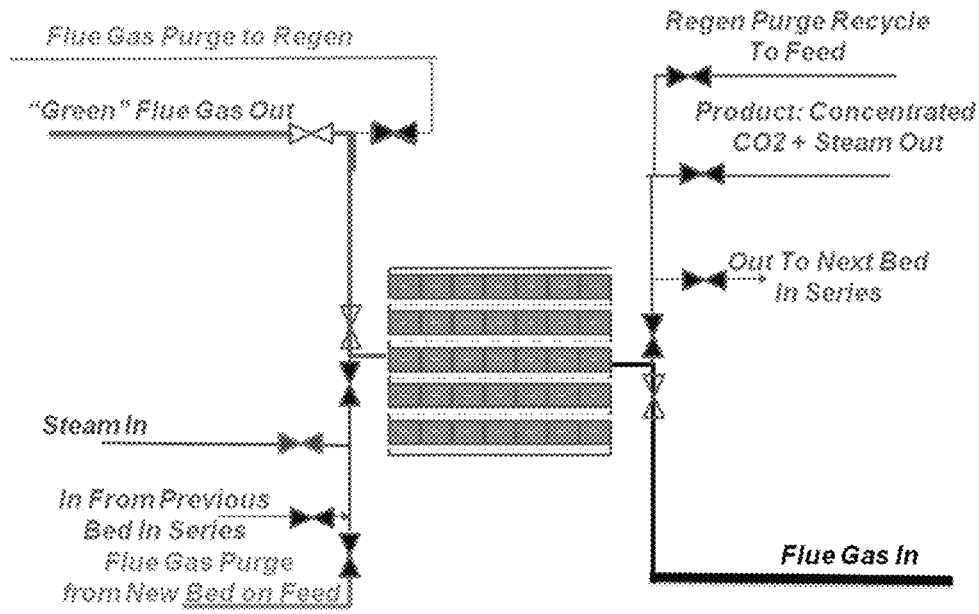
Figure 4D:
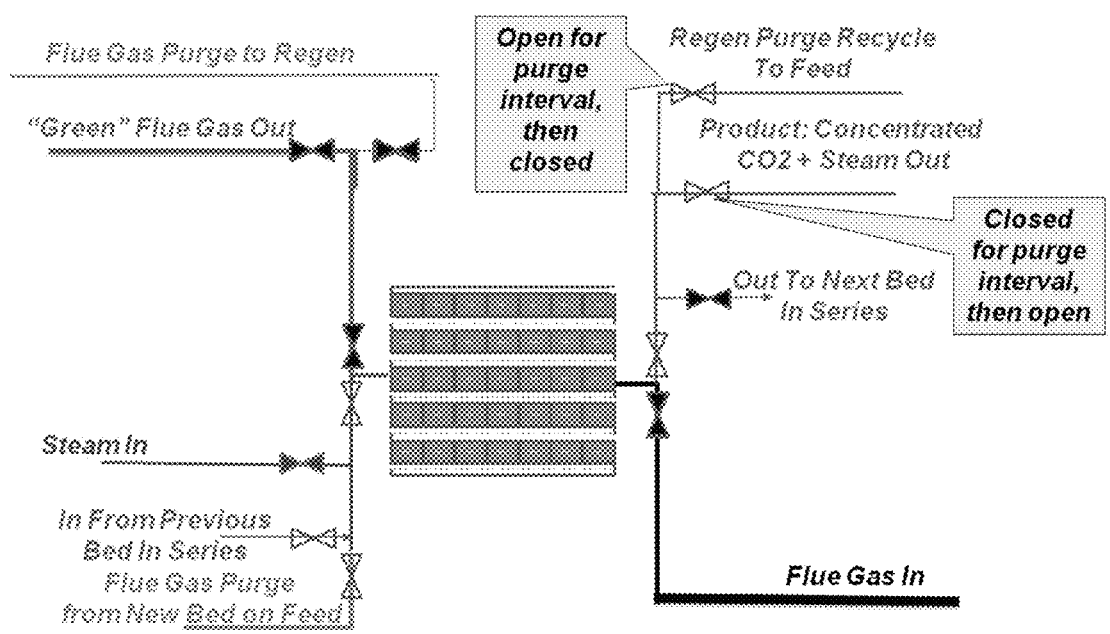
Figure 4E:
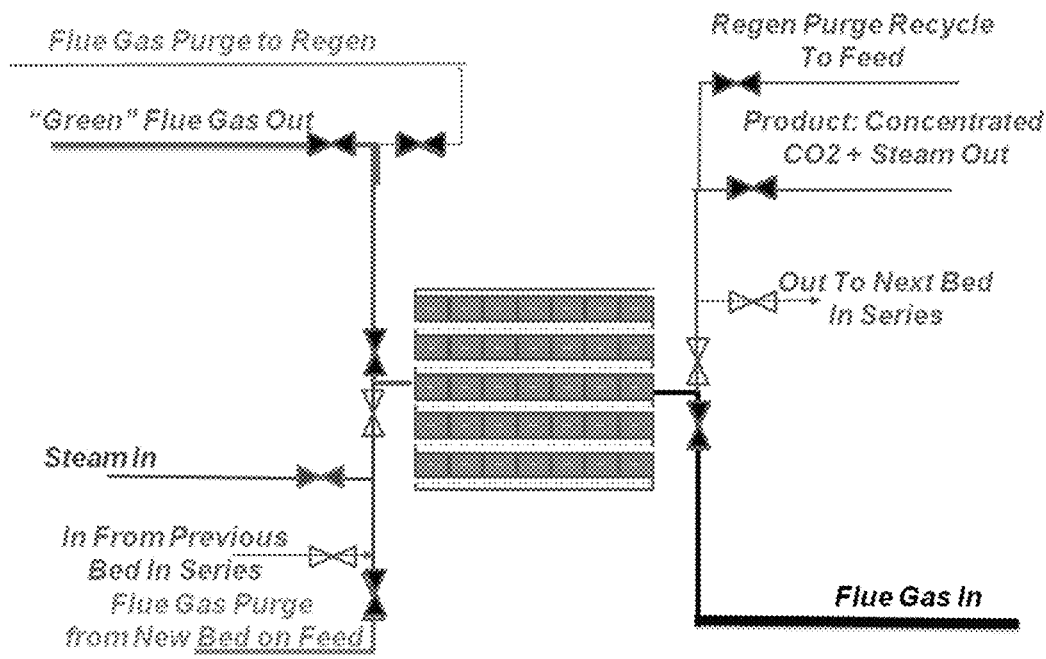
Figure 4F:
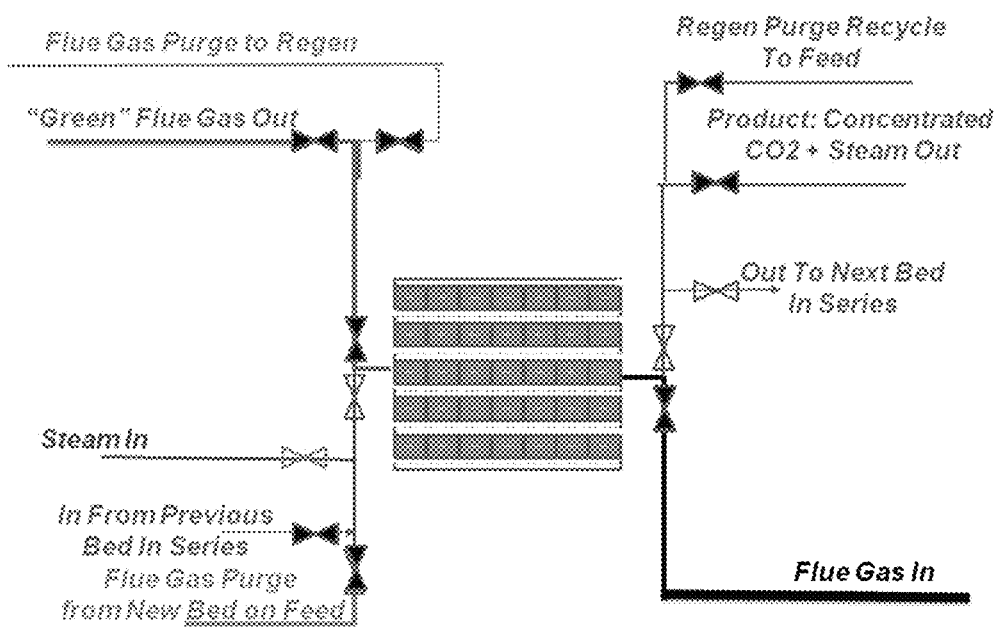

A basic $CO_2$ separation system, 200, optionally called Capture, Displace, Strip (CDS), is shown schematically in FIG. 2. The $CO_2$ separation system can include can include one or more sorbent beds 201, which is capable of adsorbing and desorbing $CO_2$. The $CO_2$ separation system can include an adsorption zone 202, a $CO_2$ desorption zone 203, and optionally a purging stage 204. In the $CO_2$ separation system, the sorbent bed or beds 201 can rotate through each of the stages 202, 203, and optionally 204. In the system, $CO_2$ from a $CO_2$ feed stream, e.g. a flue gas, is passed across a sorbent bed, in this case two sorbent beds run staggered in time. The use of multiple beds on feed can be done as a way to manage pressure drop, but a single bed per stage is also disclosed. The $CO_2$ is adsorbed from a $CO_2$ feed stream. As shown in FIG. 1, the adsorption zone can also include an adsorbent inlet 205 into which the $CO_2$ feed stream enters, and an adsorbent stage outlet 206, from which a purified feed stream, which has been depleted or purified of $CO_2$, exits. A next step in the cycle can be to introduce steam for regeneration in the desorption zone 203 (or alternatively a regeneration zone.) As previously described, the initial effluent upon steam introduction can be primarily comprised of void gases. These gases can be diverted as shown to the atmosphere, or optionally recycled to the feed gas. At a point in the steam regeneration the effluent would be diverted to further $CO_2$ purification and compression. Thus, steam can enter the desorption zone 203 via desorption inlet 207, and the effluent gas can exit the desorption zone 203 via desorption outlet 208. One of ordinary skill would recognize that a valve, not shown, can divert the outlet gas to either route, depending on if it is void gas via the optional discharge or the $CO_2$ enriched stream. Following the discharge of the high concentration $CO_2$ effluent portion of the regeneration, rather than the continued use of steam to further partial pressure strip the residual $CO_2$ from the bed, an optional purging stage 204 can be incorporated to strip the bed with, for example, ambient air. The effluent from this stripping can be advantageously used in a power generation environment to be used as a portion of the combustion air. As would be apparent to those skilled in the art, multiple simultaneous or sequential beds can be used at each step. Indeed, having several beds, staggered in time in the steam regeneration step would have the beneficial effect of smoothing the flow rate to the $CO_2$ compression step.

Thus, an embodiment of the disclosure includes a $CO_2$ separation system that includes a $CO_2$ adsorption zone, a $CO_2$ desorption zone, one or more $CO_2$ sorbent beds, and a $CO_2$ feed stream. The sorbent bed can alternate between the adsorption zone and the desorption zone, and can adsorb $CO_2$ from the $CO_2$ feed stream in the adsorption zone and desorb $CO_2$ in the desorption zone. The system can include an inlet and an outlet for the adsorption zone where the $CO_2$ feed stream enters the adsorption zone via the inlet and a purified feed stream exits the adsorption zone via the outlet. The system can also include an inlet and an outlet for the desorption zone, wherein a stream comprising steam enters the desorption zone via the inlet and a $CO_2$ enriched stream exits via the outlet. As exemplified by FIG. 2, the system can also include a purging stage after the desorption zone, wherein the sorbent bed enters the purge stage and is purged via a stripping gas stream.

The system can include more than one sorbent bed, including at least two sorbent beds, at least three sorbent beds, at least four sorbent beds, at least five sorbent beds, at least six or more sorbent beds. The sorbent beds can rotate through each of the adsorption zone, desorption zone, and optionally though a purge stage after the desorption zone. The sorbent beds can include a sorbent, and the sorbent can include a substrate and at least one alkali or alkaline earth component. As noted above, the sorbent can be an alumina component and at least one alkali or alkaline earth component.

As discussed above, the $CO_2$ separation system does not rely on a pressure swing or a temperature swing adsorption process, but can be driven by concentration swing adsorption/desorption and adsorptive/desorptive displacement. The adsorption zone operates as a concentration swing process and adsorptive displacement process, and the desorption zone operates as a concentration swing and desorptive displacement process. The entire system can be run isothermally and at a constant pressure.

As shown in FIG. 2, the adsorption inlet the adsorption inlet and adsorption outlet can be in opposing positions from the desorption inlet and the desorption outlet, relative to the sorbent bed as the bed rotates through the zones.

In an embodiment of the disclosure, the processes, methods and systems can be developed into a simulated moving bed system, in which sorbent beds are stationary, but the flow of gas into and out of the sorbent beds is scheduled such that a simulated moving bed system is created. By way of example, a five bed simulated moving bed schematic is set forth in FIGS. 3A to 3F. Thus, a countercurrent movement of gas and solids can be simulated using a number of stationary contactors with appropriate arrangement of valves and valve timing.

A feature of this counter-flow design is that, as the gas travels through the sorbent, it encounters fresher (more recently desorbed) sorbent. At the exit of the reactor the gas stream is in contact with sorbent that has just come from the regeneration mode. This counter current design can provide a driving force to capture a higher percentage of the component gas of interest. This disclosure can then increase the loading with a sorbent whose loading level is controlled by the concentration gradient. For example, sorbents can adsorb more $CO_2$ at higher concentrations and less at low concentrations. A counter-flow design maximizes the loading by having the sorbent in contact with fresh gas stream (with the highest gas concentration) just prior to going to regeneration mode.

For this disclosure, a configuration of simulated moving beds can employ a number of stationary contactors. At any one time, some of the contactors can have combustion gas flowing simultaneously in parallel while the other contactors can be exposed to steam flowing in series in the direction opposite to that used for the combustion gas. At intervals, valves are opened and closed to move the relative positions of the contactors one step so that the contactor exposed to combustion gas the longest is now being steamed, and the contactor steamed the longest is now exposed to combustion gas. A series of such steps comprises a complete cycle bringing the contactors back to their starting positions. An example using 8 contactors is shown in FIGS. 4A to 4F. There are 5 different valve positions (shown in Table 1) for a bed, depending on where that bed is in the cycle. The overall cycle comprises 8 steps. The valve pattern for each bed in each step is described in Table 2.

TABLE 1

| Valve Name (FIG. 4A) | A (FIG. 4B) | B (FIG. 4C) | C (FIG. 4D) | D (FIG. 4E) | E (FIG. 4F) |
|---|---|---|---|---|---|
| FG Purge In | Closed | Closed | Open | Closed | Closed |
| Series Steam In | Closed | Closed | Open | Open | Closed |
| Steam In | Closed | Closed | Closed | Closed | Open |
| Steam Side Block Valve | Closed | Closed | Open | Open | Open |
| GFG Side Block Valve | Open | Open | Closed | Closed | Closed |
| GFG Out | C then O | Open | Closed | Closed | Closed |
| GFG Purge Out | O then C | Closed | Closed | Closed | Closed |
| Regen Purge Out | Closed | Closed | O then C | Closed | Closed |
| Product Out | Closed | Closed | C then O | Closed | Closed |
| Series Steam Out | Closed | Closed | Closed | Open | Open |
| Product Side Block Valve | Closed | Closed | Open | Closed | Closed |
| FG In | Open | Open | Closed | Closed | Closed |

TABLE 2

| Bed Number | Valve Position Patterns versus Step Number Step Number | | | | | | | |
|---|---|---|---|---|---|---|---|---|
| | I | II | III | IV | V | VI | VII | VIII |
| 1 | A | B | B | C | D | D | D | E |
| 2 | B | B | C | D | D | D | E | A |
| 3 | B | C | D | D | D | E | A | B |
| 4 | C | D | D | D | E | A | B | B |
| 5 | D | D | D | E | A | B | B | C |
| 6 | D | D | E | A | B | B | C | D |
| 7 | D | E | A | B | B | C | D | D |
| 8 | E | A | B | B | C | D | D | D |

Figure 5A:
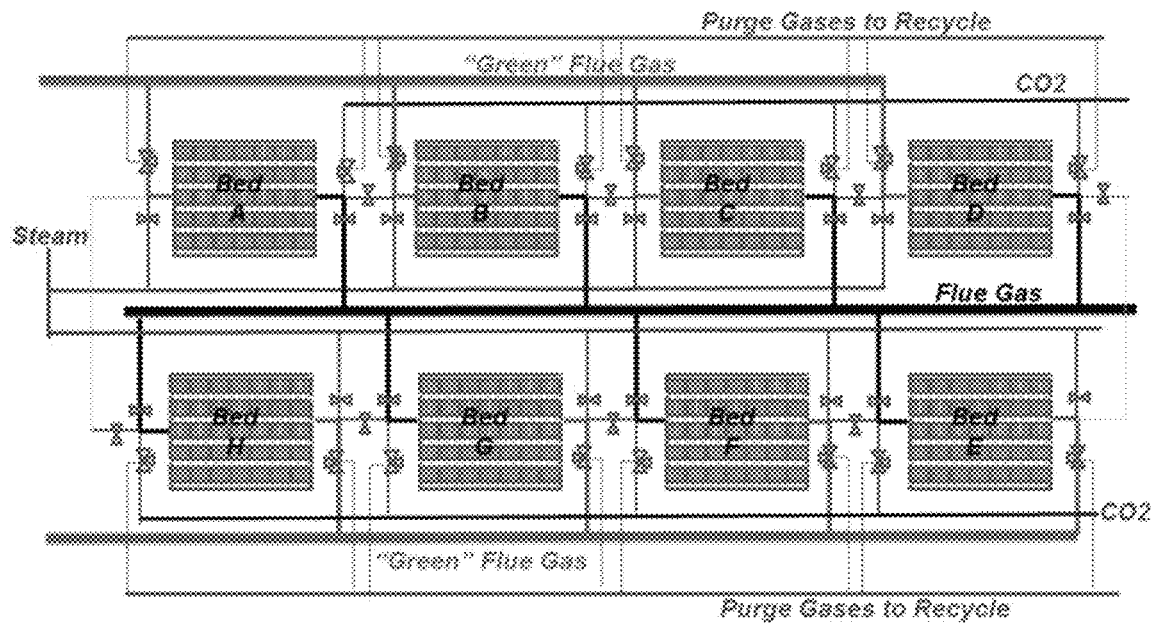
FIGS. 5A and 5B illustrate an eight-bed simulated moving bed system, in accordance with an exemplary embodiment of the disclosure.
Figure 5B:
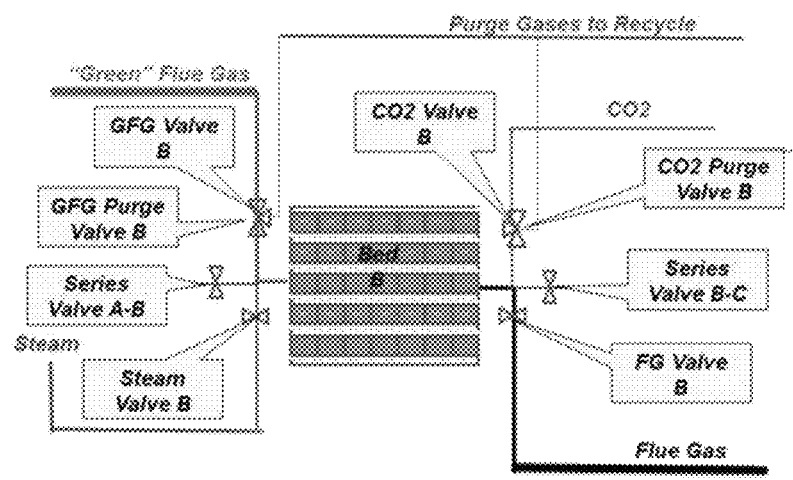

Another example using eight contactors with three on combustion gas and five on steam is illustrated in FIG. 5A, and a representative valve listing is in FIG. 5B. The valve schedule is then set forth in Table 3. An example of an 8 bed process is set forth in Example 8, below.

TABLE 3

Valve Opening and Closing Timing for 8-Bed configuration of FIG. 5A and 5B

| | | Step Number in 8-Step Cycle | | | | | | | |
|---|---|---|---|---|---|---|---|---|---|
| | | 1 | 2 | 3 | 4 | 5 | 6 | 7 | 8 |
| Bed A | FG valve A | OPEN | CLOSED | CLOSED | CLOSED | CLOSED | CLOSED | OPEN | OPEN |
| | GFG valve A | OPEN | CLOSED | CLOSED | CLOSED | CLOSED | CLOSED | O, THEN C | OPEN |
| | GFG purge valve A | CLOSED | CLOSED | CLOSED | CLOSED | CLOSED | CLOSED | O, THEN C | OPEN |
| | Steam valve A | CLOSED | CLOSED | CLOSED | CLOSED | CLOSED | CLOSED | CLOSED | CLOSED |
| | CO2 valve A | CLOSED | C, THEN O | CLOSED | CLOSED | CLOSED | CLOSED | CLOSED | CLOSED |
| | CO2 purge valve A | CLOSED | O, THEN C | CLOSED | CLOSED | CLOSED | CLOSED | CLOSED | CLOSED |
| | Series valve A-B | CLOSED | CLOSED | OPEN | OPEN | OPEN | OPEN | CLOSED | CLOSED |
| Bed B | FG valve B | OPEN | OPEN | CLOSED | CLOSED | CLOSED | CLOSED | CLOSED | OPEN |
| | GFG valve B | OPEN | OPEN | CLOSED | CLOSED | CLOSED | CLOSED | CLOSED | C, THEN O |
| | GFG purge valve B | CLOSED | CLOSED | CLOSED | CLOSED | CLOSED | CLOSED | CLOSED | O, THEN C |
| | Steam valve B | CLOSED | CLOSED | CLOSED | CLOSED | CLOSED | CLOSED | OPEN | CLOSED |
| | CO2 valve B | CLOSED | CLOSED | C, THEN O | CLOSED | CLOSED | CLOSED | CLOSED | CLOSED |
| | CO2 purge valve B | CLOSED | CLOSED | O, THEN C | CLOSED | CLOSED | CLOSED | CLOSED | CLOSED |
| | Series valve B-C | CLOSED | CLOSED | CLOSED | OPEN | OPEN | OPEN | OPEN | CLOSED |
| Bed C | FG valve C | OPEN | OPEN | OPEN | CLOSED | CLOSED | CLOSED | CLOSED | CLOSED |
| | GFG valve C | C, THEN O | OPEN | OPEN | CLOSED | CLOSED | CLOSED | CLOSED | CLOSED |
| | GFG purge valve C | O, THEN C | CLOSED | CLOSED | CLOSED | CLOSED | CLOSED | CLOSED | CLOSED |
| | Steam valve C | CLOSED | CLOSED | CLOSED | CLOSED | CLOSED | CLOSED | CLOSED | OPEN |
| | CO2 valve C | CLOSED | CLOSED | CLOSED | CLOSED | CLOSED | CLOSED | CLOSED | CLOSED |
| | CO2 purge valve C | CLOSED | CLOSED | CLOSED | CLOSED | CLOSED | CLOSED | CLOSED | CLOSED |
| | Series valve C-D | CLOSED | CLOSED | CLOSED | CLOSED | OPEN | OPEN | OPEN | OPEN |
| Bed D | FG valve D | CLOSED | OPEN | OPEN | OPEN | CLOSED | CLOSED | CLOSED | CLOSED |
| | GFG valve D | CLOSED | C, THEN O | OPEN | OPEN | CLOSED | CLOSED | CLOSED | CLOSED |
| | GFG purge valve D | CLOSED | O, THEN C | CLOSED | CLOSED | CLOSED | CLOSED | CLOSED | CLOSED |
| | Steam valve D | OPEN | CLOSED | CLOSED | CLOSED | CLOSED | CLOSED | CLOSED | CLOSED |
| | CO2 valve D | CLOSED | CLOSED | CLOSED | CLOSED | C, THEN O | CLOSED | CLOSED | CLOSED |
| | CO2 purge valve D | CLOSED | CLOSED | CLOSED | CLOSED | O, THEN C | CLOSED | CLOSED | CLOSED |
| | Series valve D-E | OPEN | CLOSED | CLOSED | CLOSED | CLOSED | OPEN | OPEN | OPEN |
| Bed E | FG valve E | CLOSED | CLOSED | OPEN | OPEN | OPEN | CLOSED | CLOSED | CLOSED |
| | GFG valve E | CLOSED | CLOSED | C, THEN O | OPEN | OPEN | CLOSED | CLOSED | CLOSED |
| | GFG purge valve E | CLOSED | CLOSED | O, THEN C | CLOSED | CLOSED | CLOSED | CLOSED | CLOSED |
| | Steam valve E | CLOSED | OPEN | CLOSED | CLOSED | CLOSED | CLOSED | CLOSED | CLOSED |
| | CO2 valve E | CLOSED | CLOSED | CLOSED | CLOSED | CLOSED | C, THEN O | CLOSED | CLOSED |

TABLE 3-continued

Valve Opening and Closing Timing for 8-Bed configuration of FIG. 5A and 5B

| | | Step Number in 8-Step Cycle | | | | | | | |
|---|---|---|---|---|---|---|---|---|---|
| | | 1 | 2 | 3 | 4 | 5 | 6 | 7 | 8 |
| | CO2 purge valve E | CLOSED | CLOSED | CLOSED | CLOSED | CLOSED | O, THEN C | CLOSED | CLOSED |
| | Series valve E-F | OPEN | OPEN | CLOSED | CLOSED | CLOSED | CLOSED | OPEN | OPEN |
| Bed F | FG valve F | CLOSED | CLOSED | CLOSED | OPEN | OPEN | OPEN | CLOSED | CLOSED |
| | GFG valve F | CLOSED | CLOSED | CLOSED | C, THEN O | OPEN | OPEN | CLOSED | CLOSED |
| | GFG purge valve F | CLOSED | CLOSED | CLOSED | O, THEN C | CLOSED | CLOSED | CLOSED | CLOSED |
| | Steam valve F | CLOSED | CLOSED | OPEN | CLOSED | CLOSED | CLOSED | CLOSED | CLOSED |
| | CO2 valve F | CLOSED | CLOSED | CLOSED | CLOSED | CLOSED | CLOSE | C, THEN O | CLOSED |
| | CO2 purge valve F | CLOSED | CLOSED | CLOSED | CLOSED | CLOSED | CLOSED | O, THEN C | CLOSED |
| | Series valve F-G | OPEN | OPEN | OPEN | CLOSED | CLOSED | CLOSED | CLOSED | OPEN |
| Bed G | FG valve G | CLOSED | CLOSED | CLOSED | CLOSED | OPEN | OPEN | OPEN | CLOSED |
| | GFG valve G | CLOSED | CLOSED | CLOSED | CLOSED | C, THEN O | OPEN | OPEN | CLOSED |
| | GFG purge valve G | CLOSED | CLOSED | CLOSED | CLOSED | O, THEN C | CLOSED | CLOSED | CLOSED |
| | Steam valve G | CLOSED | CLOSED | CLOSED | OPEN | CLOSED | CLOSED | CLOSED | CLOSED |
| | CO2 valve G | CLOSED | CLOSED | CLOSED | CLOSED | CLOSED | CLOSED | CLOSED | C, THEN O |
| | CO2 purge valve G | CLOSED | CLOSED | CLOSED | CLOSED | CLOSED | CLOSED | CLOSED | O, THEN C |
| | Series valve G-H | OPEN | OPEN | OPEN | OPEN | CLOSOED | CLOSED | CLOSED | CLOSED |
| Bed H | FG valve H | CLOSED | CLOSED | CLOSED | CLOSED | CLOSED | OPEN | OPEN | OPEN |
| | GFG valve H | CLOSED | CLOSED | CLOSED | CLOSED | CLOSED | C, THEN O | OPEN | OPEN |
| | GFG purge valve H | CLOSED | CLOSED | CLOSED | CLOSED | CLOSED | O, THEN C | CLOSED | CLOSED |
| | Steam valve H | CLOSED | CLOSED | CLOSED | CLOSED | OPEN | CLOSED | CLOSED | CLOSED |
| | CO2 valve H | C, THEN O | CLOSED | CLOSED | CLOSED | CLOSED | CLOSED | CLOSED | CLOSED |
| | CO2 purge valve H | O, THEN C | CLOSED | CLOSED | CLOSED | CLOSED | CLOSED | CLOSED | CLOSED |
| | Series valve H-A | CLOSED | OPEN | OPEN | OPEN | OPEN | CLOSED | CLOSED | CLOSED |

Figure 6:
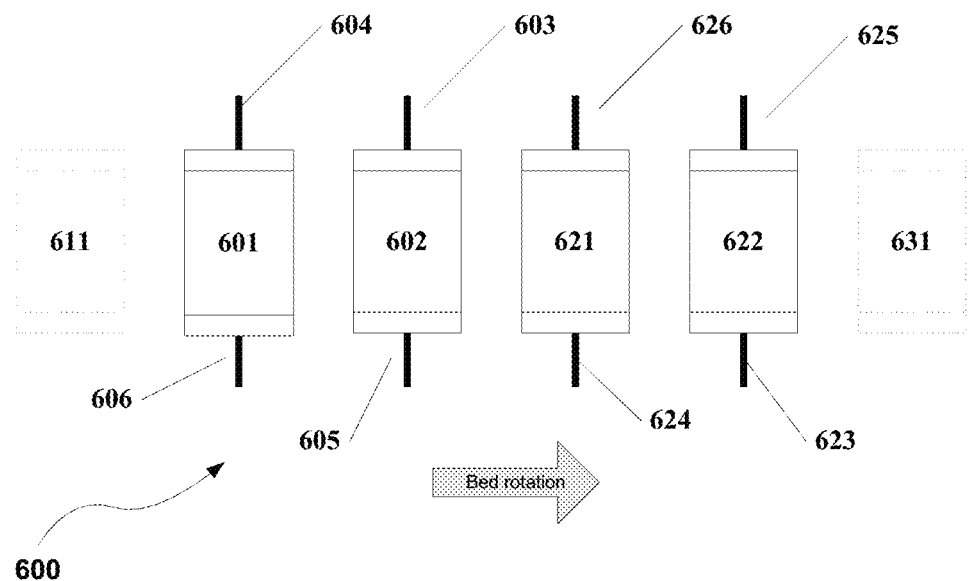
FIG. 6 illustrates a simulated moving bed system, in accordance with an exemplary embodiment of the disclosure.

The simulated moving beds of this disclosure can also be described by the FIG. 6 and the discussion herein. A simulated moving bed system 600 can be a series of fixed sorbent beds (not shown) which "rotate" through several adsorption positions, such as 601, 602, and 611 and several desorption positions, such as 621, 622, and 631. These fixed beds rotate through each of the positions via a series of valves and lines that interconnect each of the beds, and the advancement of the bed through the adsorption and desorption positions and the flow of gases across those beds can be controlled in such a fashion that the fixed beds become part of a simulated moving bed system.

In the simulated moving bed system 600, a sorbent bed can move through the first adsorption position 601, having a second $CO_2$ feed stream 604 and a second $CO_2$-depleted stream 606, to a second adsorption position 602, having a first $CO_2$ feed stream 603 and a first $CO_2$-depleted stream 605. The first and second adsorption positions are designated as such because that can typically be the order in which the bed progresses through them. The first adsorption position can have the second $CO_2$ feed stream and the second $CO_2$ depleted stream, while the second adsorption position can have the first feed and first depleted streams. The designation of first and second in this instance should not be viewed as a restrictive order for the feeds or streams, but instead as a numerical designation. In some embodiments, the gas streams in the adsorption zone, which would include the first and second adsorption positions, can flow in series such that a first $CO_2$ feed stream 603 enters the second adsorption position 602, and a first $CO_2$-depleted stream 605 from the second position could be transferred via lines and valves to become the second $CO_2$ feed stream 604 that enters the first adsorption position 601 and exits as the second $CO_2$-depleted stream, 606. Such an order can have a countercurrent effect that allows the higher concentration of feed gas to enter the more saturated bed in the second position, and then flow to the less saturated bed in the first position. In this case the bed positions advance in the opposite direction of the gas flow. However, in another embodiment, the two adsorption positions can be run in parallel with the first and second feed streams 603 and 604 coming from a common source, i.e. a flue gas, with each bed receiving the same concentration of $CO_2$ in the feed gas. The resulting $CO_2$-depleted streams 605 and 606 can then be combined to form a final depleted gas stream which can be sent to other processes or released via, for example, a flue stack.

After the second adsorption position 602, the sorbent bed can move into the desorption zone, also called the regeneration zone. The sorbent bed can enter the first desorption position 621, having a second regeneration stream 624 and a second $CO_2$-enriched stream 626, then move on to the second desorption position 622, having a first regeneration stream 623 and a first $CO_2$-enriched stream 625. As in the adsorption zone, the designation of first and second desorption position can indicate how the bed progresses through the regeneration system. The first desorption position can have the second regeneration stream and the second $CO_2$-enriched stream, while the second adsorption position can have has the first regeneration feed and first $CO_2$-enriched streams. The designation of first and second in this instance should not be viewed as a restrictive order for the feeds or streams, but instead as a numerical designation. In some embodiments, the gas streams in the desorption zone, which would include the first and second desorption positions, can flow in series such that the first $CO_2$-enriched stream 625 exits the second desorption position 622 enters the first desorption 621 as the second regeneration stream 624. Similarly, the regeneration positions could also be operated in parallel.

While the structures in FIG. 6 show two adsorption positions and two desorption positions, the disclosure herein should not be limited to only a four position system. The simulated moving bed system can also include additional beds, such as the additional earlier bed 611 on the adsorption side, and additional later position 631 on the desorption side. Here, the terms earlier and later are determined based on the timing of the progression of the beds through the system. In a non-limiting example, a sorbent bed could start at adsorption position 611, then proceed to adsorption positions 601 and 602, then onto the desorption positions 621, 622 and 631, before returning to adsorption position 611. Alternatively, bed 611 might instead represent a purge position, such that the bed would start at adsorption position 601, then proceed to adsorption position 602, then onto the desorption positions 621, 622 and 631, move through a purge position 611, and then return to the first adsorption position 601. The simulated moving bed system can include 3 positions, 4 positions, 5 positions, 6 positions, 7, positions, 8 positions, 9 positions, or ten or more positions.

In view of the discussion of simulated moving beds and systems discussed above, a method for separating and/or purifying a $CO_2$ gas from a $CO_2$ feed can be described. In an embodiment, the method for the separation and/or purification of $CO_2$ gas from a $CO_2$ feed stream can include providing at least two adsorption positions and two desorption positions, and at least two fixed sorbent beds that progress through the adsorption and desorption positions. The first adsorption position can have a second $CO_2$ stream and produce a second $CO_2$-depleted stream, and the second adsorption position can have a first $CO_2$ stream and can produce a first $CO_2$-depleted stream. The first desorption position can have a second regeneration stream and can produce a second $CO_2$-enriched stream, and the second desorption position can have a first regeneration stream and can produce a first $CO_2$-enriched stream. Each sorbent bed can have a sorbent, a first port at an end of the bed and a second port at an end of the bed distal to the first port.

The first step of the method can include exposing the first sorbent bed to a second $CO_2$ stream at a first adsorption position, and the second sorbent bed to a first $CO_2$ steam at the second adsorption position. The second step can include exposing the first sorbent bed to the first $CO_2$ stream at the second sorbent position and the second sorbent bed to the second regeneration stream at a first desorption position. The third step can include exposing the first sorbent bed to the second regeneration stream at the first desorption position and the second sorbent bed to a first regeneration stream at a second regeneration position. And, an optional fourth step can include exposing the second sorbent bed to the second $CO_2$ stream at the first adsorption position and the first sorbent bed to the first regeneration stream at the second desorption. The fourth step can instead include advancing the beds through downstream desorption positions until each sorbent bed returns to the beginning of the adsorption zone.

As discussed previously, the method can be conducted at substantially constant temperature and substantially constant pressure with neither a temperature swing nor pressure swing. In an embodiment, the regeneration streams comprise steam, or can be a steam stream.

In a further embodiment, the method can include providing a system of valves and lines connecting at least two fixed sorbent beds such that a bed advances from a first adsorption position to a second adsorption position to a first desorption position to the second desorption position, and optionally back to the first adsorption position.

As noted previously, and as shown in some of the non-limiting valve schedules shown above, the two or more adsorption positions can be run in parallel. In an embodiment, the $CO_2$-feed stream can be directed into both the first $CO_2$ stream of the second adsorption position and the second $CO_2$ stream of the first adsorption position such that the two adsorption positions operate in parallel. The first and the second $CO_2$ depleted streams from the second and first adsorption positions can also be combined together for collection or additional processing. In an alternate embodiment, the two or more adsorption positions can be run in series. Thus the first $CO_2$-depleted stream from the second adsorption bed can b used as the second $CO_2$ stream in the first adsorption position such that the two adsorption positions operate in series, and the second $CO_2$-depleted stream is collected.

When a new sorbent bed assumes a first adsorption position, it can have an initial void gas, such as a residual steam stream after exiting the desorption/regeneration stage. In one embodiment, the effluent from the sorbent bed can be diverted to a purging stage. In an alternative, the first adsorption position can include an optional purge. Thus, a first portion of the second $CO_2$ depleted stream from the first adsorption position can be diverted as a purge stream before switching to collection of the $CO_2$-depleted stream.

The purge stream can also be utilized as a part of the overall scheme as a recycled gas flow or alternate flow. In an embodiment, the stream, optionally a portion of the feed stream, can be introduced into a bed which just advanced out of the desorption zone, and the effluent from that bed can be directed to a bed which has just advanced out of the adsorption stage. A second effluent resulting from the bed which has just advanced out of the adsorption can be directed either to a stack or to be recycled within the system. A non-limiting example of this can be demonstrated in FIG. 35. In an embodiment, the purge steps can include introducing a separate stream, optionally a portion of the feed stream or a non-adsorbing gas, into a bed which just advanced out of the desorption zone, in order to push out the dead volume gas and adsorbed steam of this bed back into a desorption zone bed. A non-limiting example can be demonstrated in FIGS. 22 and 34.

In an embodiment of the disclosure, the desorption positions can be run in series. The first $CO_2$-enriched stream from the second desorption position can be used as the second regeneration stream in the first desorption position. In another embodiment, one or more desorption positions could be run outside of the series, such as one or more beds being run in parallel, such as to remove residual $CO_2$ feed gas for a recycle stream. In an embodiment, the beds can be desorbed in parallel, and the resulting streams combined or selectively diverted, depending on gas content of the parallel streams.

Another aspect of the disclosure can be that the gas flows in adsorption are conducted in one direction across the sorbent bed, but the regeneration can be advantageously conducted with flows in the opposite direction. In an embodiment the $CO_2$ streams enter each sorbent bed in the adsorption positions via the first port, and the $CO_2$-depleted stream exits via the second port. The regeneration streams enter each of the sorbent beds in the desorption positions via the second port, and the $CO_2$-enriched stream exits via the first port.

In view of the disclosure, a simulated moving bed system can be described. In an embodiment, the simulated moving bed system for $CO_2$ purification/separation can include a plurality of fixed sorbent beds, each sorbent bed comprising a sorbent, a first port at an end of the bed and a second port at an end of the bed distal to the first port; an adsorption zone and a desorption zone; and a series of valves and lines interconnecting each of the beds via the first and second ports; a $CO_2$ feed stream, a steam stream, a $CO_2$-depleted stream, and a $CO_2$-enriched stream, and one or more purge streams. The system operates under substantially constant pressure and constant temperature with neither temperature swing nor pressure swing When a bed is in an adsorption position, the first port of the bed can be connected to either the $CO_2$ feed stream or the second port of a another sorbent bed in the adsorption zone which is generating a $CO_2$ depleted stream. The second port of the bed can be either connected to a first port of another bed, to a purge line, or to a unit collecting the $CO_2$-depleted stream or optionally diverted to purge for a portion of time. Thus, the beds operating in an adsorption zone can operate in series.

In an alternate embodiment, when any bed is in an adsorption position, the first port is connected to the $CO_2$ feed stream and the second port is connected to a unit collecting the $CO_2$-depleted stream, and bed earliest in the adsorption zone optionally connected to a purge line. Thus, all the beds operating in an adsorption zone can operate in parallel.

In the desorption, the beds operating in the desorption zone can operate in series. The bed in the desorption zone longest receives an initial regeneration stream, typically a steam stream, and each bed can connected via a port to the bed next longest in the desorption zone. The bed earliest in the desorption zone can emit via a port the $CO_2$-enriched stream for collection or additional processing. When a bed is in a desorption position, the first port can be connected to the second port of another bed, and the second port can connected to the first port of another bed, with the exceptions that the second port of the bed longest in the desorption zone is connected to the steam stream, and the first port of the bed earliest in the desorption zone is connected to a unit for collecting the $CO_2$-enriched stream or optionally diverted to purge for a portion of time. In a specific embodiment, the purge steps can consist of introducing a separate stream, optionally a portion of the feed stream, into a bed which just advanced out of the desorption zone, and directing the effluent to a bed which has just advanced out of the adsorption zone; directing the ultimate effluent either to a stack or to be recycled within the system. In another specific embodiment, the purge steps can consist of introducing a separate stream, optionally a portion of the feed stream or a non-adsorbing gas, into a bed which just advanced out of the desorption zone, in order to push out the dead volume gas and adsorbed steam of this bed back into a desorption zone bed.

The fixed adsorbent beds in the simulated moving bed system can have any aspect ratio one of ordinary skill would include, where the aspect ratio is a measure of the length of the sorbent bed versus it width. In an embodiment, the aspect ratio should provide a superficial gas residence time (flow in volume per unit of time divided by bed cross-sectional area) of at least 5 seconds.

In a simulated moving bed system, the system can have several beds that alternate between an adsorption zone, a desorption zone, and optionally one or more purge zones. The ratio of beds operating in an adsorption zone can generally be equal to or less than the number of beds operating in a desorption or regeneration zone. In an embodiment, the ratio of beds in adsorption to desorption is between about 1:1 and 1:5, between about 1:1 and 1:4, between about 1:1 and 1:3, and between about 1:1 and 1:2.

Figure 7:
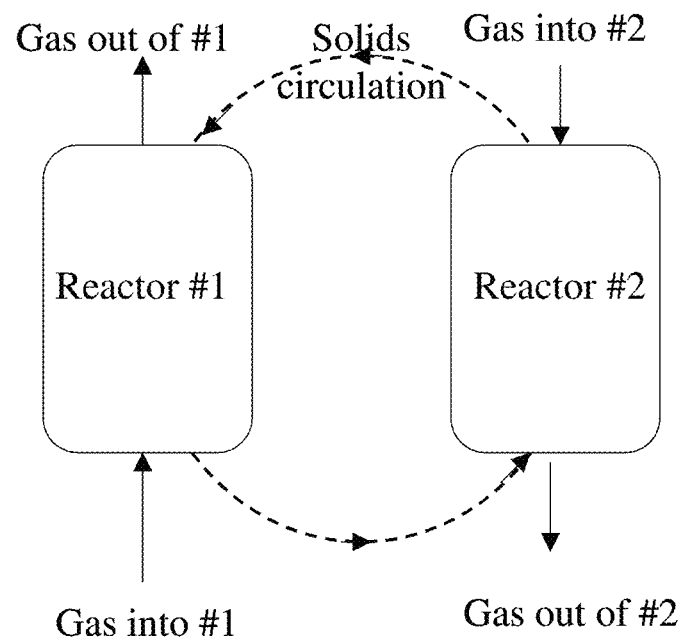
FIG. 7 illustrates a counter-flow moving bed design, in accordance with an exemplary embodiment of the disclosure.

An embodiment of the disclosure can also include a counter-flow moving adsorber in a reactor, where the sorbent moves vertically down with the gas flow vertical up. (FIG. 7). The gas stream flows up through the adsorber bed (Reactor #1) counter current to the sorbent pellets which fall vertically down through the bed. The sorbent pellets are circulated through to the regeneration bed and back to the adsorber bed. The sorbent can be transported by many mechanisms including pneumatic transport, screw conveyor and bucket elevator. Reactor #2, the regenerator, can be any moving bed design where the flow contact between the sorbents and gases is counter current. It can be a reactor where the sorbent is transported up as the gas flows down. In another embodiment, the regenerator can also be another vertical falling moving bed.

Figure 8:
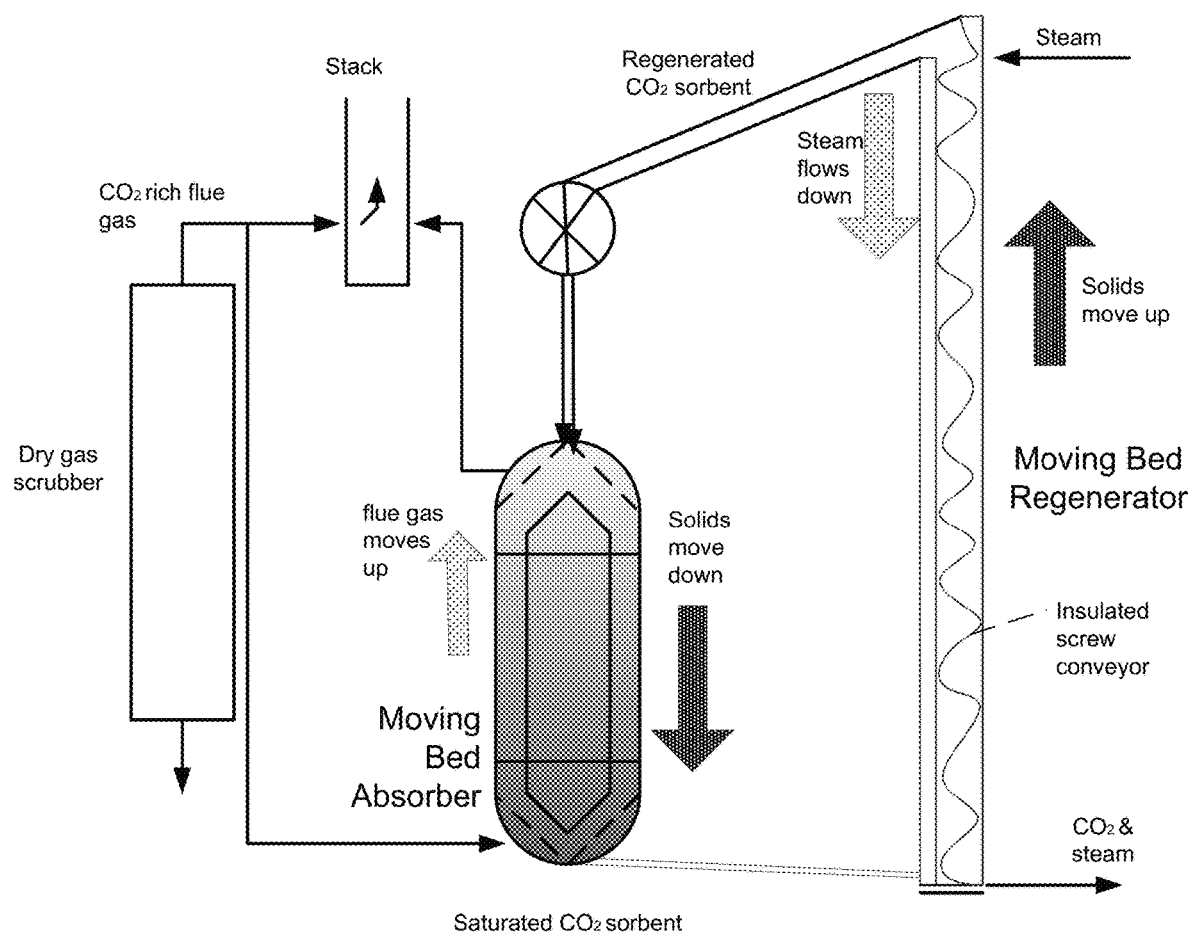
FIG. 8 illustrates another moving bed design, in accordance with an exemplary embodiment of the disclosure.

An embodiment of the disclosure can also include a vertical flowing moving bed, as illustrated in FIG. 8. The absorber bed design can be a vertical falling moving bed with an insulated screw conveyor belt to convey the solids through the steam stripper (regenerator). Flue gas can flow up through the adsorber bed counter current to the sorbent pellets which flows down. The solids can move up through the screw conveyor with the steam flowing down in counter flow to remove the absorbed $CO_2$. The screw conveyor could comprise of vertical, inclined, or horizontal conveyors and/or combinations thereof.

Figure 9:
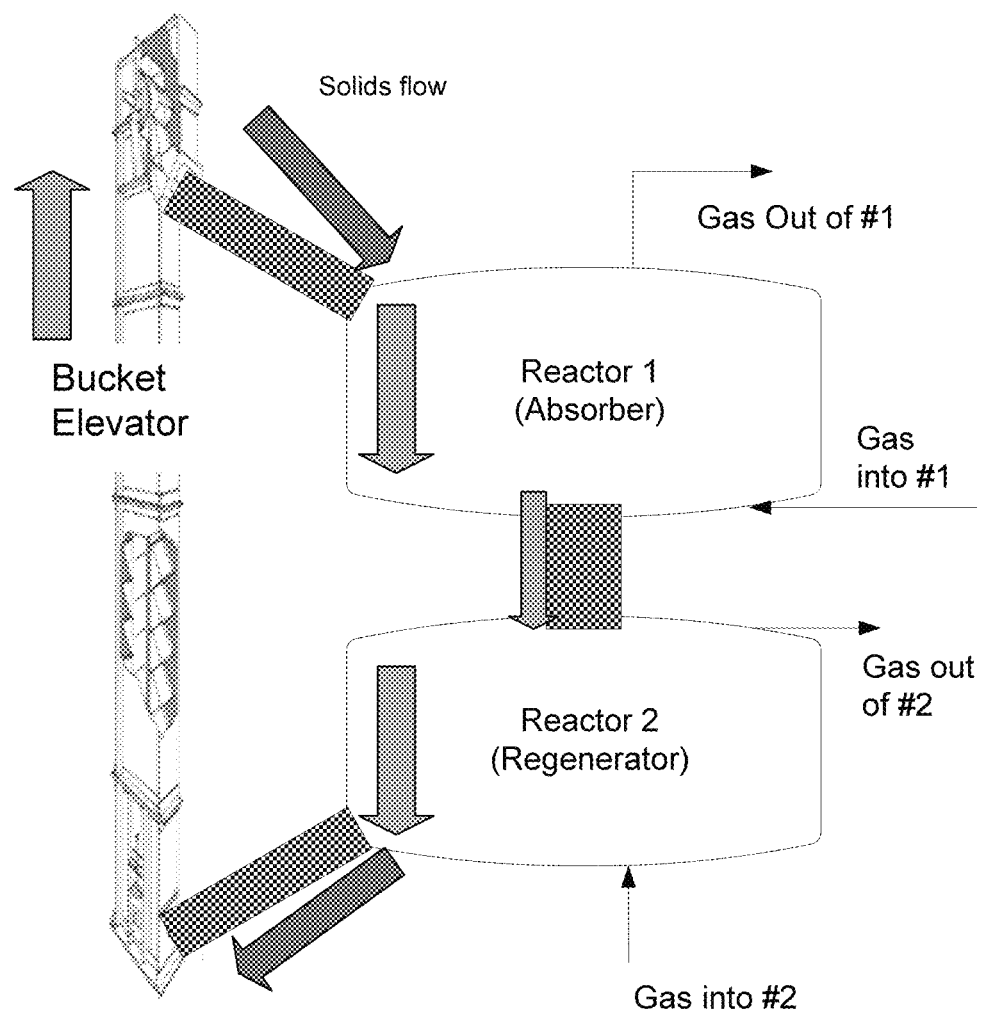
FIG. 9 illustrates a stacked moving bed design with a bucket elevator, in accordance with an exemplary embodiment of the disclosure.

An embodiment of the disclosure can also include a moving bed where the solids are moved with a bucket elevator, as shown in FIG. 9. In this embodiment, the adsorber bed and regenerator beds are both vertical falling moving beds and a bucket elevator circulates the sorbent up to the upper bed. In both beds the gas stream can move up while the sorbent can fall down. The upper reactor is shown as the regenerator, however, the bed's location could also be reversed with the regeneration bed in the upper position. The bucket elevator may comprise a centrifugal discharge, or continuous discharge or a drag conveyor.

An embodiment of the disclosure can then be a circulating moving bed system having a sorbent, a $CO_2$ feed stream, a regeneration stream, an adsorption reactor and a desorption reactor. As shown in several of the previous non-limiting examples, the system can include an adsorption reactor and regeneration reactor. The adsorption reactor can have a first entry point for the sorbent at an end of the adsorption reactor, a second entry point for the $CO_2$ feed stream distal to the first entry point, a sorbent exit point for the sorbent proximal to the second entry point, and a feed stream exit point proximal to the first entry point. The regeneration reactor can have a first entry point for the sorbent at an end of the regeneration reactor, a second entry point for the regeneration stream distal to the first entry point, a sorbent exit point for the sorbent proximal to the second entry point, and a regeneration stream exit point proximal to the first entry point.

The moving bed systems can incorporate each of the discussions set forth throughout the application, including the lack of a temperature swing or pressure swing process, and the use of sorbents disclosed herein.

The moving bed systems of this disclosure can also include a sorbent transport system to move sorbent between each reactor. As shown in some non-limiting examples, the sorbent transport system can be included in either the adsorption or regeneration reactor, or both, and can move sorbent in a direction opposite to the direction of either the $CO_2$ feed stream or the regeneration stream, respectively.

The moving bed systems of this disclosure can also be described as part of a process. In an embodiment of the disclosure, a process for the separation and/or purification of $CO_2$ from a $CO_2$ feed stream can include adsorbing the $CO_2$ on a sorbent by passing the $CO_2$ feed stream through the adsorption reactor, the adsorption reactor comprising a first entry point for the sorbent at an end of the adsorption reactor, a second entry point for the $CO_2$ feed stream distal to the first entry point, a sorbent exit point for the sorbent proximal to the second entry point, and a feed stream exit point proximal to the first entry point; and desorbing the $CO_2$ from the sorbent in the regeneration reactor, the regeneration reactor comprising a first entry point for the sorbent at an end of the regeneration reactor, a second entry point for the regeneration stream distal to the first entry point, a sorbent exit point for the sorbent proximal to the second entry point, and a regeneration stream exit point proximal to the first entry point.

Figure 10:
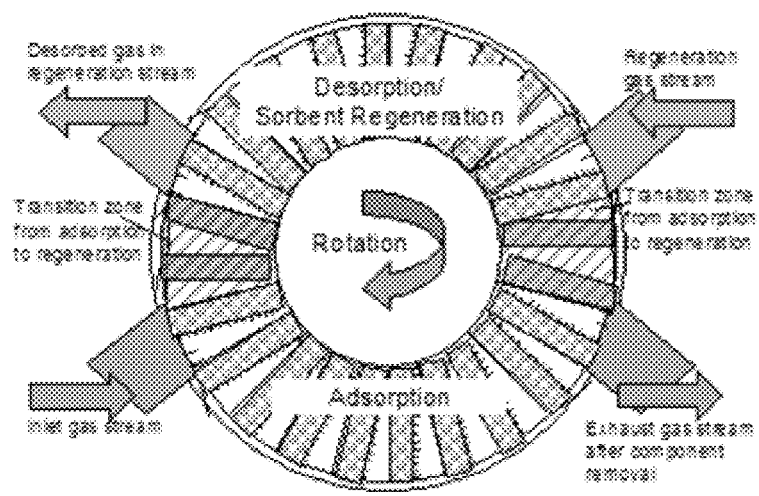
FIG. 10 illustrates a counter-flow rotary wheel bed design, in accordance with an exemplary embodiment of the disclosure.

In an embodiment of the disclosure, the counter flow moving bed can also be a rotating moving bed where the sorbent is stationary inside a vessel which itself rotates such that the gas flows across it is in a counter-flow manner. The schematic diagram of such a counterflow moving bed is shown in FIG. 10. This bed rotates in a circle like a carousel. In contrast, other rotating wheel applications have gas flow that comes in from the top (roof) or bottom (floor) planes of the carousel. (U.S. Pat. Nos. 6,447,583, 5,503,222, 6,527, 836). These rotating beds are essentially multiple fixed beds with a sliding seal instead of valves. In some other rotating wheel applications pressure swing is used as the regeneration mechanism. This type of rotating bed is essentially a set of fixed bed reactors. A fixed bed reactor must provide for both the mass transfer zones and extra capacity to store sorbent. Since there is always some residual gas in the reactor, very frequent cycling must be avoided to prevent contamination of one stream by the other. Consequently the fixed beds are about 3 to 5 times larger than the counter-current rotating bed.

In an embodiment of this disclosure, the gas flows in the rotating moving bed from the sides of the rotating wheel as shown in an embodiment in FIG. 10. This flow path design enables counter current contact between the gas and the sorbent. The stream containing the gas to be removed runs across one section the wheel. On the other side the regeneration gas stream flows across. In this disclosure the regeneration is also by contact with another gas rather than pressure swing or temperature swing. There is a transition region between the adsorption and regeneration sections where the sorbent is sealed off to keep the adsorption and regeneration spaces separate. The section of the sorbent that is in this transition region changes as the wheel rotates. A feature of the rotating wheel design is that the energy requirement to circulate the sorbent is lower than for other sorbent circulation methods such as pneumatic transport, screw conveyor, and bucket elevators. In contrast to the pneumatic transport, screw conveyor and bucket elevator, which move sorbent vertically, the rolling bed on railroad wheels and tracks and the rolling bed on truck tires and concrete needs to only move the material horizontally. There is a substantial cost benefit to just overcoming the rolling friction rather than have to move solids up a vertical lift.

The efficiency benefits of counterflow contact are well established in the design of regenerative heat exchangers which also use a counter-current flow design. Regenerative heat exchangers can have two fluids (generally the same fluid) following on each side in opposite flow directions. The fluid flows to one side of the heat exchanger where it can be heated (or cooled). After exiting the heat exchanger, it may go through an external processing step, and then be flowed back through the heat exchanger in the opposite direction. In generally, the fluid will cycle through one side of the heat exchanger, go through a process and then go back through the heat exchanger on the other side in the other direction. This is useful because with the counter current flow, the fluid incoming to a process is heated using the energy contained in the fluid exiting this process. Thus, the regenerative heat exchanger can give a considerable net savings in energy, since most of the heat energy is reclaimed nearly in a thermodynamically reversible way. This type of heat exchanger can have a thermal efficiency of over 90%, transferring almost all the relative heat energy from one flow direction to the other. Only a small amount of extra heat energy needs to be added at the hot end, and dissipated at the cold end, even to maintain very high or very low temperatures. The counter-current approach of the regenerative heat exchanger can be used in ad/absorbents process design to achieve a high efficiency. In this case, the gases flows are in a countercurrent manner and there is a concentration gradient rather than a temperature gradient driving the process.

Figure 11:
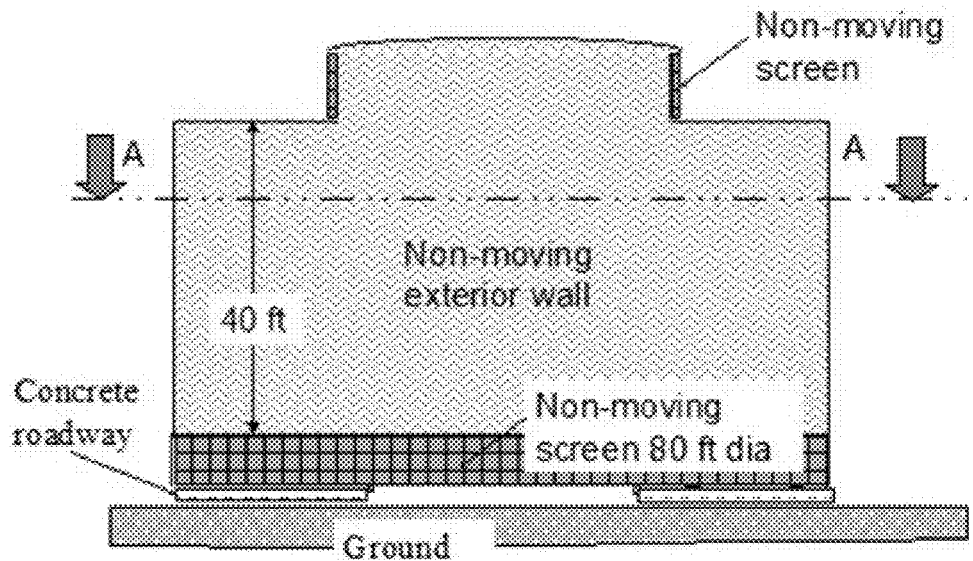
FIG. 11 illustrates the external housing and structure of the rotary wheel design of FIG. 12, in accordance with an exemplary embodiment of the disclosure.
Figure 12:
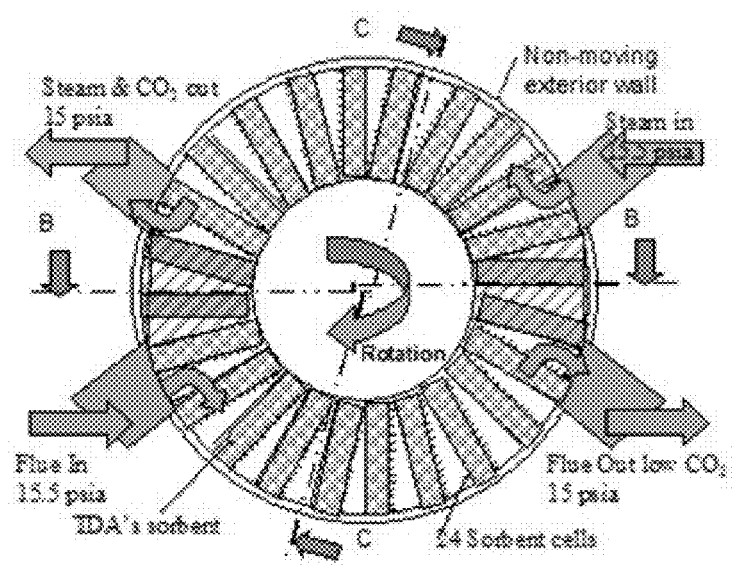
FIG. 12 illustrates a nonlimiting twenty four sorbent cell rotary wheel design, along the A-A line of FIG. 11, in accordance with an exemplary embodiment of the disclosure.

An embodiment of the disclosure can also be a counter-flow rotating wheel bed design with concentration swing. A schematic of the embodiment of this design for $CO_2$ capture from flue gas with steam stripping regeneration is shown in FIG. 12 along with a view of the exterior of the design, in FIG. 11. The combustion flue gas stream flows in from the sides of the rotating wheel as shown. The wheel rotates in the opposite direction as the gas flow path. This provides counter current contact between the flue gas and the adsorbent. Flue gas flows horizontally across a section of the wheel and adsorbs $CO_2$. With the counter-flow design the flue gas with the lowest concentration for $CO_2$ near the gas flow exit is in contact with the most recently regenerated sorbent. This feature enables the lowest concentration of $CO_2$ leaving the reactor. On the other section of the rotating wheel the regeneration steam flows across, also in a counter current path to the sorbent rotation direction and desorbs the $CO_2$ from the sorbent. With the counter current flow path the most highly loaded adsorbent is in contact with the steam leaving the reactor. This feature yields the highest possible $CO_2$ concentration in the regeneration gas outlet.

Figure 13:
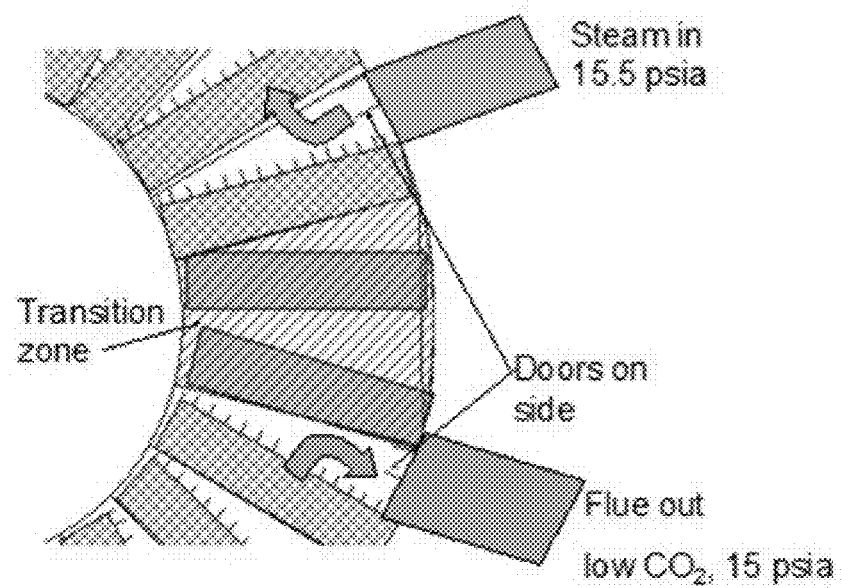
FIG. 13 illustrates the transition zone between adsorption and regeneration in the rotary wheel of FIG. 12, in accordance with an exemplary embodiment of the disclosure.

There is a transition region between the adsorption and regeneration sections where the sorbent is sealed off to keep the adsorption and regeneration spaces separate, as shown in FIG. 13. The section of sorbent that is in this transition region changes as the wheel rotates. In a non-limiting example, the rotating wheel can be made of 24 sorbent cells, and each cell could about 40 ft tall by 39 ft wide by 4 ft. Doors on each cell can allow gas to flow through or can close to seal off sections in the transition region. A schematic of the transition region is show in above. Each transition zone isolates up to two sorbent cells. As the set of doors one cell opens up, the other sets of doors on the adjacent cell is still in place to block reverse flow. In this embodiment, the opening and closing of these doors is activated by the flow of gas through the sorbent. Doors close in the transition region because the pressure gradient is in the reverse direction. The doors are designed to not allow reverse flow. The doors are hinged and do not open more than 85° by the hinge design. The sealing does not have to be perfect. With a ⅟32 inch gap, the doors will stop>99.5% of the total flow. The doors when closed are not perfectly sealed but are shimmed after the sorbent is loaded to minimize the gap between the door and its frame when closed. The interior vertical cross section showing these doors is shown above. There is also a set of doors on the side of the rotating bed which are opened by mechanical means to allow flow into or out of the side of the rotating bed.

Figure 14:
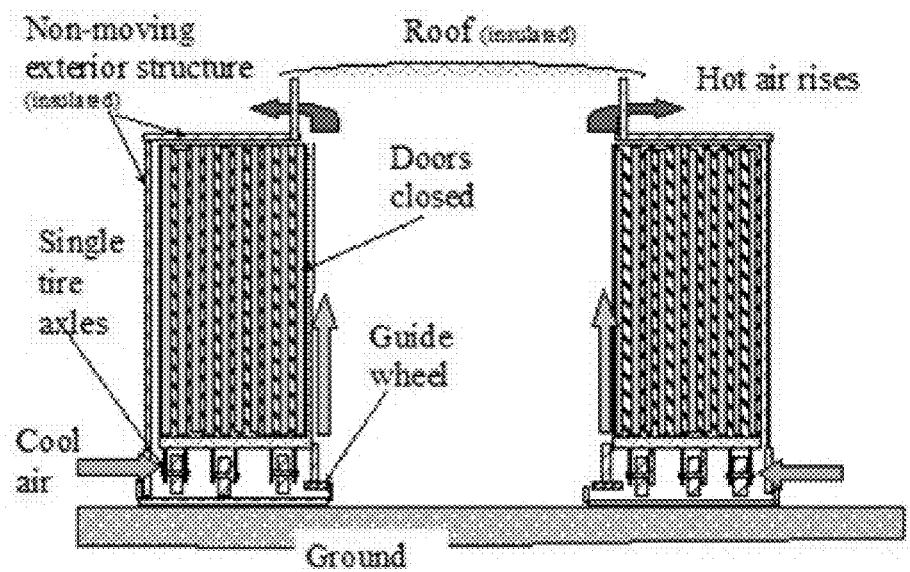
FIG. 14 illustrates interior vertical cross-section of the rotary wheel of FIG. 12, along the B-B line, in accordance with an exemplary embodiment of the disclosure.

The rotating bed can be inside a non-moving exterior structure to protect the internal reactor from weather, as shown in FIG. 14. The exterior wall can be insulated on the outside to maintain the temperature of the system. The non-moving screen at the top of the structure allows air to move by natural convection and to keep the bottom part of the rotating moving bed near ambient temperature. The concrete roadway or floor provides the support for the rotating moving bed.

An embodiment of the current disclosure can then be a rotary moving bed assembly such as described above. The rotary moving bed can include a rotational assembly having a vertical axis of rotation and a plurality of fixed sorbent cells positioned horizontally relative to the axis of rotation and each cell or a combination of cells filling the vertical space within the rotational assembly such that air substantially cannot bypass the sorbent cells, a non-moving exterior structure; a regeneration stream inlet and outlet; and a $CO_2$ feed stream inlet and outlet. One of ordinary skill would understand that substantially cannot bypass does not mean that no gas bypasses the sorbent cell, but that the rotary bed is designed such that no bypass is intentionally designed into the assembly. Some level of leakage and a lack of airtight fit might be expected in constructing a rotary bed assembly of the disclosure. The fixed sorbent cell rotates through the assembly in one direction while the two gas flows travel in the opposite direction. Thus, a countercurrent flow for both adsorption and desorption can be established. Thus, in an embodiment, a regeneration stream can flow from the regeneration inlet to the regeneration outlet in the opposite direction of rotation for the rotational assembly, and a $CO_2$ feed stream flows from the $CO_2$ feed stream inlet to the $CO_2$ feed stream outlet in the opposite direction of rotation for the rotational assembly.

As demonstrated by the previous figures, an embodiment of the disclosure can also include the $CO_2$ feed stream and the regeneration feed stream which flow in a horizontal direction relative to the vertical axis of rotation. Note that this flow differs from the rotary bed processes discussed earlier in which the air flow was across the cells in a vertical direction, leading to an overall ineffective use of space and size of the beds. With the gas flow from inlet to outlet across the fixed beds, a region between the regeneration inlet and outlets can form a desorption zone and a region between the $CO_2$ feed stream inlet and outlet form an adsorption zone. The adsorption zone can contain a plurality of sorbent cells in contact with $CO_2$ feed stream, and the sorbent cells in the desorption zone are moving in the opposite direction from the feed stream. Similarly, the desorption zone can contain a plurality of sorbent cells in contact with regeneration stream, and the sorbent cells in the desorption zone are moving in the opposite direction from the regeneration stream. As discussed, the gas flow across the multiple beds can occur in a countercurrent fashion, such that the beds with highest concentrations of adsorbed $CO_2$ are exposed to the feed gas with the highest $CO_2$ concentration, and lower concentration beds are exposed to feed gases with low amounts of $CO_2$ but can still adsorb the $CO_2$ due to the large amount of capacity those beds have.

The rotary moving bed also contains transition zones in the region between the $CO_2$ feed stream outlet and the regeneration feed stream inlet and the region between the regeneration stream outlet and $CO_2$ feed stream inlet. Sorbent cells passing through these zones are not in contact with either the regeneration stream or the $CO_2$ feed stream.

Another embodiment of the disclosure can be length of time a sorbent cell spends in each zone, or a residence time. A sorbent cell can have a residence time, measured as a percentage of time required to make one cycle around the rotating bed, in either the adsorption or desorption zone of at least about 30% of one cycle, at least about 35% of one cycle, or at least about 40% of one cycle. Similarly, the residence time of a sorbent cell in a transition zone is less than 20% of one cycle, less than 15% of one cycle, or less than 10% of one cycle. Alternatively, the length of time a sorbent cell spends in a zone can be described with respect to the number of total sorbent cells in a given zone at a specific point in time. In an embodiment, the adsorption zone can have at least about 30% of the total sorbent cells in the zone, at least 35% of the total sorbent cells, or at least 40% of the total sorbent cells. Similarly, the desorption zone can have at least about 30% of the total sorbent cells in the zone, at least 35% of the total sorbent cells, or at least 40% of the total sorbent cells.

The sorbent cells of the rotary moving bed can contain the sorbent as described and disclosed herein.

In an embodiment, the disclosure can also include a process for the separation and/or purification of $CO_2$ gas from a $CO_2$ feed stream, which includes feeding a $CO_2$ containing feed stream into a $CO_2$ feed stream inlet of a rotary moving bed and collecting a $CO_2$-depleted feed stream at a $CO_2$ feed stream outlet of the rotary moving bed and feeding a regeneration stream into a regeneration stream inlet of the rotary moving bed and collecting a $CO_2$-enriched stream at the regeneration stream outlet of the rotary moving bed, wherein the regeneration stream flows from the regeneration inlet to the regeneration outlet in the opposite direction of rotation for the rotational assembly, and the $CO_2$ feed stream flows from the $CO_2$ feed stream inlet to the $CO_2$ feed stream outlet in the opposite direction of rotation for the rotational assembly. The rotary moving bed can be as described and disclosed.

Figure 15:
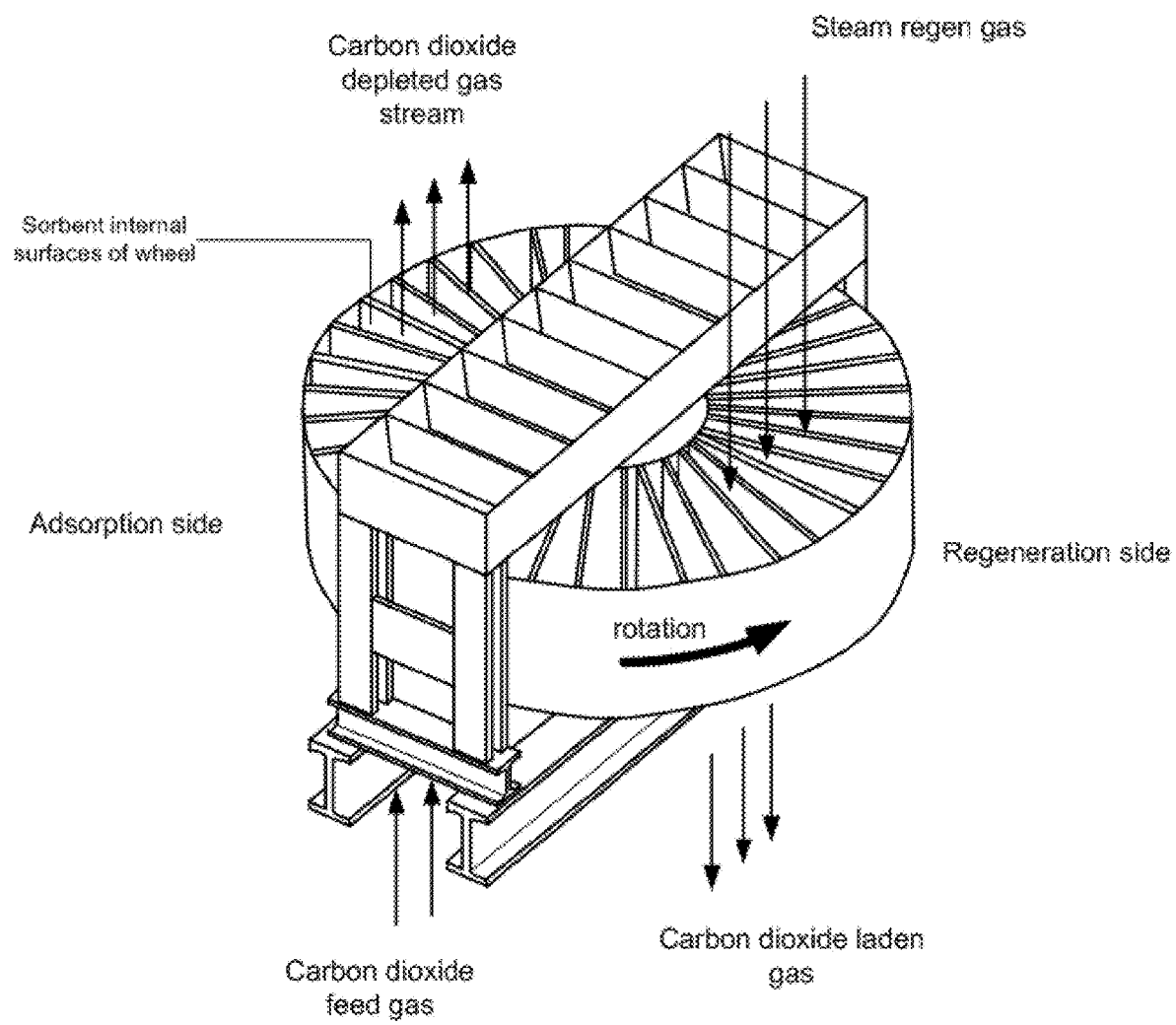
FIG. 15 illustrates a sorbent cell rotary wheel design, in accordance with an exemplary embodiment of the disclosure.

In an alternate embodiment, the sorbent technology can alternatively be applied to a rotary moving bed as shown in FIG. 15. The $CO_2$ feed stream and the regeneration stream each flow in a direction parallel to the axis of rotation, e.g. a rotary moving bed rotating on a vertical axis would have each stream flowing across the sorbent beds in a vertical direction. Adsorption can be conducted on one portion of the rotary wheel, with the $CO_2$ feed stream flowing up through the sorbent beds, and desorption/regeneration can be conducted on another portion of the rotary wheel, with the regeneration stream flowing down through the sorbent beds. In an embodiment, the gas stream and the regeneration stream can flow in opposite directions, as shown in FIG. 15, or the two streams can flow in the same direction. The portions of the wheel in regeneration or adsorption need not be equal.

Figure 16:
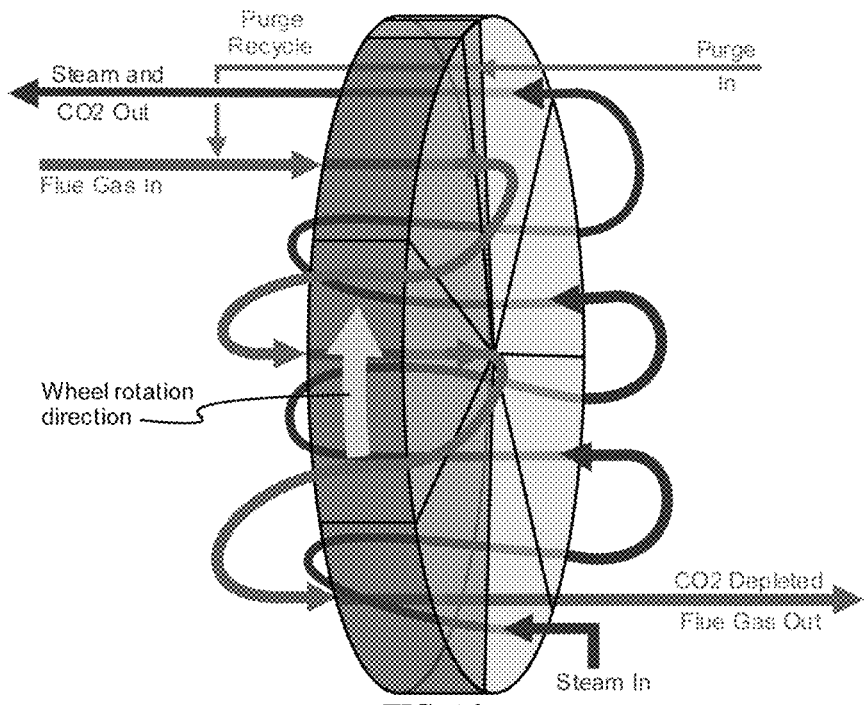
FIG. 16 illustrates another sorbent cell rotary wheel design, in accordance with an exemplary embodiment of the disclosure.

In another embodiment, the rotary wheel can be arranged such that counter-current staging of gas flows and solids movement can be achieved, as shown in FIG. 16. The wheel is a fixed bed of sorbent which rotates in the direction shown. The segments represent individual stationary ducts which lead gas flows into and out of the wheel. As the wheel rotates, the gas flows are led in directions counter to the direction of rotation, thereby exposing the sorbent to concentrations of the carbon dioxide that improve utilization of the sorbent and minimize the amount of displacing steam required.

Figure 17:
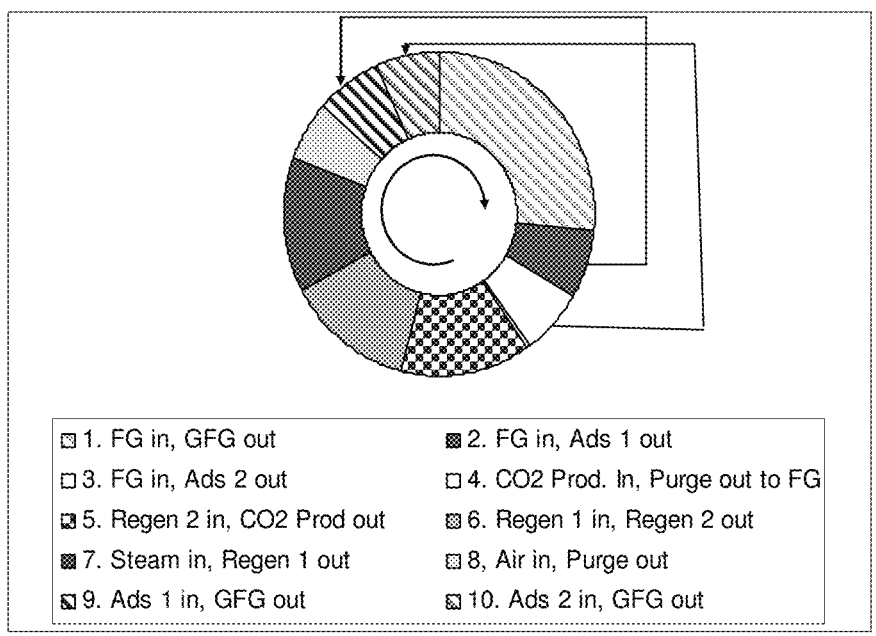
FIG. 17 illustrates another sorbent cell rotary wheel design, in accordance with an exemplary embodiment of the disclosure

In another embodiment, the simulated moving bed strategy discussed above can be applied to a rotary wheel by creating different flows of gas into and out of different zones of the rotary wheel. As illustrated in FIG. 17, the segments identified by different patterns represent divisions of the ducting leading into and out of the wheel, which is a fixed bed that rotates in the direction shown by the arrow in the center. In the legend, FG represents the flue gas being treated, and GFG the "green" low Carbon dioxide product. The lines connecting the segments represent ducts that recirculate the streams shown to other ducts.

Figure 18A:
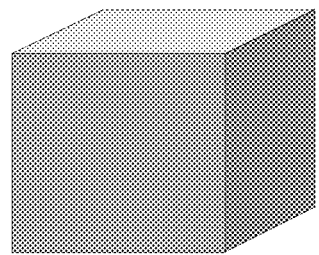
FIGS. 18A and 18B illustrate an individual sorbent module and interbed spacers or flow channels, in accordance with an exemplary embodiment of the disclosure.
Figure 18B:
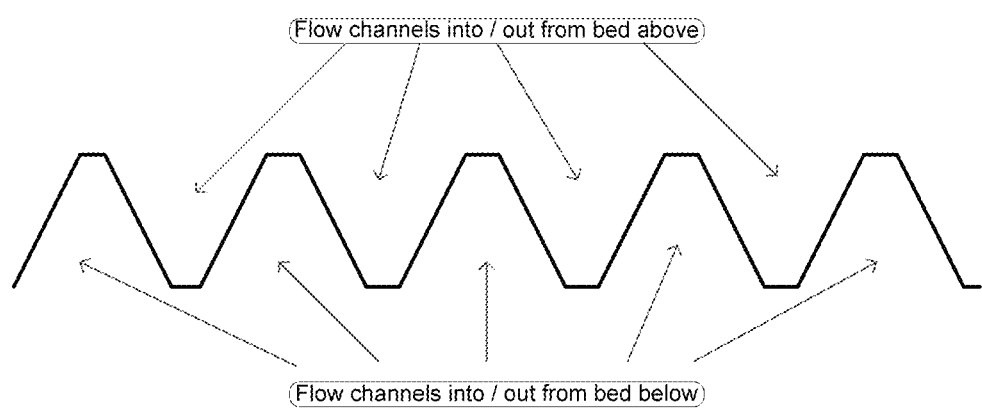
Figure 19A:
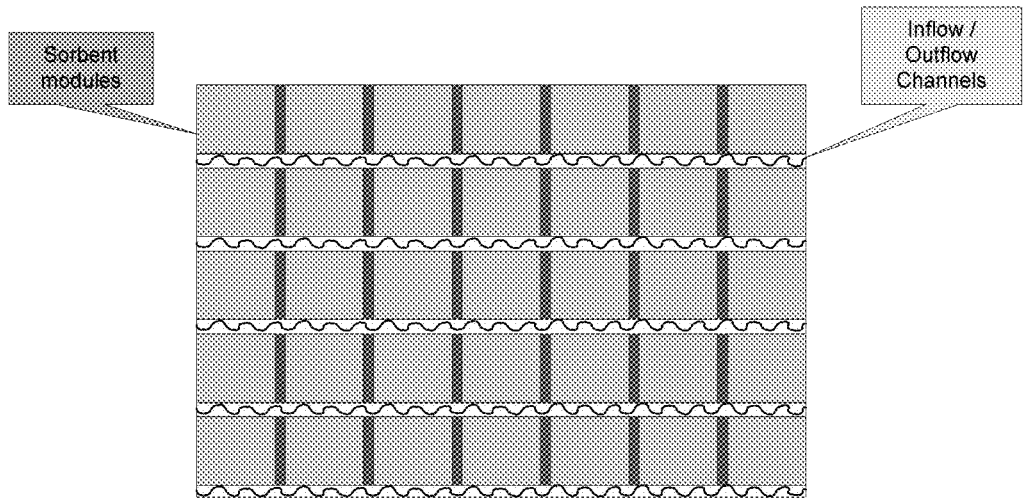
FIGS. 19A and 19B illustrate an inlet-outlet view and sideview of a layered beds system, in accordance with an exemplary embodiment of the disclosure.
Figure 19B:
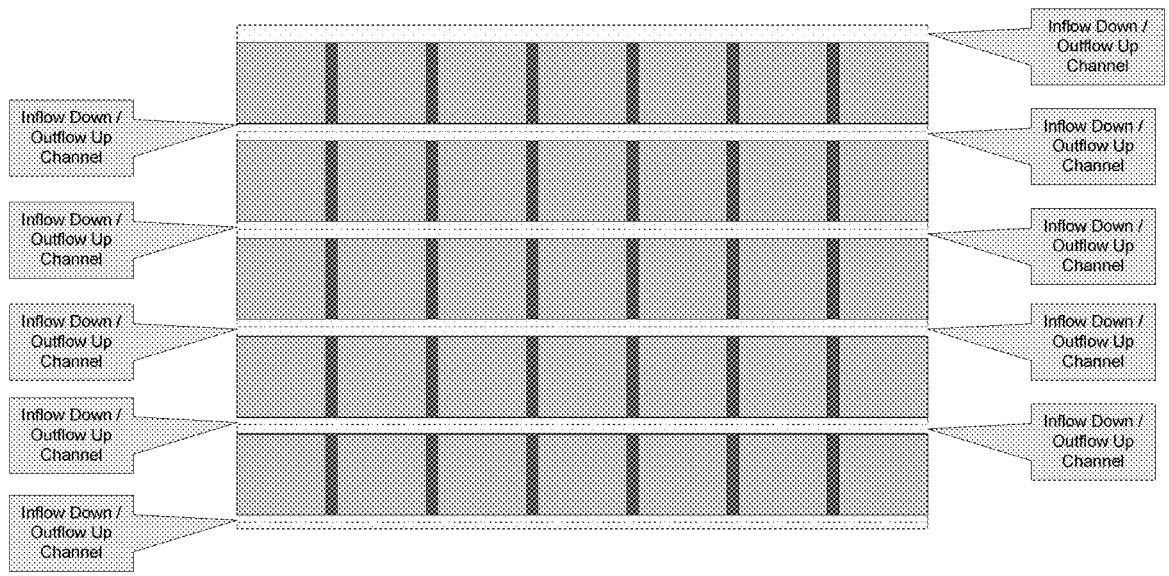

In constructing the sorbent beds used within the methods, processes, and systems of the disclosure, the sorbent can be placed in the beds using any method known to one of ordinary skill in the art. In an embodiment, the sorbent can be contained as free particles that move through a system in a countercurrent fashion, such as in the vertical moving beds in FIG. 7 or 8. Alternatively, the sorbent can also be contained with individual modules, such as the module of FIG. 18A. The sorbent can be contained in an individual module which is open at the top and having a perforated bottom to allow gas flow with retaining the sorbent. The sorbent particles can then be contained as packed beds in the modules, and layered beds of modules can then be assembled using sorbent modules and inter-bed spacers or flow channels as shown in FIG. 18B to produce the layered beds shown in FIG. 19A, viewed from the inlet and outlet ends, and FIG. 19B, viewed from the side. The layered beds can provide for high volume gas flow with low pressure drop. Gases introduce from the right flow down through the beds and out the left side; gases introduced from the left flow up and out the right side.

As an alternative to individual sorbent containing modules, it is envisioned that a stacked bed configuration could also be achieved with support grids in each layer and loose adsorbent particles as extrudates or other low pressure drop forms without the use of individual sorbent modules.

Figure 20:
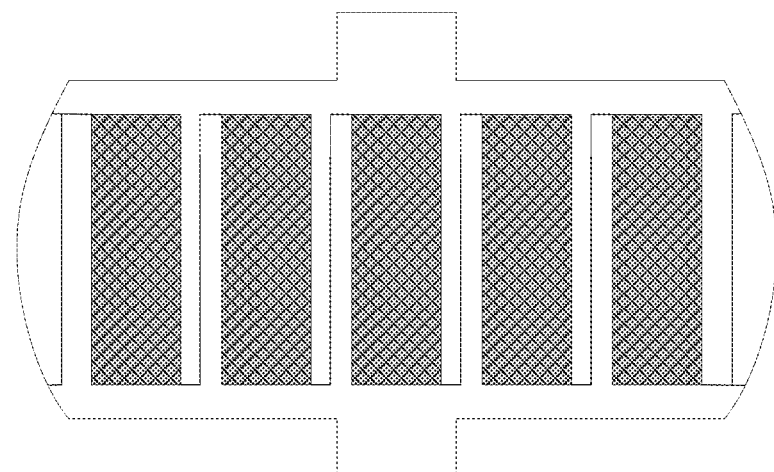
FIG. 20 illustrates a segmented sorbent bed in accordance with an exemplary embodiment of the disclosure.

Another configuration that provides the benefits of segmentation involves arranging the segments as vertical paced beds with flow channels that provide for parallel horizontal flow of gases, as illustrated in FIG. 20. The beds are contained within screens mounted vertically. Adsorbent is filled from the top and dumped from the bottom. Process gas flow is in the top and out the bottom, or in the bottom and out the top. The flow divides into the channels between beds, goes through the beds and then out the channels to the other side and collects to flow out.

EXAMPLES

Example 1

Sorbent Preparation and Characterization

An alkalized alumina adsorbent was prepared from alumina powder (boehmite) and sodium carbonate. The boehmite and sodium carbonate were mixed in distilled water. The resulting solution was filtered and sediment dried. This sediment mixed with a nitric acid solution was extruded into pellets and fired.

As an example of a sample preparation, 210 g Boehmite V-700 (UOP), 132 g $Na_2CO_3$ and 900 ml $H_2O$ were mixed at 90° C. for 2 hours. The resulting solution was filtered, and the sediment was left to dry over night at room temperature. First, 380 g of the sediment material were put in the drying oven for 3.5 hours. Next, 309.4 g of the dried material were mixed with 163 ml of the $HNO_3$ solution (0.75 ml $HNO_3$/20 ml $H_2O$). Pellets were extruded to ⅛" diameter pellets, dried at room temperature and then calcined with heating from room temperature up to 100° C. at 0.2° C./min. for 2 hours and then heating 100° C. up to 650° C. at 0.5° C./min. for 4 hours.

This sorbent was characterized in a fixed bed where it was cycled under simulated coal flue gas (13.7% $CO_2$ 9.0% $H_2O$ with the balance $N_2$) and regenerated with 1 atm of steam. The fixed bed was operated in a counter flow mode with the simulated flue run down and the steam flow up through the reactor. The GHSV of the simulated flue gas was 2500 $hr^{-1}$ during the 2 minute adsorption step and the GHSV of the steam was 2500 $hr^{-1}$ during the 4 minute regeneration step. The adsorbent had a dynamic $CO_2$ loading capacity 0.8 wt %.

Example 2

Sorbent Preparation and Characterization

An alkalized alumina adsorbent was prepared from alumina powder (boehmite) and sodium bicarbonate. The boehmite and sodium bicarbonate were mixed in distilled water. The resulting solution was allowed to settle, the solution decanted off and the precipitate dried. The precipitate was extruded into pellets with a sodium nitrate solution and fired. As an example of a sample preparation, 8903 g Boehmite Versal-700 (UOP), 5594 g $NaHCO_3$, and 38.1 L $H_2O$ were mixed at room temperature for 18 hours. The solution was then allowed to settle and the excess solution was decanted off. The precipitate was dried at 150° F. Dried powder (8700 g) were mixed with 2% Methocel F4M (Dow) (174 g) and then combined with 8265 g of 3.75% NaNO3 solution. This material was extruded to ⅛" pellets and air dried overnight and then fired at 400° C. for 4 hours.

Figure 21:
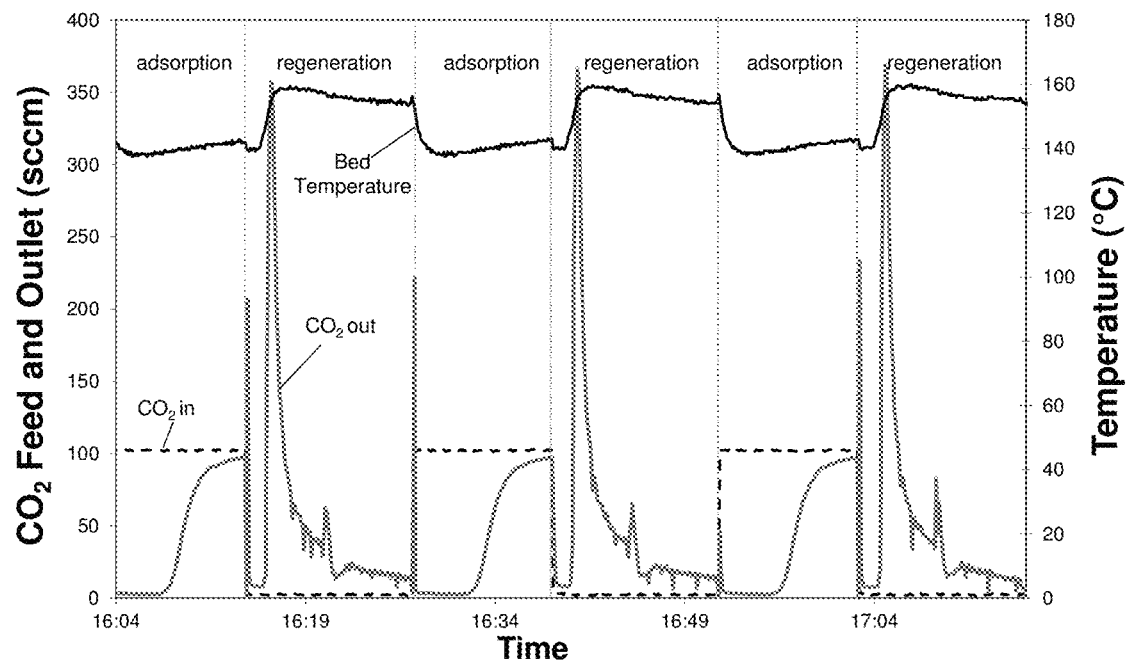
FIG. 21 illustrates a representation of a cyclic displacement process, in accordance with an exemplary embodiment of the disclosure.

This sorbent was characterized in a fixed bed where it was cycled under simulated natural gas flue gas (4.1% $CO_2$, 8.3% $H_2O$ with the balance $N_2$) and regenerated with 100% steam at ambient pressure, as shown in FIG. 21 ($CO_2$ feed and effluent flow rates under cycling with 4.1% $CO_2$, 8.3% $H_2O$ simulated flue gas (GHSV 2080 $hr^{-1}$) and steam regeneration (GHSV 1280 $hr^{-1}$). Temperature decreases during adsorption of $CO_2$ from flue gas and temperature increased with $CO_2$ desorption during steam regeneration. Dynamic $CO_2$ loading capacity is 0.7 wt %. Adsorbent prepared according to adsorbent preparation Example 2.) The fixed bed was operated in a counter flow mode with the simulated flue run down and the steam flow up through the reactor. The GHSV of the simulated flue gas was 2080 hr–1 during the 11 minute adsorption step and the GHSV of the steam was 1280 hr–1 during the 13 minute regeneration step. The adsorbent had a dynamic $CO_2$ loading capacity of 0.7 wt %. As is characteristic of this process without the removal of heat from the bed, the temperature during adsorption of $CO_2$ from the flue gas was lower at 140° C. and during regeneration it rose to 160° C. It steadily oscillated between these temperatures.

Example 3

Sorbent Preparation and Characterization

An alkalized alumina adsorbent was prepared from alumina powder (gibbsite) and sodium bicarbonate. The boehmite and sodium bicarbonate were mixed in distilled water. The resulting solution was filtered and precipitate dried. This precipitate was mixed with a methocel FM and Volclay and was extruded with Boehmite solution (6.7% conc) into pellets and fired.

As an example of a sample preparation, 153.5 g Alcan WH31 (Alcan) which had been fired at 275° C. for 8 hr, 96.5 g $NaHCO_3$ and 657.5 ml $H_2O$ were mixed at 90° C. for 1 hours. The resulting solution was filtered, and the filtrate was left to dry over night at room temperature and then dried at 100° C. for 1 hours. 150 g of the dried material were dry mixed with Volclay 353 CER (American Colloid Company) (16.7 g) and Methocel F4M (Dow) (3.34 g) and then mixed with 93.52 g of the Boehmite solution (6.7% conc). Pellets were extruded to 1/16" diameter pellets, dried at room temperature and then calcined at 550° C. for 4 hours.

This adsorbent was characterized in a fixed bed where it was cycled under simulated coal gas flue gas (12.3% $CO_2$, 13.8% $H_2O$ with the balance $N_2$) and regenerated with 1 atm steam. The fixed bed was operated in a counter flow mode with the simulated flue run down and the steam flow up through the reactor. The GHSV of the simulated flue gas was 1900 $hr^{-1}$ during the 5 minute adsorption step and the GHSV of the steam was 900 $hr^{-1}$ during the 10 minute regeneration step. The adsorbent had a dynamic $CO_2$ loading capacity 0.57 wt %. As is characteristic of the process without the removal of heat the temperature during adsorption of $CO_2$ from the flue gas was lower at 191° C. and during regeneration it increased to 198° C. It steadily oscillated between these temperatures.

Example 4

Sorbent Preparation

The methods of/composition of the adsorbent in examples 1 and 2 can be extended to other alkalized alumina adsorbent compositions.

The methods of/of the adsorbent examples 1 and 2 where the first component is any alkali or alkaline earth metal. A further example is where the adsorbent is comprised of sodium carbonate or soda ash ($Na_2CO_3$), potassium carbonate, trona (trisodium hydrogendicarbonate alcinati $Na_3H(CO_3)_2 \cdot 2H_2O$), baking soda ($NaHCO_3$). Sodium aluminate ($2NaAlO_2=Na_2O*Al_2O_3$), gamma (γ)-Alumina {$Al_2O_3$ (G)}, hydrated alumina (Boehmite, $Al_2O_3*H_2O$), Gibbsite, Bauxite, sodium aluminate, calcium silicate (e.g. portland cement). Some low Gibbsites that can be used are Alcan H10 ($84/ton), Alcan WH31 ($133/ton), and Alcan OP-25 ($135/ton).

Example 5

Sorbent Preparation

γ-$Al_2O_3$ extrudates were used as support to deposit $Na_2CO_3$. It has surface area of 306 $m^2/g$, 0.85 $cm^3/g$ pore volume and pore size centered on 73 Å. The aqueous solution containing sodium carbonate was prepared by dissolving sodium carbonate in distilled $H_2O$. The sorbent of $Na_2O$/γ-$Al_2O_3$ was prepared by an incipient wetness technique. As an example of sample preparation, 42.401 g of sodium carbonate was dissolved in 100 g of distilled water. The total solution volume of $Na_2CO_3$/$H_2O$ adjusted with distilled water was 133 ml. 200 g of γ-$Al_2O_3$ extrudates were impregnated with the solution by incipient wetness. The sample was dried in air at 250° F. for 16 hours and calcined in air at 1000° F. for 6 hours. The furnace was ramped at rate of 5° F./min. During the calcinations, the air flow was adjusted at 5 volume/volume solid/minute. The sorbent contains 11.03 wt % expressed as $Na_2O$ loading.

A series of samples containing different sodium loadings were also prepared similarly on γ-$Al_2O_3$ extrudates. The sodium contents in the sorbents as $Na_2O$ are 3.01, 5.80, and 15.68 wt %, respectively.

Example 6

Sorbent Preparations

Additional samples of Na-based sorbents were prepared, including:

Theta-$Al_2O_3$ extrudates were used to deposit $Na_2CO_3$. It has surface area of 126 $m^2/g$, 0.58 $cm^3/g$ pore volume and pore size of 143 Å. The sorbent contains 11.03 wt % $Na_2O$ as loading.

Alpha-$Al_2O_3$ extrudates were used to deposit $Na_2CO_3$. It has surface area of 0.8 $m^2/g$, 0.46 $cm^3/g$ pore volume and pore size of 2.8 micron. The sorbent contains 5.80 wt % $Na_2O$ as loading.

Alpha- and Theta-mixture phase $Al_2O_3$ extrudates were used to deposit $Na_2CO_3$. It has surface area of 32 $m^2/g$, 0.15 $cm^3/g$ pore volume and pore size of 155 ÅA. The sorbent contains 5.80 wt % $Na_2O$ as loading.

$SiO_2$ extrudates were also used to deposit $Na_2CO_3$. It has surface area of 178 $m^2/g$, 0.86 $cm^3/g$ pore volume and pore size of 202 Å. The sorbent contains 11.03 wt % $Na_2O$ as loading.

Example 7

Sorbent Preparation

The solution containing potassium nitrate was prepared by dissolving potassium nitrate in distilled $H_2O$. As an example of sample preparation, 80.867 g of potassium nitrate was dissolved in 100 g of distilled water. The total solution volume of $KNO_3$/$H_2O$ was adjusted with distilled water to 133 ml. 200 g of gamma alumina extrudates were impregnated with the solution by incipient wetness. The sample was dried in air at 250° F. for 16 hrs and calcined in air at 1000° F. for 6 hrs. The sorbent contains 15.85 wt % $K_2O$ Other samples containing different potassium loadings were also prepared. The potassium contents in these sorbents expressed as $K_2O$ are 4.50 and 8.60 wt %, respectively.

Example 8

Simulated Moving Bed

An example using eight contactors with three on combustion gas, four on steam, and one in purge is described below.

A bench-scale apparatus for demonstration of the process can be made from eight stainless steel beds. Each bed is made from a tubular enclosure with 3" outer diameter with 0.065" wall thickness by 4.5" long. Each bed holds 600 cc of the sorbent. Tests are run at near 1 atm pressure. The temperature range is 120 to 180° C. and the beds can be run so that they are maintained at near isothermal condition. For example the temperature of the beds can be between 150 and 165° C. during a full cycle including adsorption, regeneration and optional purge. The entire apparatus is maintained in a heated and insulated box at near isothermal conditions. Individual beds are not heated or cooled during cycling (e.g. not heated during regeneration, cooled during adsorption, etc). The gas hourly space velocity (GHSV) in this bench-scale apparatus is typically between 1000 to 3000 $hr^{-1}$ and in regeneration it is typically between 400 and 1000 $hr^{-1}$. Multiple 3-way control values are used to control how each bed cycles through the adsorption, regeneration and an optional purge cycle. Typical cycle times are 30 seconds to 150 seconds after which the gas flow switches to the next cycle step. The cycle times can be adjusted to achieve different capture rates.

Figure 22:
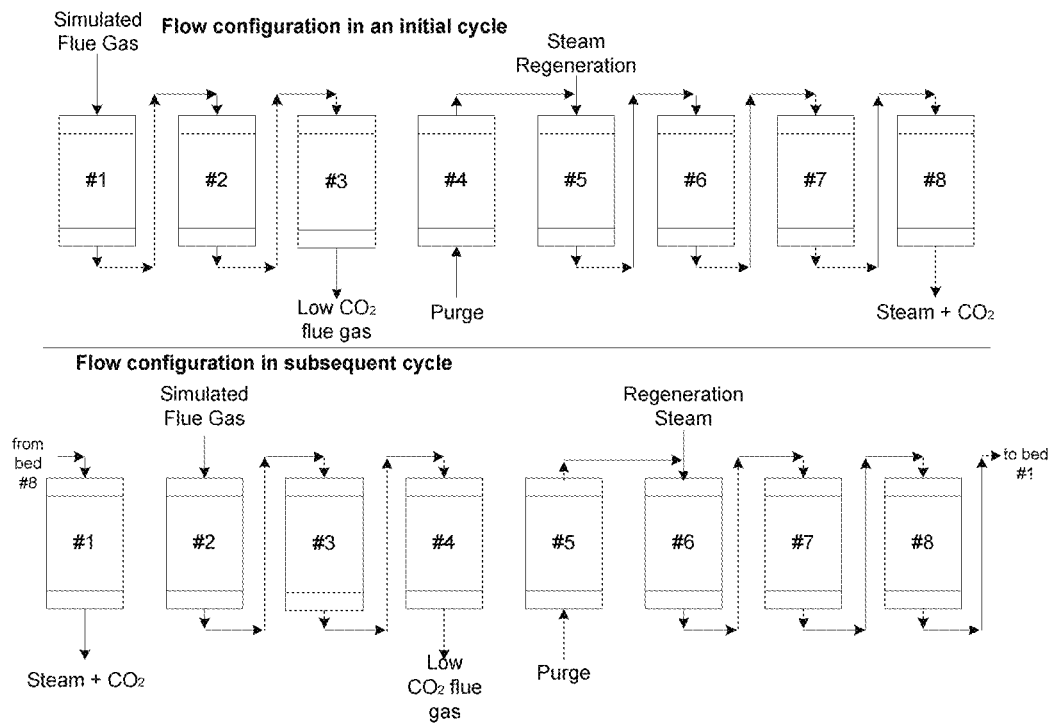
FIG. 22 illustrates a multiple fixed bed test apparatus for continuous $CO_2$ capture, in accordance with an exemplary embodiment of the disclosure.

A non-limiting example of a bed configuration is shown in FIG. 22. In this example, 3 beds operate in adsorption, 4 beds in regeneration and one bed as a purge bed. The purge step displaces one bed volume of regeneration gas back into the regeneration line and prevents $CO_2$ from the regeneration gas from being carried into flue outlet. The purge gas is then pushed back into the adsorber exhaust in the next cycle. Dry $N_2$ is used as the purge gas. With 3 beds running in adsorption, each individual bed (whether in series or parallel operates in adsorption mode for a total time of 3 times cycle time. With 4 beds in regeneration, each individual bed spends a total time of 4 times cycle time in regeneration.

In this example, the gases flow through the adsorption and regeneration beds in series. With the beds in series, the flue gas travels through all three adsorber beds before exiting the system. Likewise when regeneration beds are configured in series, the regeneration steams flows through all the regeneration beds before existing the system.

Other examples of bed configurations that can be utilized for demonstration of this process in an 8 bed apparatus include but are not limited to 3 beds in adsorption and 5 beds in regeneration; 2 beds in adsorption, 4 beds in regeneration and 2 beds in purge (between regeneration & adsorption and between adsorption and regeneration cycles); and 2 beds in adsorption, 5 beds in regeneration and 1 bed in purge. The simulated flue gas can run through the beds in either series or parallel. The regeneration beds can also be configured in either series or parallel. It is preferred to run the regeneration beds in series.

Figure 23:
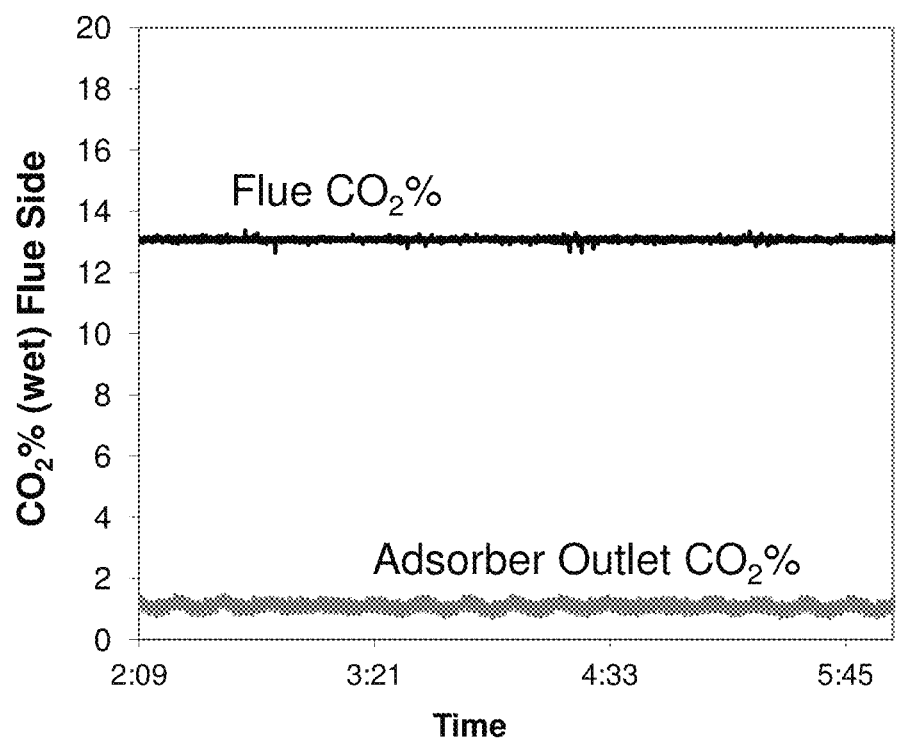
FIG. 23 illustrates inlet and outlet gas composition for a sorbent bed, in accordance with an exemplary embodiment of the disclosure.
Figure 24:
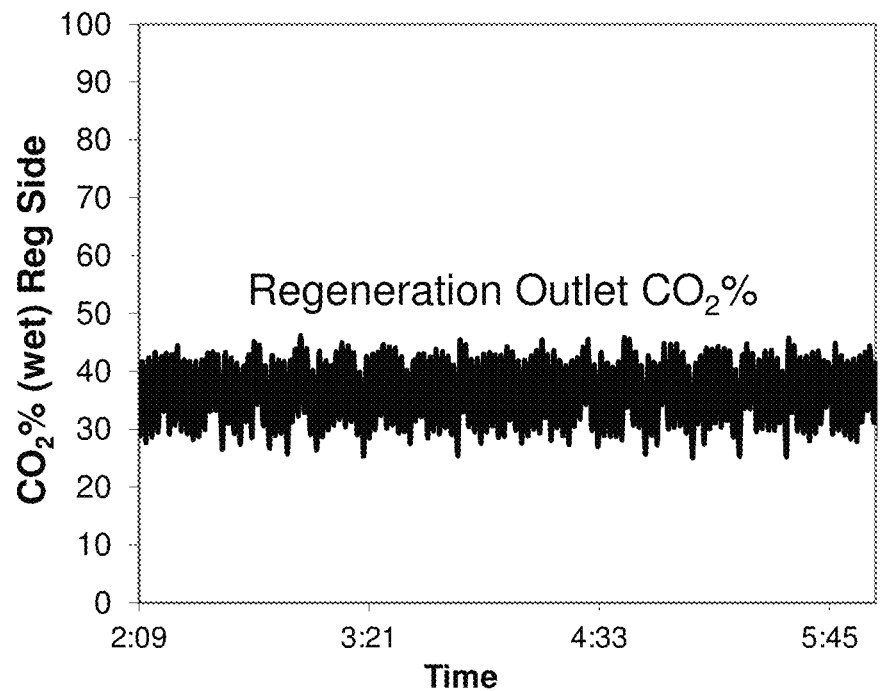
FIG. 24 illustrates the percent $CO_2$ from regeneration of the sorbent bed of FIG. 22, in accordance with an exemplary embodiment of the disclosure.

Another example of the process operated in an 8 bed test apparatus with the configuration shown in FIG. 22 included a simulated coal flue gas is shown FIG. 23, for the feed stream and adsorber outlet, and a demonstrated recovery stream in FIG. 24 (Percent $CO_2$ (in steam) in regeneration outlet in multiple fixed bed apparatus for near 90% Capture case.) The simulated coal flue feed gas was 13.1% $CO_2$, 6% $H_2O$ with the balance $N_2$. The process was operated at near 1 atm with GHSV in adsorption of 1040 $hr^{-1}$ and GHSV in regeneration of 550 $hr^{-1}$. The beds temperature was about 165° C. With a process cycle time of 110 s, the $CO_2$ loading was 0.88 wt % and 89.3% of the $CO_2$ was captured. The sorbent reduced the $CO_2$ concentration in the flue gas from 13% to 1.2%. The outlet $CO_2$ concentration in the regenerator is concentrated to 35% (with the balance steam (any $N_2$ present was not measured). Sorbent was prepared according to sorbent preparation Example 2.

Figure 25:
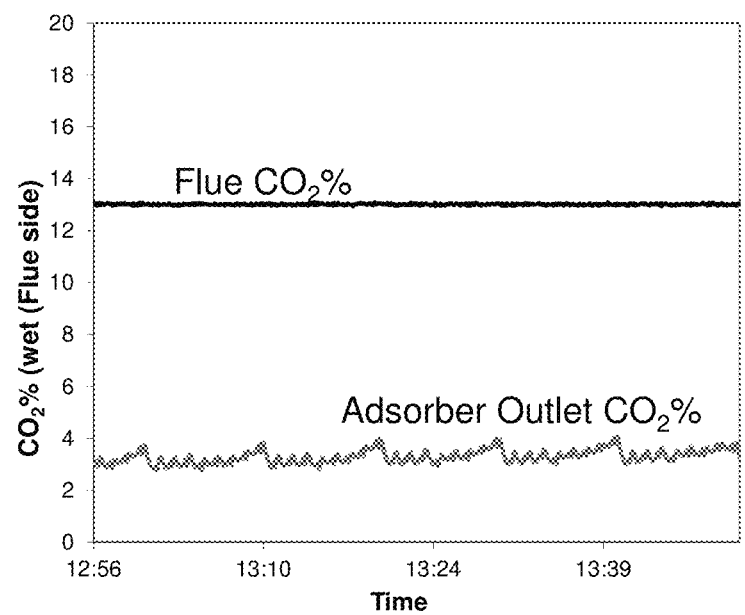
FIG. 25 illustrates inlet and outlet gas composition for another sorbent bed, in accordance with an exemplary embodiment of the disclosure.

In another example of the process operated in an 8 bed test apparatus with the configuration shown in FIG. 22, the adsorber data is shown in FIG. 25. The simulated coal flue gas was 13.0% $CO_2$ and 4.2% $H_2O$ with the balance $N_2$. The process was operated at near 1 atm with GHSV in adsorption of 1410 $hr^{-1}$ and GHSV in regeneration of 420 $hr^{-1}$. The beds temperature was about 175° C. Under these conditions we are starving the process of steam during regeneration. The cycle rate was 80 s. The $CO_2$ in the outlet of regeneration is increasingly concentrated (>80% $CO_2$ in steam). The capture rate was 70% and the $CO_2$ dynamic loading 0.72 wt % $CO_2$ Sorbent was prepared according to sorbent preparation Example 2.

Example 9

Cyclic Adsorption/Steam Displacement

Samples were tested in the form of extrudate pellets, generally 1/16" to 1/8" in diameter held in a cylindrical stainless steel vessel, approximately 1"×7.5" and heated with a band heater, generally in the range of 130-150° C. The loaded bed typically holds 30 to 60 grams of extrudates dependent on the bulk density of the adsorbents.

$CO_2$ containing feed is passed through the bed for adsorption at a flow rate of 1000 standard cubic centimeters per minute (sccm). Steam flows are generated by flowing 0.3 cubic centimeters per minute of water through a length of heated 1/16" tubing, resulting in a steam flow rate of approximately 374 sccm.

$CO_2$ containing feed composition was 4% $CO_2$, 1% He, 8% $H_2O$, 8% $O_2$, and 79% nitrogen.

While bed temperatures rise and fall in accordance with net adsorption energies, both feed and steam are heated to approximately 140° C. to enable and overall isothermal cyclic process.

The cyclic experiment comprises passing $CO_2$ containing feed through the adsorbent extrudates bed until full breakthrough of the feed composition is determined, i.e. $CO_2$ concentration exiting the bed rises to its 4% concentration in the feed.

The adsorbent's capacity to adsorb $CO_2$ under the tested conditions is determined from the time from feed initiation the time when the $CO_2$ concentration rises to half the feed concentration. On the assumption of a symmetrical breakthrough front, this method closely approximates the amount of $CO_2$ that will be adsorbed when the bed is fully loaded. The above described time of adsorption is converted to a wt. % $CO_2$ capacity by multiplying by the $CO_2$ feed concentration and flow rate and dividing by the weight of adsorbent in the bed.

In the cyclic process, water is desorbed from the adsorbent as $CO_2$ is adsorbed. It is always observed that the bed temperature, as determined by the temperature of the gases exiting the bed, drops during $CO_2$ uptake. This "desorptive displacement phenomena" is in sharp contrast to simple single gas adsorption, where the energy released by adsorption causes the bed temperature to rise.

Following the full feed breakthrough described above, $CO_2$ containing feed is turned off and steam is introduced into the bed. As water is adsorbed on the bed and $CO_2$ is displaced, initially the void gases (non-adsorbed gases in the void volume within and without the extrudates) exit the reactor. Next, a high concentration "wave" of relatively dry $CO_2$ exits the bed. This "wave" has $CO_2$ concentrations>50% and often >75-80%, diluted typically by nitrogen and water vapor. The fact that $CO_2$ exits the bed at a concentration higher than that in the feed distinguishes this desorptive displacement process from more typical purge, or partial pressure desorption processes. Following the high concentration $CO_2$ wave, steam breaks through the bed, having completed its adsorption. It is always observed that upon the steam breakthrough that indicates that the water adsorption front has proceeded to the end of the bed, the temperature rises. This phenomena arises due to the greater heat of adsorption released by water's adsorption as compared to the heat of desorption required for the $CO_2$'s release.

The adsorbent's water capacity is determined from the time from steam introduction to the time following the "$CO_2$ wave" whereupon high concentration steam breaks through the bed.

Figure 26:
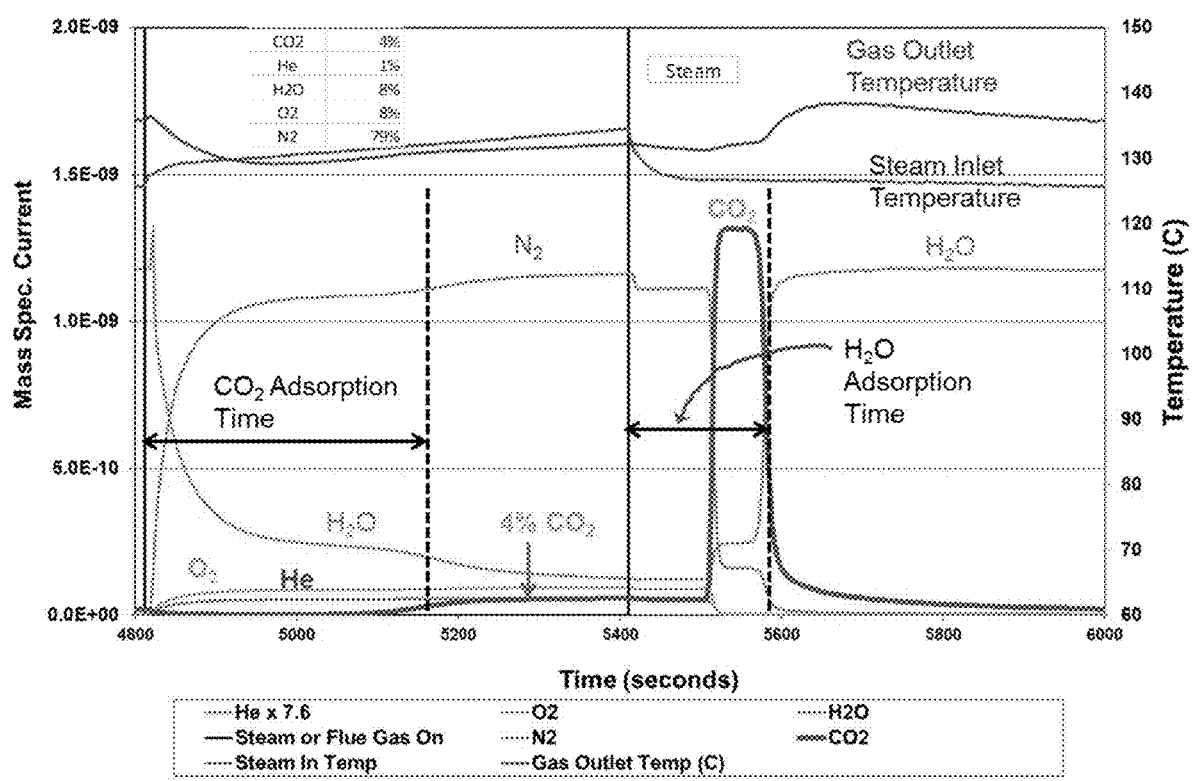
FIG. 26 illustrates a graphical display of results in a cyclic displacement system, in accordance with an exemplary embodiment of the disclosure

The graphical data in FIG. 26 was typical for the experimental results and indicated the critical adsorption periods for this cyclic displacement process. This particular graphical representation was taken within a cyclic run of Sorbent A, discussed below.

Example 10

Effect of Water in the $CO_2$ Containing Feed

Figure 27:
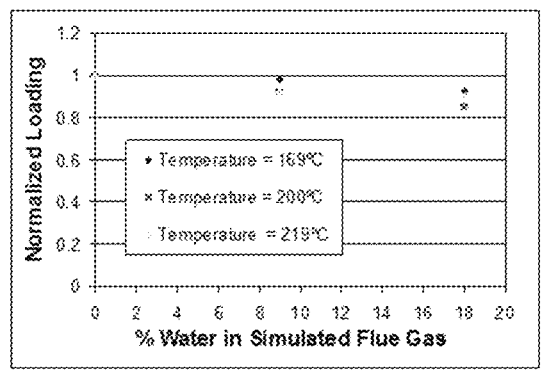
FIGS. 27 and 28 illustrate the effect of water on $CO_2$ adsorption for two sorbents, in accordance with an exemplary embodiment of the disclosure.

The properties of one formulation of sorbent are shown below. This sorbent was fabricated by extrusion, which provides a relatively high crush strength. The sorbent is very porous and has a moderately high surface area. Although the theoretical loading is high (9%), the dynamic loading under the expected operating conditions is relatively low (0.4% to 1.0 wt %). This sorbent was employed in a number of adsorption/regeneration cycles using simulated combustion gas (13.8% CO2) with varying water concentrations. The results, illustrated below, show that at 9% water the working capacity is reduced to 92% of that for zero water and that doubling the water concentration to 18% only reduces the working capacity to 85% of the zero water value. The loading values in FIG. 27 are normalized by the zero water loading for each temperature.

Figure 28:
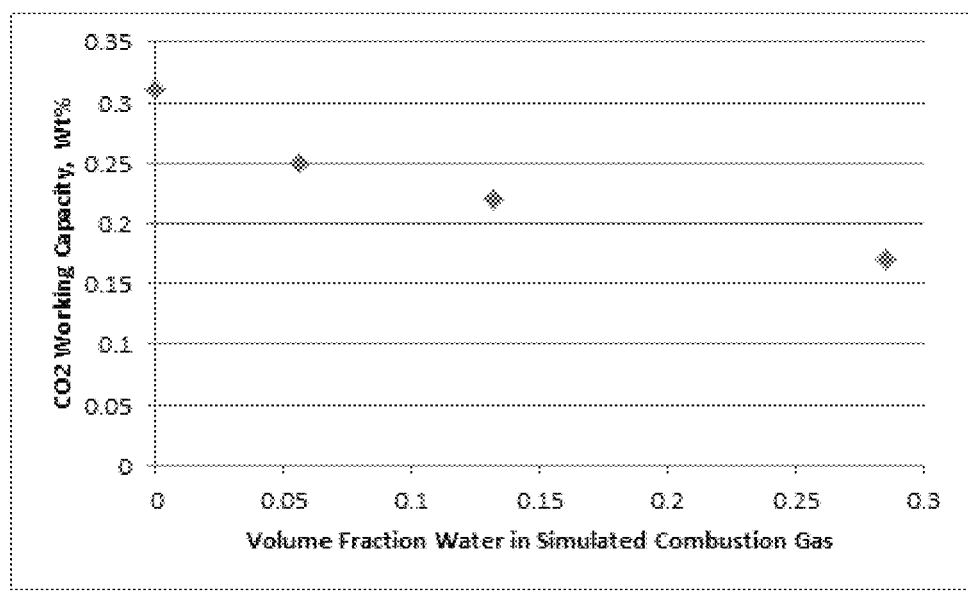

A sample of sorbent prepared according to Sorbent Preparation Example 4 was employed in a series of adsorption/regeneration cycles using simulated combustion gases containing 6% $CO_2$ by volume, and having water concentrations ranging from zero to 28.5 vol %. The results, illustrated in FIG. 28, show that even at the very high concentration of water the working capacity for $CO_2$ was still more than half the capacity obtained at zero water.

Example 11

Preparation and Testing of Sorbents A-I

Sorbent A: 13.5 wt. % K on Gamma Alumina Extrudates: $\gamma$-$Al_2O_3$ extrudates were used as support to deposit $K_2CO_3$. It has a surface area of 306 $m^2$/g, pore volume of 0.85 $cm^3$/g, and pore size centered on 73 Å. The solution containing potassium carbonate was prepared by dissolving potassium carbonate in distilled $H_2O$. As an example of the sample preparation, 27.6353 g of potassium carbonate was dissolved in 60 g of distilled water. The total solution volume of $K_2CO_3$ was adjusted with distilled water to 86 ml. 100 g of gamma alumina extrudates were impregnated with the potassium carbonate solution by incipient wetness. The sample was dried in air at 250° F. for 16 hrs. The K loading is defined as weight of K/(weight of K+weight of alumina).

Sorbent B: 13.5 wt. % K on Theta Alumina Extrudates: $\theta$-$Al_2O_3$ extrudates were used to deposit potassium citrate. It has surface area of 126 $m^2$/g, pore volume of 0.58 $cm^3$/g, and pore size of 143 Å. The solution containing potassium citrate was prepared by dissolving potassium citrate tribasic monohydrate ($C_6H_5K_3O_7 \cdot H_2O$) in distilled $H_2O$. As an example of the sample preparation, 64.866 g of potassium citrate tribasic monohydrate was dissolved in 100 g of distilled water. The total solution volume of potassium citrate was adjusted with distilled water to 92 ml. 150 g of theta alumina extrudates were impregnated with the potassium citrate solution by incipient wetness. The sample was dried in air at 250° F. for 16 hrs. The sample was then placed in a box furnace which was purged with nitrogen flow for 1 hr before 54calcinations. The furnace was ramped at rate of 10° F./min from room temperature to 1000° F. (538° C.) under nitrogen flow and stayed at 1000° F. (538° C.) under nitrogen for 3 hrs. The furnace was cooled down in nitrogen flow to room temperature. The nitrogen flow during calcinations steps was adjusted at 5 volume/volume solid/minute.

Sorbent C: 7.2 wt. % K on Theta Alumina Extrudates: The same $\theta$-$Al_2O_3$ extrudates as in the Example B were used for deposition of potassium citrate. The solution containing potassium citrate was prepared by dissolving potassium citrate tribasic monohydrate ($C_6H_5K_3O_7 \cdot H_2O$) in distilled $H_2O$. As an example of the sample preparation, 32.4035 g of potassium citrate tribasic monohydrate was dissolved in 100 g of distilled water. The total solution volume of potassium citrate was adjusted with distilled water to 92 ml. 150 g of theta alumina extrudates were impregnated with the potassium citrate solution by incipient wetness. The sample was dried in air at 250° F. for 16 hrs. The sample was then placed in a box furnace which was ramped at rate of 10° F./min from room temperature to 1000° F. (538° C.) in air flow and stayed at 1000° F. (538° C.) in air for 3 hrs. The air flow during calcinations was adjusted at 5 volume/volume solid/minute.

Sorbent D: Sorbent D is equivalent to the sorbent preparation of Example 2 above.

Sorbent E: 7.2 wt. % K on Carbon Extrudates: Carbon extrudates were used to deposit potassium hydroxide. It has surface area of 1491 $m^2$/g, pore volume of 0.73 $cm^3$/g, and pore size of 46 Å. The solution containing potassium hydroxide was prepared by dissolving potassium hydroxide in distilled $H_2O$. As an example of the sample preparation, 5.6046 g of potassium hydroxide (KOH) was dissolved in 30 g of distilled water. The total solution volume of potassium citrate was adjusted with distilled water to 42 ml. 50 g of carbon extrudates were impregnated with the potassium hydroxide solution by incipient wetness. The sample was dried in air at 250° F. for 16 hrs.

Sorbent F: 7.2 wt. % K on Theta Alumina Extrudates: The same $\theta$-$Al_2O_3$ extrudates as in the Example B were used for deposition of potassium carbonate. The solution containing potassium carbonate was prepared by dissolving potassium carbonate in distilled $H_2O$. As an example of the sample preparation, 13.805 g of potassium carbonate ($K_2CO_3$) was dissolved in 40 g of distilled water. The total solution volume of $K_2CO_3$ was adjusted with distilled water to 62 ml. 100 g of theta alumina extrudates were impregnated with the solution by incipient wetness. The sample was dried in air at 250° F. for 16 hrs.

Sorbent G: 13.5 wt. % K on Gamma Alumina Extrudates: The same $\gamma$-$Al_2O_3$ extrudates as in the Example A were used for deposition of potassium citrate. The solution containing potassium citrate was prepared by dissolving potassium citrate tribasic monohydrate ($C_6H_5K_3O_7 \cdot H_2O$) in distilled $H_2O$. As an example of the sample preparation 86.488 g of potassium citrate tribasic monohydrate was dissolved in 120 g of distilled water. The total solution volume of potassium citrate was adjusted with distilled water to 173 ml. 200 g of gamma alumina extrudates were impregnated with the potassium citrate solution by incipient wetness. The sample was dried in air at 250° F. for 16 hrs. The sample was then placed in a box furnace which was ramped at rate of 10° F./min from room temperature to 1000° F. (538° C.) in air flow and stayed at 1000° F. (538° C.) in air for 3 hrs. The air flow during calcinations was adjusted at 5 volume/volume solid/minute.

Sorbent H: 7.2 wt. % K on Theta Alumina Extrudates: The same $\theta$-$Al_2O_3$ extrudates as in the Example B were used for deposition of potassium citrate. The solution containing potassium citrate was prepared by dissolving potassium citrate tribasic monohydrate ($C_6H_5K_3O_7 \cdot H_2O$) in distilled $H_2O$. As an example of the sample preparation, 64.807 g of potassium citrate tribasic monohydrate was dissolved in 180 g of distilled water. The total solution volume of potassium citrate was adjusted with distilled water to 185 ml. 300 g of theta alumina extrudates were impregnated with the potassium citrate solution by incipient wetness. The sample was dried in air at 250° F. for 16 hrs. The sample was then placed in a box furnace which was ramped at rate of 10° F./min from room temperature to 1000° F. (538° C.) in air flow and stayed at 1000° F. (538° C.) in air for 3 hrs. The air flow during calcinations was adjusted at 5 volume/volume solid/minute.

Sorbent I: 12.1 wt. % Na on Gamma Alumina Extrudates: The same γ-Al$_2$O$_3$ extrudates as in the Example A were used for deposition of sodium carbonate. The solution containing sodium carbonate was prepared by dissolving sodium carbonate in distilled H$_2$O. As an example of sample preparation, 15.90 g of sodium carbonate was dissolved in 25 g of distilled water. The total solution volume of Na$_2$CO$_3$ was adjusted with distilled water to 43 ml. 50 g of gamma alumina extrudates were impregnated with the sodium carbonate solution by incipient wetness. The sample was dried in air at 250° F. for 16 hrs. The sample was then placed in a box furnace which was ramped at rate of 10° F./min from room temperature to 1000° F. (538° C.) in air flow and stayed at 1000° F. (538° C.) in air for 3 hrs. The air flow during calcinations was adjusted at 5 volume/volume solid/minute.

Cyclic Adsorption Capacity Determinations for Sorbents A through I

The following Table shows the measured adsorbent capacities for CO$_2$, H$_2$O, and the CO$_2$ ratio for a number of non-limiting adsorbent preparations. We have found that various supports for the alkali metals can all be effective. Further, we have found that addition of the alkali to a formed extrudates or pellet or can be added to the base support material and later formed into the desired sphere, extrudates, or pellet form can be done by most methods known to those skilled in the art. Below, we demonstrate adsorbents composed of either potassium or sodium, added as either carbonates or bicarbonates, hydroxides, or as organometallic species (the non-limiting example of potassium citrate is shown that is then calcined or pyrolyzed).

Note that Sorbent E was tested without the presence of air as it was observed that carbon gasification was taking place. It is suggested that carbon supported adsorbents useful in this process are best used in anaerobic conditions such as those found in natural gas CO$_2$ removal processes.

Example 12

CO$_2$ Loading Capacities

Figure 29A:
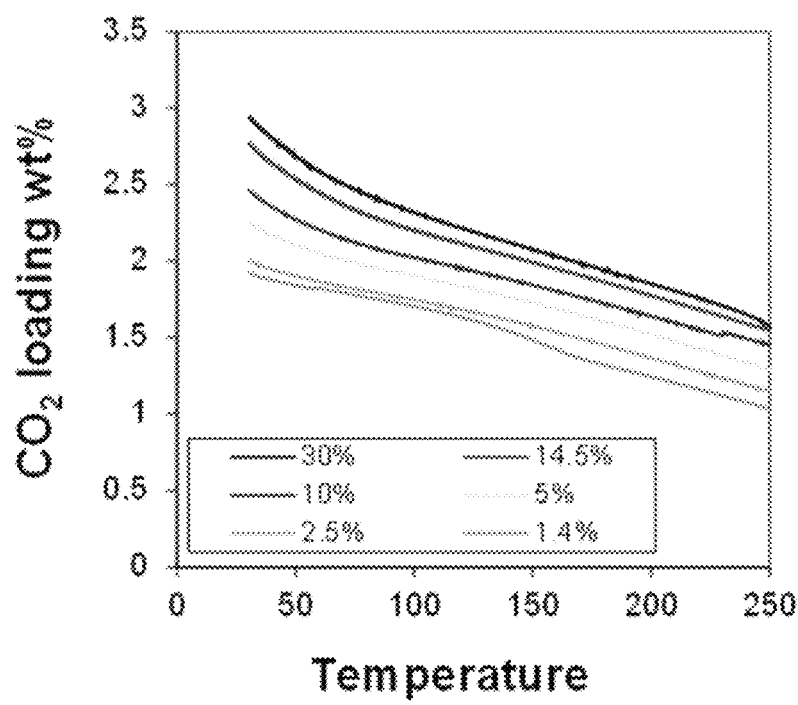
FIGS. 29A and 29B illustrate the $CO_2$ loading of several sorbents, in accordance with an exemplary embodiment of the disclosure.
Figure 29B:
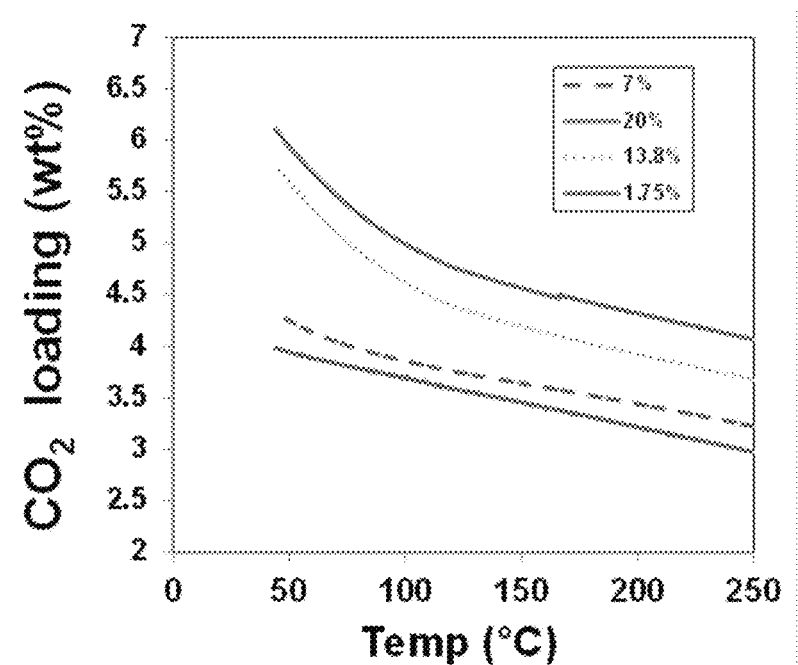

Alkalized sorbents for the disclosure can be assessed for CO$_2$ loading capacities. Isothermal testing was conducted to measure the ultimate loading capacities of different sets of alkalized supports. Tests were conducted across several % wt alkali compositions, and the results of shown in FIGS. 29A and 29B.

Example 13

8 Bed Simulated Moving Bed System with Adsorption Run in Parallel

Figure 30:
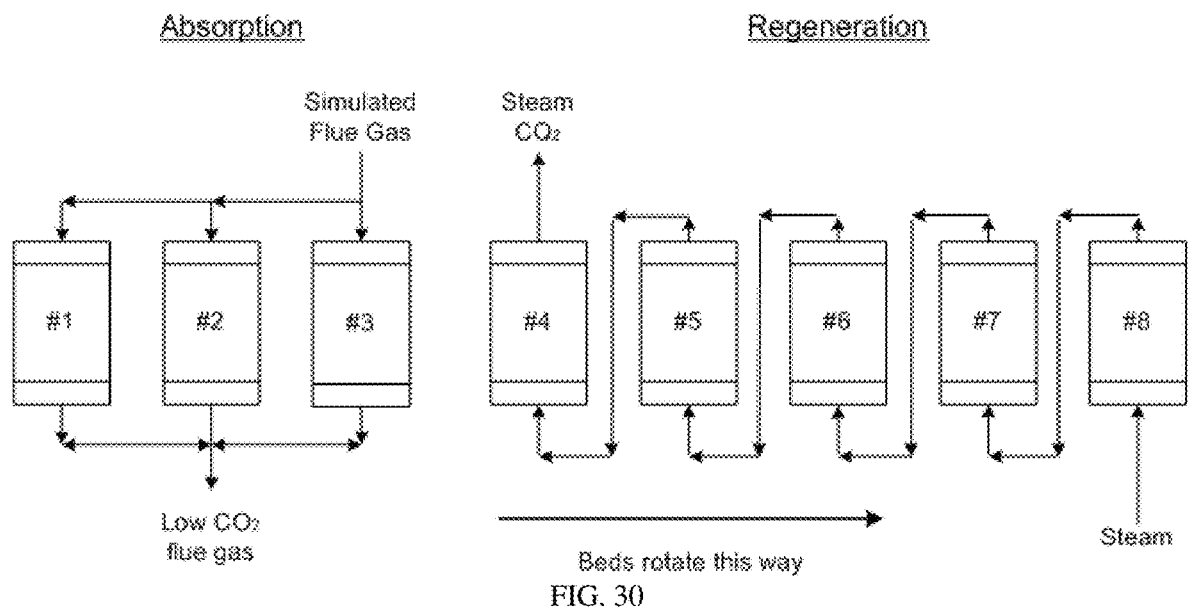
FIG. 30 illustrates an 8-bed simulated moving bed apparatus, in accordance with an exemplary embodiment of the disclosure.

An 8-bed simulated moving bed system was constructed in which the adsorption zone of the system included beds run in parallel rather than in series. An exemplary diagram is shown in FIG. 30. The bench scale apparatus was run as previously described, monitoring the CO$_2$ in flue gas feed, the breakthrough of CO$_2$ at the adsorbers outlet, and the CO$_2$ at the regeneration outlet. Beds were operated in a 2:6, 3:5, and 4:4 adsorber:regeneration sequence. Results are set forth in the Table 5, with figures for the CO$_2$ levels shown in FIGS. 31-33, as noted in the table.

Figure 31:
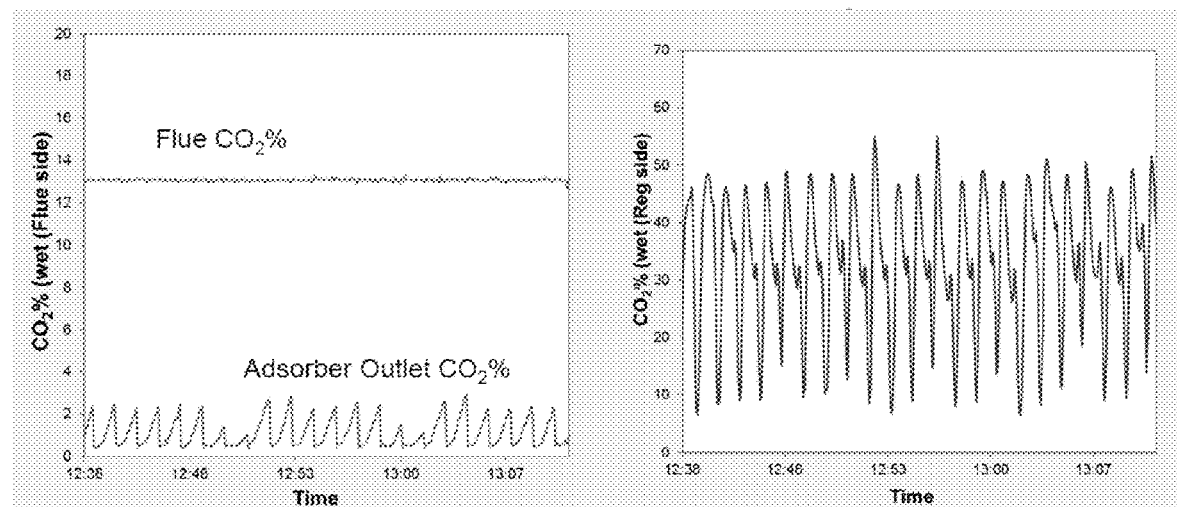
FIGS. 31-33 illustrate gas flow results for a series of sorbents, in accordance with exemplary embodiments of the disclosure.
Figure 32:
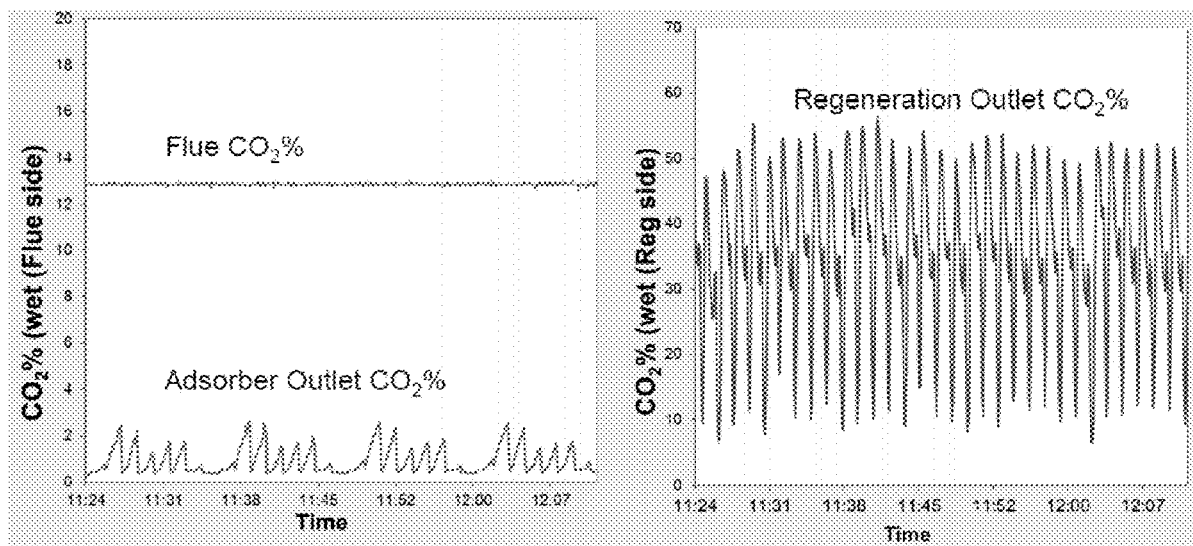
Figure 33:
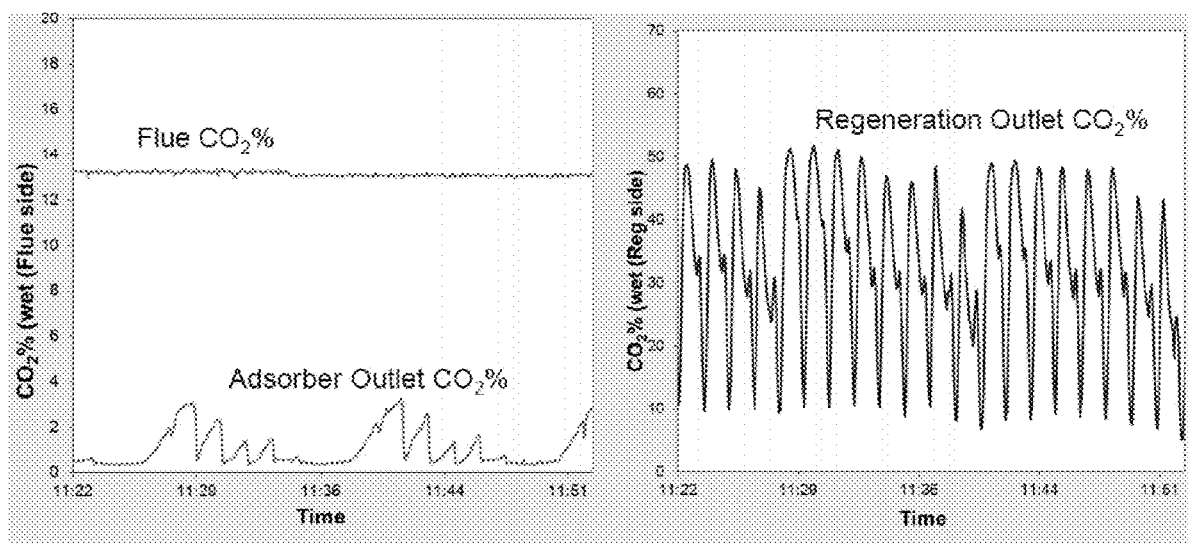
Figure 34A:
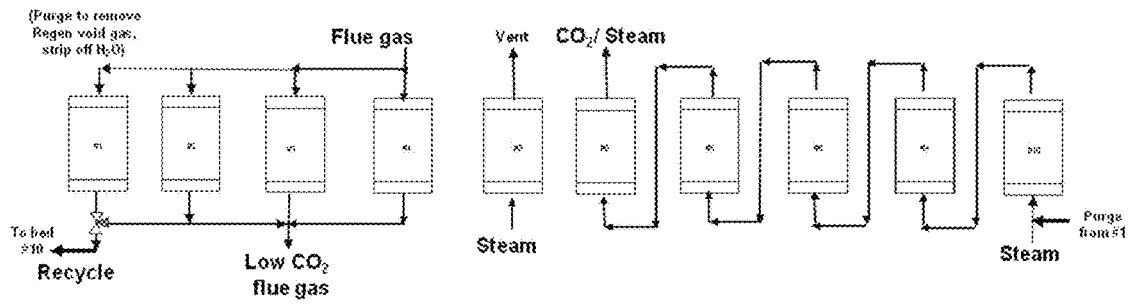
FIGS. 34A-34D illustrate a multiple bed simulated moving bed apparatus including optional recycle streams, in accordance with exemplary embodiments of the disclosure.
Figure 34B:
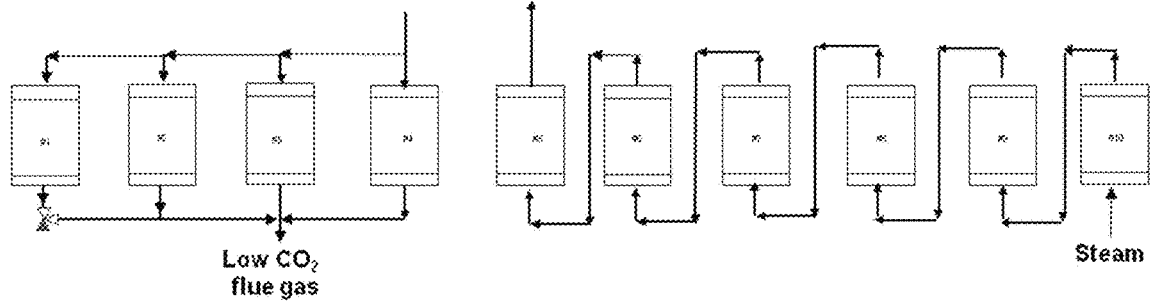
Figure 34C:
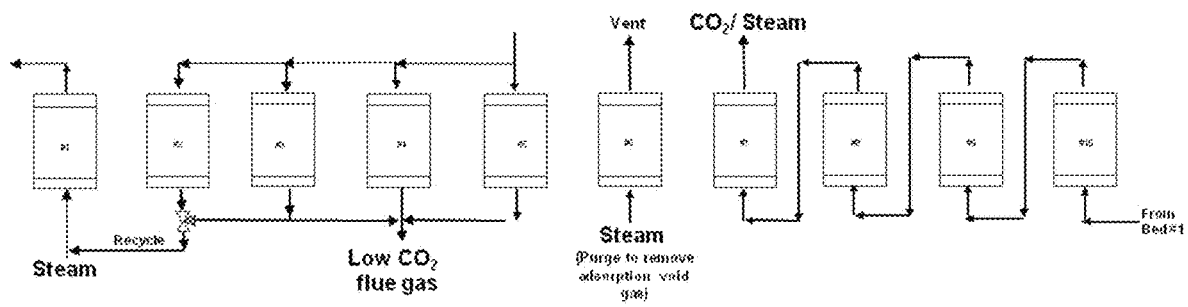
Figure 34D:
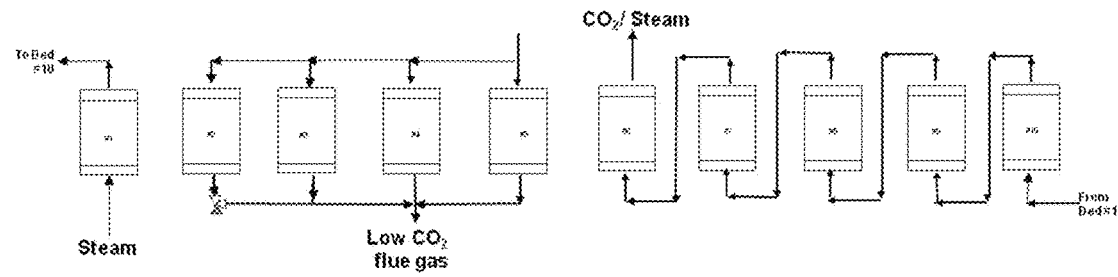
Figure 35A:
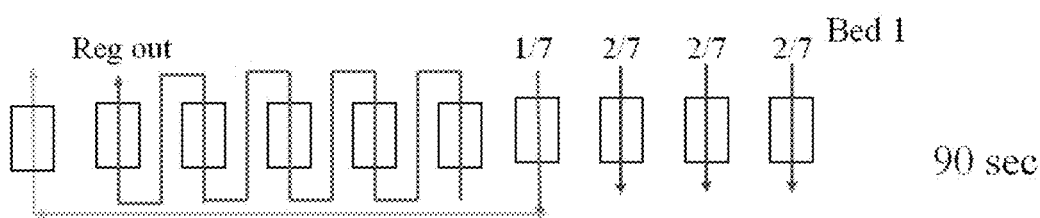
FIGS. 35A-35D illustrate a multiple bed simulated moving bed apparatus including optional steam saver, in accordance with exemplary embodiments of the disclosure.
Figure 35B:
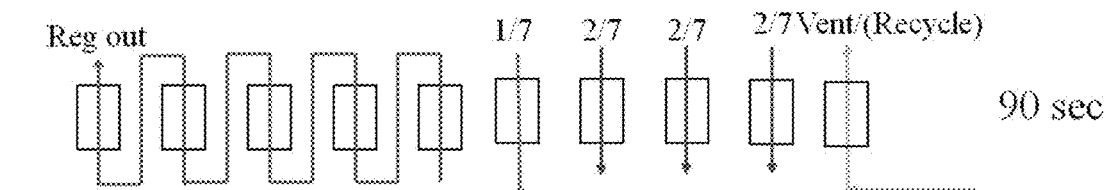
Figure 35C:
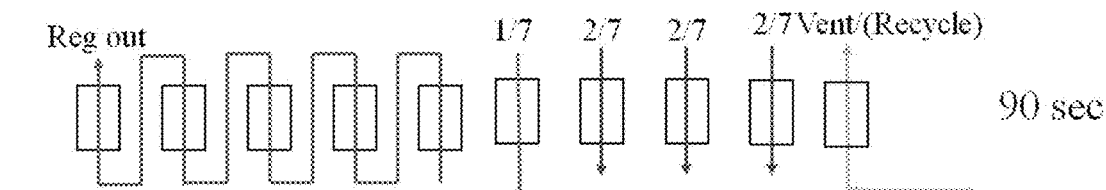
Figure 35D:
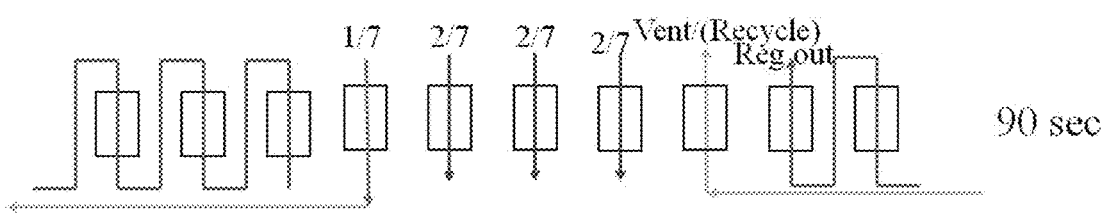

| Adsorb:Regen Bed Ratio | Loading levels of CO$_2$ | Capture percentage | Associated figures |
| --- | --- | --- | --- |
| 2:6 | 0.82 wt % | 88.3% | FIG. 31 |
| 3:5 | 0.83 wt % | 90.3% | FIG. 32 |
| 4:4 | 0.83% | 88.7% | FIG. 33 |

Table of Cyclic Displacement Adsorbent Capacities

| | | % CO$_2$ | % H$_2$O | H$_2$O/CO$_2$ Mole Ratio | Added As |
| --- | --- | --- | --- | --- | --- |
| Sorbent A | 13.5 wt. % K on Gamma Alumina Extrudates | 1.09 | 1.98 | 4.4 | Potassium Carbonate |
| Sorbent B | 13.5 wt. % K on Theta Alumina Extrudates | 0.85 | 1.08 | 3.1 | Potassium citrate - pyrolyzed in N$_2$ |
| Sorbent C | 7.2 wt. % K on Theta Alumina Extrudates | 0.78 | 1.87 | 5.9 | Potassium Citrate - calcined |
| Sorbent D | 9 wt. % Na extruded on Boehmite and Calcined | 0.76 | 2.1 | 6.8 | Sodium Bicarbonate |
| Sorbent E | 7.2 wt. % K on Carbon Spheres | 0.77 | 2.72 | 8.6 | KDH |
| Sorbent F | 7.2 wt. % K on Theta Alumina Extrudates | 0.53 | 1.73 | 8.0 | Potassium Carbonate |
| Sorbent G | 13.5 wt. % K on Gamma Alumina Extrudates | 1.48 | 3.5 | 5.8 | Potassium Citrate - calcined |
| Sorbent H | 7.2 wt. % K on Theta Alumina Extrudates | 0.68 | 7.73 | 6.2 | Potassium Citrate - calcined |
| Sorbent I | 12.1 wt. % Na on Gamma Alumina Extrudates | 1.04 | 2.79 | 6.6 | Sodium Carbonate |

Example 14

10 Bed Simulated Moving Bed System with Optional Recycle Streams

A 10-bed simulated moving bed system was constructed in which the adsorption zone of the system included beds run in parallel rather than in series. An exemplary diagram is shown in FIG. 34A to 34D.

Example 15

10 Bed Simulated Moving Bed System with Optional Steam Saver

A 10-bed simulated moving bed system can be constructed that demonstrates a steam saver method at a commercial level, as shown in FIGS. 35A-35D. The method can address unsteady flows and segregate the steam saver effluent from the regen effluent. The flue gas can be split across 4 beds, in parallel, with the bed just coming on adsorption getting 1/7 of the total flow, and the other three getting 2/7 each. The effluent from the first bed on adsorption can be directed to the bed that just left adsorption and the effluent from that bed can go to vent (recycle), leading to approximately 14% of the flue gas being diverted to steam saving, and equivalent to diverting one of three beds for 43% of a cycle (38 seconds out of 90). The method can eliminate mixing steam saver gas with regen gas, and reduce need for a means to accommodate uneven flows during steam saver steps, such as via surge vessels. The reduced rate of flow during steam saving can reduce pressure drop so that the flue gas can flow through the two beds (one generating steam saving gas and the other re-adsorbing the saved steam) in series with the same or a little bit less pressure drop than the beds feeding the 2/7 of the flue gas each, eliminating the need for a possible no steam saver blower.

EMBODIMENTS

Additionally or alternately, the disclosure can include one or more of the following embodiments.

Embodiment 1

A method for the separation and/or purification of $CO_2$ gas from a $CO_2$ feed stream, comprising providing at least two adsorption positions, the first adsorption position having a second $CO_2$ stream and producing a second $CO_2$-depleted stream, and the second adsorption position having a first $CO_2$ stream and producing a first $CO_2$-depleted stream; at least two desorption positions, the first desorption position having a second regeneration stream and producing a second $CO_2$-enriched stream, and the second desorption position having a first regeneration stream and producing a first $CO_2$-enriched stream; and at least two fixed sorbent beds, each sorbent bed comprising a sorbent, a first port at an end of the bed and a second port at an end of the bed distal to the first port; in the first step, exposing the first sorbent bed to a second $CO_2$ stream at a first adsorption position, and the second sorbent bed to a first $CO_2$ steam at the second adsorption position; in the second step, exposing the first sorbent bed to the first $CO_2$ stream at the second sorbent position and the second sorbent bed to the second regeneration stream at a first desorption position; in a third step, exposing the first sorbent bed to the second regeneration stream at the first desorption position and the second sorbent bed to a first regeneration stream at a second regeneration position; and in a optional fourth step, exposing the second sorbent bed to the second $CO_2$ stream at the first adsorption position and the first sorbent bed to the first regeneration stream at the second desorption, wherein the method is conducted at substantially constant temperature and substantially constant pressure with neither a temperature swing nor pressure swing; and the regeneration streams comprise steam.

Embodiment 2

The method of Embodiment 1, further providing a system of valves and lines connecting the as least two fixed sorbent beds such that a bed advances in steps from a first adsorption position to a second adsorption position to a first desorption position to the second desorption position, and optionally back to the first adsorption position.

Embodiment 3

The method of any of the previous embodiments, wherein the $CO_2$-feed stream is directed into both the first $CO_2$ stream of the second adsorption position and the second $CO_2$ stream of the first adsorption position such that the two adsorption positions operate in parallel.

Embodiment 4

The method of any of the previous embodiments, wherein the first and the second $CO_2$ depleted streams from the second and first adsorption positions are combined together for collection.

Embodiment 5

The method of any of the previous embodiments, wherein the first $CO_2$-depleted stream from the second adsorption bed is used as the second $CO_2$ stream in the first adsorption position such that the two adsorption positions operate in series, and the second $CO_2$-depleted stream is collected.

Embodiment 6

The method of any of the previous embodiments, wherein a first portion of the second $CO_2$ depleted stream from the first adsorption position is diverted as a purge stream before the $CO_2$-depleted stream is collected.

Embodiment 7

The method of any of the previous embodiments, wherein the first $CO_2$-enriched stream from the second desorption position is used as the second regeneration stream in the first desorption position, such that the desorption positions operate in series.

Embodiment 8

The method of any of the previous embodiments, wherein the $CO_2$ streams enter each sorbent bed in the adsorption positions via the first port, and the $CO_2$-depleted stream exits via the second port.

Embodiment 9

The method of any of the previous embodiments, wherein the regeneration streams enter each of the sorbent beds in the desorption positions via the second port, and the $CO_2$-enriched stream exits via the first port.

Embodiment 10

A simulated moving bed $CO_2$ purification/separation system, comprising a plurality of fixed sorbent beds, each sorbent bed comprising a sorbent, a first port at an end of the bed and a second port at an end of the bed distal to the first port; an adsorption zone and a desorption zone; and a series of valves and lines interconnecting each of the beds via the first and second ports a $CO_2$ feed stream, a steam stream, a $CO_2$-depleted stream, a $CO_2$-enriched stream and optionally one or more purge streams; wherein, the system operates under substantially constant pressure and constant temperature with neither temperature swing nor pressure swing.

Embodiment 11

The system of Embodiment 12, wherein when a bed is in an adsorption zone, the first port of the bed is connected to either the $CO_2$ feed stream or the second port of another sorbent bed in the adsorption zone which is generating a $CO_2$ depleted stream.

Embodiment 12

The system of Embodiment 10 to 11, wherein when a bed is in an adsorption zone, the second port of the bed is either connected to a first port of another bed, to a purge line, or to a unit collecting the $CO_2$-depleted stream.

Embodiment 13

The system of Embodiment 10 to 12, wherein when any bed is in an adsorption zone, the first port is connected to the $CO_2$ feed stream and the second port is connected to a unit collecting the $CO_2$-depleted stream, and the bed earliest in the adsorption zone optionally connected to a purge line for some period of time.

Embodiment 14

The system of Embodiment 10 to 13, wherein all the beds operating in an adsorption zone operate in parallel.

Embodiment 15

The method of Embodiment 10 to 14, wherein all the beds operating in the desorption zone operate in series, the bed longest in the desorption zone receives the steam stream, each bed is connected via a port to the bed next longest in the desorption zone, and the bed earliest in the desorption zone is emitting via a port the $CO_2$-enriched stream for collection, or optionally diverted to purge for a period of time.

Embodiment 16

The method of Embodiment 10 to 15, wherein when a bed is in a desorption zone, the first port is connected to the second port of another bed which has been in the desorption zone less time, and the second port is connected to the first port of another bed which has been in the desorption zone the next longest time, with the effluent of the earlier bed being led to the inlet of the bed longer in the desorption zone; with the exceptions that the second port of the bed longest in the desorption zone is connected to the steam stream, and the first port of the bed earliest in the desorption zone is connected to a unit for collecting the $CO_2$-enriched stream.

Embodiment 17

The methods and systems of any of the previous embodiments, wherein the fixed sorbent beds have an aspect ratio (length to width) that provides for a superficial gas residence time of at least 5 seconds

Embodiment 18

The methods and systems of any of the previous embodiments, wherein sorbent bed comprises an alkanized sorbent, the alkanized sorbent comprising a substrate and at least one alkali or alkaline earth component.

Embodiment 19

The methods and systems of any of the previous embodiments, wherein the sorbent bed comprises an alkalized alumina, the alkalized alumina comprising an alumina and at least one alkali or alkaline earth component.

Embodiment 20

The methods and systems of any of the previous embodiments, wherein the ratio of beds in the adsorption zone to desorption zone is between about 1:1 and 1:4.

Embodiment 21

The methods and systems of any of the previous embodiments, further comprising an optional purge step or steps, wherein the sorbent bed can be purged between desorption and adsorption, and/or between adsorption and desorption.

Embodiment 22

The methods and systems any of the previous embodiments, in which the purge steps comprise introducing a separate stream, optionally a portion of the feed stream, into a bed which just advanced out of the desorption zone, and directing the effluent to a bed which has just advanced out of the adsorption stage; directing the ultimate effluent either to a stack or to be recycled within the system.

Embodiment 23

The methods and systems any of the previous embodiments, in which the purge steps can comprise introducing a separate stream, optionally a portion of the feed stream or a non-adsorbing gas, into a bed which just advanced out of the desorption zone, inorder to push out the dead volume gas and adsorbed steam of this bed back into a desorption zone bed.

We claim:
1. A simulated moving bed system, comprising:
a first fixed sorbent bed comprising an alkalized sorbent, a first port at an end of the first fixed sorbent bed, and a second port at an end of the first fixed sorbent bed distal to the first port;
a second fixed sorbent bed comprising the alkalized sorbent, a third port at an end of the second fixed sorbent bed, and a fourth port at an end of the second fixed sorbent bed distal to the third port;

a third fixed sorbent bed comprising the alkalized sorbent, a fifth port at an end of the third fixed sorbent bed, and a sixth port at an end of the third fixed sorbent bed distal to the fifth port, an adsorption zone and a desorption zone;

a $CO_2$ feed stream, a steam stream, a $CO_2$-depleted stream, a $CO_2$-enriched stream, and a purge stream;

a series of valves and lines fluidly interconnecting the first fixed sorbent bed, the second fixed sorbent bed, the third fixed sorbent bed with the $CO_2$ feed stream, the steam stream, the $CO_2$-depleted stream, the $CO_2$-enriched stream, and the purge stream via the first, second, third, fourth, fifth, and sixth ports; and wherein the system operates under substantially constant pressure and constant temperature with neither temperature swing nor pressure swing, wherein the alkalized sorbent comprises a substrate and at least one alkali or alkaline earth component in an amount of at least about 7 weight percent of the alkalized sorbent, and wherein the desorption zone is configured for a concentration swing and a desorptive displacement, the concentration swing comprising partial pressure purge desorption and the desorptive displacement comprising an adsorbed $CO_2$ molecule being displaced from the sorbent by steam.

2. The simulated moving bed system of claim 1, wherein, at a first stage, the first fixed sorbent bed is in an adsorption zone and the second fixed sorbent bed is in the desorption zone such that:
the first port of the first fixed sorbent bed is fluidly connected to the $CO_2$ feed stream;
the second port of the first fixed sorbent bed is fluidly connected to either a first port of at least one additional first fixed sorbent bed in the adsorption zone or to a unit collecting the $CO_2$-depleted stream;
the third port of the second fixed sorbent bed is fluidly connected to the steam stream; and
the fourth port of the second fixed sorbent bed is fluidly connected to a collection unit or at least one additional second fixed sorbent bed.

3. The simulated moving bed system of claim 2, further comprising the at least one additional first fixed sorbent bed in the adsorption zone, wherein the first fixed sorbent bed and the at least one additional first fixed sorbent bed are fluidly connected in parallel in the first stage.

4. The simulated moving bed system of claim 2, further comprising the at least one additional second fixed sorbent bed in the desorption zone,
wherein the second fixed sorbent bed and the at least one additional second fixed sorbent bed are fluidly connected in series in the first stage, and
the fourth port of the second fixed sorbent bed is fluidly connected to the third port of the at least one additional second fixed sorbent bed in the first stage,
the fourth port of the at least one additional second fixed sorbent bed is fluidly connected to a collection unit for steam and $CO_2$ in the first stage.

5. The simulated moving bed system of claim 4, wherein the second fixed sorbent bed and the at least one additional second fixed sorbent bed are fluidly connected in parallel in the first stage.

6. The simulated moving bed system of claim 4, wherein the first fixed sorbent bed, the at least one additional first fixed sorbent bed, the second fixed sorbent bed, and the at least one additional second fixed sorbent bed have an aspect ratio (length to width) so as to provide a gas superficial residence time of at least 5 seconds.

7. The simulated moving bed system of claim 1, wherein:
the substrate of the alkalized sorbent comprises a gamma alumina, a theta alumina, or both, and
the substrate has a surface area of at least about 100 $m^2/g$ and less than about 1200 $m^2/g$.

8. The simulated moving bed system of claim 2, wherein the ratio of fixed sorbent beds of the first fixed sorbent bed, the at least one additional first fixed sorbent bed, the second fixed sorbent bed, and the at least one additional second fixed sorbent bed in the adsorption zone to desorption zone is from 1:1 to 1:4.

9. The simulated moving bed system of claim 2, wherein the third fixed sorbent bed is in a purge zone in the first stage such that:
the fifth port of the third fixed sorbent bed is fluidly connected to a purge feed, and
the sixth port of the third fixed sorbent bed is fluidly connected to the third port of the second fixed sorbent bed.

10. The simulated moving bed system of claim 9, wherein, at a second stage, the first fixed sorbent bed is in the purge zone, the second fixed sorbent bed is in the absorption zone, and the third fixed sorbent bed is in the desorption zone such that:
the first port of the first fixed sorbent bed is fluidly connected to the purge feed;
the second port of the first fixed sorbent bed is fluidly connected to the fifth port of the third fixed sorbent bed;
the third port of the second fixed sorbent bed is fluidly connected to the $CO_2$ feed stream;
the fourth port of the second fixed sorbent bed is fluidly connected to either the at least one additional second fixed sorbent bed in the adsorption zone or to the unit collecting the $CO_2$-depleted stream;
the fifth port of the third fixed sorbent bed is fluidly connected to the steam stream and the second port of the first fixed sorbent bed; and
the sixth port of the third fixed sorbent bed is fluidly connected to the collection unit or the at least one additional second fixed sorbent bed.

11. The simulated moving bed system of claim 10, wherein, at a third stage, the first fixed sorbent bed is in the desorption zone, the second fixed sorbent bed is in the purge zone, and the third fixed sorbent bed is in the adsorption zone such that:
the first port of the first fixed sorbent bed is fluidly connected to the steam stream and the fourth port of the second fixed sorbent bed;
the second port of the first fixed sorbent bed is fluidly connected to the collection unit or the at least one additional first fixed sorbent bed;
the third port of the second fixed sorbent bed is fluidly connected to the purge feed;
the fourth port of the second fixed sorbent bed is fluidly connected to the first port of the first fixed sorbent bed;
the fifth port of the third fixed sorbent bed is fluidly connected to the $CO_2$ feed stream; and
the sixth port of the third fixed sorbent bed is fluidly connected to either at least one additional third fixed sorbent bed in the adsorption zone or to the unit collecting the $CO_2$-depleted stream.

* * * * *